(12) United States Patent
Woodgate et al.

(10) Patent No.: US 11,287,713 B2
(45) Date of Patent: *Mar. 29, 2022

(54) OPTICAL STACK FOR PRIVACY DISPLAY

(71) Applicant: RealD Spark, LLC, Boulder, CO (US)

(72) Inventors: Graham J. Woodgate, Henley on Thames (GB); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,096

(22) Filed: Feb. 12, 2021

(65) Prior Publication Data

US 2021/0271121 A1 Sep. 2, 2021

Related U.S. Application Data

(63) Continuation of application No. 16/448,235, filed on Jun. 21, 2019, now Pat. No. 10,955,715.
(Continued)

(51) Int. Cl.
*G02F 1/137* (2006.01)
*F21V 8/00* (2006.01)
(Continued)

(52) U.S. Cl.
CPC .......... *G02F 1/137* (2013.01); *G02B 6/0038* (2013.01); *G02B 6/0055* (2013.01); *G02F 1/139* (2013.01);
(Continued)

(58) Field of Classification Search
CPC ........... G02F 1/13363; G02F 1/133634; G02F 1/133631; G02F 2413/01; G02F 2413/00;
(Continued)

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Mariam Qureshi
(74) *Attorney, Agent, or Firm* — Penny L. Lowry

(57) ABSTRACT

A switchable privacy display apparatus comprises a polarised output spatial light modulator, and an additional polariser. A reflective polariser, switchable liquid crystal polar control retarder, passive polar control retarders and air gap are arranged between the display output polariser and additional polariser. The passive retarders are arranged to provide no phase difference to polarised light from the spatial light modulator for on-axis light; and simultaneously provide a non-zero phase difference for polarised light in off-axis directions. The polar control retarders are further arranged to achieve low reflectivity for light propagating through the air gap. A switchable privacy display that can be conveniently assembled at low cost can be provided with high contrast images for display users while maintaining high visual security level for off-axis snoopers.

46 Claims, 46 Drawing Sheets

Related U.S. Application Data

(60) Provisional application No. 62/796,423, filed on Jan. 24, 2019, provisional application No. 62/789,322, filed on Jan. 7, 2019, provisional application No. 62/691,896, filed on Jun. 29, 2018.

(51) Int. Cl.

| | | |
|---|---|---|
| *G06F 3/044* | (2006.01) | |
| *G02F 1/13363* | (2006.01) | |
| *G02F 1/13* | (2006.01) | |
| *G02F 1/1333* | (2006.01) | |
| *G02F 1/1335* | (2006.01) | |
| *G02F 1/1337* | (2006.01) | |
| *G02F 1/1343* | (2006.01) | |
| *G02F 1/139* | (2006.01) | |

(52) U.S. Cl.
CPC .......... *G02F 1/1323* (2013.01); *G02F 1/1337* (2013.01); *G02F 1/13338* (2013.01); *G02F 1/13363* (2013.01); *G02F 1/13439* (2013.01); *G02F 1/133504* (2013.01); *G02F 1/133528* (2013.01); *G02F 1/133536* (2013.01); *G02F 1/133634* (2013.01); *G02F 1/13706* (2021.01); *G02F 1/13712* (2021.01); *G02F 1/13725* (2013.01); *G02F 1/13775* (2021.01); *G02F 1/133531* (2021.01); *G02F 1/133738* (2021.01); *G02F 1/133742* (2021.01); *G02F 2413/14* (2013.01); *G06F 3/0445* (2019.05)

(58) Field of Classification Search
CPC ............... G02F 1/133528; G02F 1/137; G02F 1/133536; G02B 5/3083
See application file for complete search history.

(56) References Cited

U.S. PATENT DOCUMENTS

| | | |
|---|---|---|
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A * | 8/1997 | Sharp .................. G02F 1/13363 252/299.01 |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 * | 3/2001 | Tillin .................... G02F 1/1393 349/119 |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,649,248 B1 | 5/2020 | Jiang et al. |
| 10,649,259 B2 | 5/2020 | Lee et al. |
| 10,935,714 B2 | 3/2021 | Woodgate et al. |
| 11,016,341 B2 | 5/2021 | Robinson et al. |
| 11,070,791 B2 | 7/2021 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0214615 A1 | 11/2003 | Colgan et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0203162 A1 * | 9/2006 | Ito ........................ G02F 1/1393 349/117 |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |

(56) References Cited

U.S. PATENT DOCUMENTS

| | | |
|---|---|---|
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1* | 7/2010 | Gay ............... G02B 30/27 345/589 |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |

(56) References Cited

U.S. PATENT DOCUMENTS

| | | | |
|---|---|---|---|
| 2018/0259812 A1* | 9/2018 | Goda | G02B 5/30 |
| 2018/0284341 A1 | 10/2018 | Woodgate et al. | |
| 2018/0321523 A1 | 11/2018 | Robinson et al. | |
| 2018/0321553 A1 | 11/2018 | Robinson et al. | |
| 2018/0329245 A1 | 11/2018 | Robinson et al. | |
| 2018/0364526 A1 | 12/2018 | Finnemeyer et al. | |
| 2019/0086706 A1 | 3/2019 | Robinson et al. | |
| 2019/0121173 A1 | 4/2019 | Robinson et al. | |
| 2019/0154896 A1 | 5/2019 | Yanai | |
| 2019/0196235 A1 | 6/2019 | Robinson et al. | |
| 2019/0196236 A1 | 6/2019 | Chen et al. | |
| 2019/0197928 A1 | 6/2019 | Schubert et al. | |
| 2019/0215509 A1 | 7/2019 | Woodgate et al. | |
| 2019/0227366 A1 | 7/2019 | Harrold et al. | |
| 2019/0235304 A1 | 8/2019 | Tamada et al. | |
| 2019/0250458 A1 | 8/2019 | Robinson et al. | |
| 2019/0278010 A1 | 9/2019 | Sakai et al. | |
| 2019/0293858 A1 | 9/2019 | Woodgate et al. | |
| 2019/0293983 A1 | 9/2019 | Robinson et al. | |
| 2019/0353944 A1 | 11/2019 | Acreman et al. | |
| 2019/0361165 A1 | 11/2019 | Chang et al. | |
| 2020/0026125 A1 | 1/2020 | Robinson et al. | |
| 2020/0159055 A1 | 5/2020 | Robinson et al. | |
| 2020/0218101 A1 | 7/2020 | Ihas et al. | |
| 2020/0225402 A1 | 7/2020 | Ihas et al. | |
| 2020/0233142 A1 | 7/2020 | Liao et al. | |
| 2021/0149233 A1 | 5/2021 | Robinson et al. | |

FOREIGN PATENT DOCUMENTS

| | | | |
|---|---|---|---|
| CN | 1776484 A | 5/2006 | |
| CN | 101256251 A | 9/2008 | |
| CN | 101518095 A | 8/2009 | |
| CN | 101681061 A | 3/2010 | |
| CN | 103473494 A | 12/2013 | |
| CN | 104133292 A | 11/2014 | |
| CN | 104303085 A | 1/2015 | |
| CN | 104321686 A | 1/2015 | |
| CN | 104380177 A | 2/2015 | |
| CN | 204740413 U | 11/2015 | |
| CN | 106104372 A | 11/2016 | |
| CN | 106415342 A | 2/2017 | |
| CN | 209171779 U | 7/2019 | |
| GB | 2248100 A | 3/1992 | |
| GB | 2418518 A | 3/2006 | |
| GB | 2428100 A | 1/2007 | |
| GB | 2428345 A | 1/2007 | |
| GB | 2482065 A | 1/2012 | |
| GB | 2486935 B | 9/2013 | |
| JP | H01130783 U | 9/1989 | |
| JP | H11174489 A | 7/1999 | |
| JP | 2007148279 A | 6/2007 | |
| JP | 2007273288 A | 10/2007 | |
| KR | 20120011228 A | 2/2012 | |
| KR | 101990286 B1 | 6/2019 | |
| TW | M537663 U | 3/2017 | |
| TW | I612360 B | 1/2018 | |
| WO | 2005071449 A2 | 8/2005 | |
| WO | 2010021926 A2 | 2/2010 | |
| WO | 2014011328 A1 | 1/2014 | |
| WO | 2014130860 A1 | 8/2014 | |
| WO | 2015040776 A1 | 3/2015 | |
| WO | 2015057625 A1 | 4/2015 | |
| WO | 2015143227 A1 | 9/2015 | |
| WO | 2015157184 A1 | 10/2015 | |
| WO | 2015190311 A1 | 12/2015 | |
| WO | 2015200814 A1 | 12/2015 | |
| WO | 2016195786 A1 | 12/2016 | |
| WO | 2017050631 A1 | 3/2017 | |
| WO | 2018035492 A1 | 2/2018 | |
| WO | 2018208618 A1 | 11/2018 | |
| WO | 2019055755 A1 | 3/2019 | |
| WO | 2019067846 A1 | 4/2019 | |
| WO | 2019147762 A1 | 8/2019 | |

OTHER PUBLICATIONS

Brudy et al., "Is Anyone Looking? Mitigating Shoulder Surfing on Public Displays through Awareness and Protection", Proceedings of the International Symposium On Persuasive Displays (Jun. 3, 2014), pp. 1-6.
CN201780030715.3 Notification of the First Office Action dated Jan. 21, 2020.
CN201880042320.X Notification of the First Office Action dated May 25, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.

(56) References Cited

OTHER PUBLICATIONS

PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Cheng, et al., "Fast-Response Liquid Crystal Variable Optical Retarder and Multilevel Attenuator," Optical Engineering 52 (10), 107105 (Oct. 16, 2013). (Year: 2013).
EP-18857077.4 Extended European Search Report of European Patent Office dated Jun. 16, 2021.
Kalantar, et al. "Backlight Unit With Double Surface Light Emission", J. Soc. Inf. Display, vol. 12, Issue 4, pp. 379-387 (Dec. 2004).
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
CN201680061632.6 Notification of the First Office Action dated Sep. 14, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/043435 International search report and written opinion of the international searching authority dated Nov. 1, 2021.
PCT/US2021/043444 International search report and written opinion of the international searching authority dated Nov. 1, 2021.
CN-201980020303.0—Notification of the First Office Action dated Dec. 16, 2021.

\* cited by examiner

OPTICAL STACK FOR PRIVACY DISPLAY

TECHNICAL FIELD

This disclosure generally relates to optical stacks for use in privacy display and low stray light displays.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and thus the display is limited to privacy only function.

Switchable privacy displays may be provided by control of the off-axis optical output.

Control of off-axis privacy may be provided by means of contrast reduction, for example by adjusting the liquid crystal bias tilt in an In-Plane-Switching LCD.

Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator.

Control may be further provided by means of off-axis reflectivity increase. Reflectivity increase may be achieved by means of switchable liquid crystal retarders, and compensation retarders that are arranged to control the polarisation of ambient light that falls onto a reflective polariser.

BRIEF SUMMARY

According to a first aspect of the present disclosure there is provided a display device comprising: a spatial light modulator; a display polariser arranged on the output side of the spatial light modulator, the display polariser being a linear polariser; an additional polariser arranged on the output side of display polariser, the additional polariser being a linear polariser; and plural polar control retarders arranged between the additional polariser and the display polariser, wherein an air gap divides the plural polar control retarders into at least one air gap input retarder between the display polariser and the air gap and at least one air gap output retarder between the air gap and the additional polariser, the at least one air gap input retarder being arranged to convert linearly polarised light passed by the display polariser into circularly polarised light, and the plural polar control retarders together being capable of simultaneously introducing no net, relative phase shift to orthogonal polarisation components of light passed by the display polariser along an axis along a normal to the plane of the plural polar control retarders and introducing a net, relative phase shift to orthogonal polarisation components of light passed by the display polariser along an axis inclined to a normal to the plane of the plural polar control retarders.

Advantageously a privacy display may be provided to achieve high luminance to an on-axis user and low luminance to an off-axis snooper, achieving high visual security level. An air gap is arranged to achieve reduced assembly cost and improve manufacturing yield. Multiple spatial light modulators may be arranged with a single retardation stack and additional polariser. Image contrast may be optimised for the head-on user.

The plural polar control retarders may include at least one passive retarder. The cost of the display may be reduced. The polar angular range over which high visual security level is achieved may be increased in comparison to displays without passive retarders.

The at least one passive retarder may comprise two passive retarders which have optical axes in the plane of the retarders that are crossed. The pair of passive retarders may have optical axes that extend at 45° and at 135°, respectively, with respect to an electric vector transmission direction that is parallel to the electric vector transmission of the display polariser. Advantageously in-plane retarders may be used that have lower cost than out of plane retarders.

The two passive retarders may be both included in one of the at least one air gap output retarder or the at least one air gap input retarder. The two passive retarders may introduce no net, relative phase shift to orthogonal polarisation components of light passed by the display polariser along an axis along a normal to the plane of the plural polar control retarders, and the at least one passive compensation retarder may comprise a further two passive retarders which have optical axes in the plane of the retarders that are crossed, the further two passive retarders being respectively included in the at least one air gap output retarder and the at least one air gap input retarder, the further two passive retarders introducing no net, relative phase shift to orthogonal polarisation components of light passed by the display polariser along an axis along a normal to the plane of the plural polar control retarders, and the one of the further two passive retarders which is arranged in the at least one air gap retarder being arranged to convert linearly polarised light passed by the display polariser into circularly polarised light. Advantageously the number of passive retarders may be reduced, reducing display cost and complexity.

The two passive retarders may introduce a net, relative phase shift to orthogonal polarisation components of light passed by the display polariser along an axis along a normal to the plane of the plural polar control retarders, and the at least one passive compensation retarder may comprise a further passive retarder included in the other of the at least one air gap output retarder or the at least one air gap input retarder, the further passive retarder introducing a relative phase shift to orthogonal polarisation components of light passed by the display polariser along an axis along a normal to the plane of the plural polar control retarders that is equal and opposite to said net, relative phase shift introduced by the at least one passive compensation retarder.

Said one of the two passive retarders and the further passive retarder may have optical axes in the plane of the retarders that are crossed, and the other of the two passive retarders has a retardance for light of a wavelength of 550 nm that is equal to the retardance of said one of the two passive retarders minus the retardance of the further passive retarder. Said one of the two passive retarders and the further passive retarder may have optical axes in the plane of the retarders that are aligned, and the other of the two passive retarders may have a retardance for light of a wavelength of 550 nm that is equal to the retardance of said one of the two passive retarders plus the retardance of the further passive retarder. Advantageously the chromaticity of the reflection reduction at the air interfaces may be reduced.

The plural polar control retarders may include a switchable liquid crystal retarder comprising a layer of liquid crystal material, the switchable liquid crystal retarder being provided between the pair of passive retarders. The display device may further comprise a transparent electrode and a liquid crystal alignment layer formed on a side of each of the pair of passive retarders adjacent the switchable liquid crystal retarder. The display device may further comprise first and second substrates between which the switchable liquid crystal retarder is provided, the first and second substrates each comprising one of the pair of passive retarders. Advantageously the display may be switched between a public viewing mode with wide angle image visibility and a privacy mode with high visual security level for off-axis viewing.

The two passive retarders may be respectively included in the at least one air gap output retarder and the at least one air gap input retarder. Advantageously the number of retarders may be reduced, reducing cost and complexity.

The at least one passive compensation retarder may comprise a passive retarder having an optical axis perpendicular to the plane of the retarder. The passive retarder having an optical axis perpendicular to the plane of the retarder has a retardance for light of a wavelength of 550 nm in a range from −400 nm to −1000 nm or in a range from +500 nm to +1200 nm and preferably in a range from −750 nm to −850 nm or preferably in a range from +950 nm to +1050 nm. Advantageously the display thickness may be reduced. Advantageously the off-axis visual security level may be increased.

The plural polar control retarders may further comprise two passive retarders which have optical axes in the plane of the retarders that are crossed, the two passive retarders being respectively included in the at least one air gap output retarder and the at least one air gap input retarder, the two passive retarders introducing no net, relative phase shift to orthogonal polarisation components of light passed by the display polariser along an axis along a normal to the plane of the plural polar control retarders, and the one of the two passive retarders which is arranged in the at least one air gap retarder being arranged to convert linearly polarised light passed by the display polariser into circularly polarised light. The retardance of the at least one passive compensation retarder may be equal and opposite to the retardance of the switchable liquid crystal retarder. Advantageously a public mode with wide field of view and high image visibility to off-axis users may be achieved.

The plural polar control retarders may include a switchable liquid crystal retarder comprising a layer of liquid crystal material. The switchable liquid crystal retarder may comprise two surface alignment layers disposed adjacent to the layer of liquid crystal material and on opposite sides thereof, each of the surface alignment layers being arranged to provide homeotropic alignment in the adjacent liquid crystal material. The layer of liquid crystal material of the switchable liquid crystal retarder may comprise a liquid crystal material with a negative dielectric anisotropy. The layer of liquid crystal material may have a retardance for light of a wavelength of 550 nm in a range from 500 nm to 1000 nm, preferably in a range from 600 nm to 900 nm and most preferably in a range from 700 nm to 850 nm. The plural polar control retarders may further include: a passive retarder which has an optical axis perpendicular to the plane of the retarder, the passive retarder having a retardance for light of a wavelength of 550 nm in a range from −300 nm to −900 nm, preferably in a range from −450 nm to −800 nm and most preferably in a range from −500 nm to −725 nm; or a pair of passive retarders which have optical axes in the plane of the retarders that are crossed, each retarder of the pair of passive retarders having a retardance for light of a wavelength of 550 nm in a range from 300 nm to 800 nm, preferably in a range from 500 nm to 700 nm and most preferably in a range from 550 nm to 675 nm. Advantageously the public mode may be provided with low power consumption. Advantageously the passive retarders may be provided to match the liquid crystal mode.

The switchable liquid crystal retarder may comprise two surface alignment layers disposed adjacent to the layer of liquid crystal material and on opposite sides thereof, each of the surface alignment layers being arranged to provide homogeneous alignment in the adjacent liquid crystal material. The layer of liquid crystal material of the switchable liquid crystal retarder may comprise a liquid crystal material with a positive dielectric anisotropy. The layer of liquid crystal material may have a retardance for light of a wavelength of 550 nm in a range from 500 nm to 1000 nm, preferably in a range from 600 nm to 850 nm and most preferably in a range from 700 nm to 800 nm. The plural polar control retarders may further include: a passive retarder which has an optical axis perpendicular to the plane of the retarder, the retarder having a retardance for light of a wavelength of 550 nm in a range from −300 nm to −700 nm, preferably in a range from −350 nm to −600 nm and most preferably in a range from −400 nm to −500 nm; or a pair of passive retarders which have optical axes in the plane of the retarders that are crossed, each retarder of the pair of passive retarders having a retardance for light of a wavelength of 550 nm in a range from 300 nm to 800 nm, preferably in a range from 350 nm to 650 nm and most preferably in a range from 450 nm to 550 nm. Advantageously the display may have increased resilience to applied mechanical stress.

Each alignment layer may have a pretilt having a pretilt direction with a component in the plane of the liquid crystal layer that is parallel or anti-parallel or orthogonal to the electric vector transmission direction of the display polariser. The switchable liquid crystal retarder may further comprise electrodes arranged to apply a voltage for controlling the layer of liquid crystal material. The electrodes may be on opposite sides of the layer of liquid crystal material. The display polariser and the additional polariser may have electric vector transmission directions that are parallel. Advantageously the display may be controlled to switch between privacy and public modes with high efficiency.

The display polariser and the additional polariser may have electric vector transmission directions that are not parallel, and the display device may further comprise a rotator retarder arranged between the additional polariser and the display polariser, the rotator retarder being arranged to rotate a polarisation direction of polarised light incident thereon between the electric vector transmission directions of the display polariser and the additional polariser. The spatial light modulator may include a layer of twisted nematic liquid crystal material.

A reflective polariser is arranged between the display polariser and additional polariser, the reflective polariser being a linear polariser. The display polariser and the reflective polariser may have electric vector transmission directions that are parallel. Advantageously off-axis visual security level of the display may be increased for reduced ambient light levels in comparison to displays without the reflective polariser.

A diffusing surface structure may be provided on at least one of the at least one air gap input retarder and at least one air gap output retarder. Advantageously specular reflections at interfaces may be reduced.

The display device may further comprise at least one further retarder and a further additional polariser, wherein the at least one further retarder is arranged between the first-mentioned additional polariser and the further additional polariser. Advantageously the off-axis luminance may be further reduced in privacy mode in comparison to displays comprising a single additional polariser. Desirable visual security levels may be achieved using wide angle luminance output profiles from the spatial light modulator. Wide angle backlights may be used that may be manufactured with higher yields in comparison to collimated backlights. Emissive displays may be provided with switchable privacy functionality while achieving high visual security levels.

The display device may further comprise a backlight arranged to output light, wherein the spatial light modulator is a transmissive spatial light modulator arranged to receive output light from the backlight. The backlight may provide a luminance at polar angles to the normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator. Advantageously a further additional polariser may not be provided in order to achieve desirable visual security levels for off-axis snoopers. Display thickness, complexity and cost may be reduced.

The backlight may comprise: an array of light sources; a directional waveguide comprising: an input end extending in a lateral direction along a side of the directional waveguide, the light sources being disposed along the input end and arranged to input input light into the waveguide; and opposed first and second guide surfaces extending across the directional waveguide from the input end for guiding light input at the input end along the waveguide, the waveguide being arranged to deflect input light guided through the directional waveguide to exit through the first guide surface. The backlight may further comprise a light turning film and the directional waveguide is a collimating waveguide. The collimating waveguide may comprise: (i) a plurality of elongate lenticular elements; and (ii) a plurality of inclined light extraction features, wherein the plurality of elongate lenticular elements and the plurality of inclined light extraction features are oriented to deflect input light guided through the directional waveguide to exit through the first guide surface. The directional waveguide may be an imaging waveguide arranged to image the light sources in the lateral direction so that the output light from the light sources is directed into respective optical windows in output directions that are distributed in dependence on the input positions of the light sources. The imaging waveguide may comprise a reflective end for reflecting the input light back along the imaging waveguide, wherein the second guide surface is arranged to deflect the reflected input light through the first guide surface as output light, the second guide surface comprises light extraction features and intermediate regions between the light extraction features, the light extraction features being oriented to deflect the reflected input light through the first guide surface as output light and the intermediate regions being arranged to direct light through the waveguide without extracting it; and the reflective end has positive optical power in the lateral direction extending between sides of the waveguide that extend between the first and second guide surfaces. The display device may further comprise an input polariser arranged on the input side of the spatial light modulator. Advantageously low cost collimating backlights with low thickness may be provided.

The display device may further comprise a further additional polariser arranged on the input side of the spatial light modulator and at least one further retarder arranged between the at least one further additional polariser and the input polariser. Advantageously the thickness added to the front of the display may be reduced. No air gap input and output retarders may be provided for the at least one further retarder. The complexity of the retarder stack may be reduced, reducing thickness and cost.

The spatial light modulator may comprise an emissive spatial light modulator. Advantageously device thickness may be reduced.

According to a second aspect of the present disclosure there may be provided a view angle control optical element for application to a display device comprising a spatial light modulator and a display polariser arranged on the output side of the spatial light modulator, the view angle control optical element comprising a control polariser, being a linear polariser, and plural polar control retarders for arrangement between the control polariser and the display polariser on application of the view angle control optical element to the display device, wherein an air gap divides the plural polar control retarders into at least one air gap input retarder and at least one air gap output retarder, the at least one air gap input retarder being arranged to convert linearly polarised light passed by the display polariser into circularly polarised light, and the plural polar control retarders together being capable of simultaneously introducing no net, relative phase shift to orthogonal polarisation components of light passed by the display polariser along an axis along a normal to the plane of the plural polar control retarders and introducing a net, relative phase shift to orthogonal polarisation components of light passed by the display polariser along an axis inclined to a normal to the plane of the plural polar control retarders. A view angle control optical element may be provided that may be arranged with a spatial light modulator to achieve a switchable privacy display without bonding to advantageously reduce cost. A display comprising the view angle control element and an air gap can advantageously achieve high image contrast. The component can be added to curved displays with a different curvature to the spatial light modulator. Advantageously luminance uniformity may be increased.

Embodiments of the present disclosure may be used in a variety of optical systems. The embodiment may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
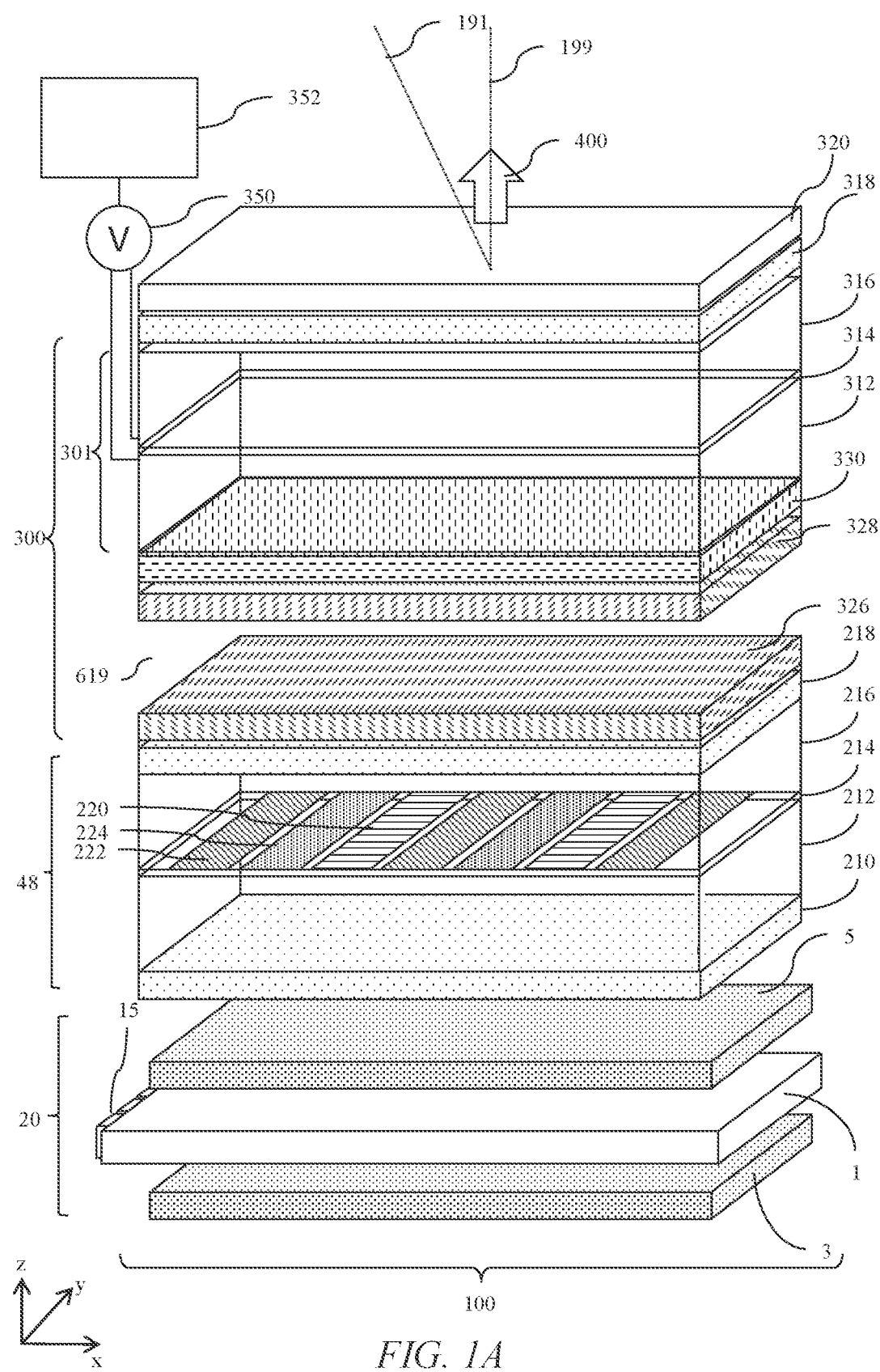
FIG. 1A is a schematic diagram illustrating in perspective side view a privacy display device comprising a transmissive spatial light modulator and backlight with an output quarter waveplate; an air gap; an input quarter waveplate, a switchable retarder stack and an additional polariser.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a relative phase shift between two orthogonal polarization components of the light wave incident thereon and is characterized by the amount of relative phase, Γ, that it imparts on the two polarization components. In some contexts, the term "phase shift" is used without the word "relative" but still meaning relative phase shift. The relative phase shift is related to the birefringence Δn and the thickness d of the retarder by:

$$\Gamma = 2 \cdot \pi \cdot \Delta n \cdot d / \lambda_0 \qquad \text{eqn. 1}$$

In eqn. 1, Δn is defined as the difference between the extraordinary and the ordinary index of refraction, i.e.

$$\Delta n = n_e - n_o \qquad \text{eqn. 2}$$

For a half-wave retarder, the relationship between d, Δn, and $\lambda_0$ is chosen so that the phase shift between polarization components is Γ=π. For a quarter-wave retarder, the relationship between d, Δn, and $\lambda_0$ is chosen so that the phase shift between polarization components is Γ=π/2.

The term half-wave retarder herein typically refers to light propagating normal to the retarder and normal to the spatial light modulator (SLM).

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive Δn. A 'negative C-plate' refers to a negatively birefringent C-plate, i.e. a C-plate with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with a retardance Δn·d that varies with wavelength λ as $$\Delta n \cdot d / \lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable LCDs where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in SLMs typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive SLMs may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y + K \cdot P \cdot L \qquad \text{eqn. 6}$$

The visual security level may then be further given as:

$$VSL = \frac{(C + I \cdot \rho / \pi \cdot (C+1)/(P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I \cdot \rho/(\pi \cdot P \cdot L) \quad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M = (I_{max} - I_{min})/(I_{max} + I_{min}) \quad \text{eqn. 9}$$

and so:

$$M = ((Y+R) - (K+R))/((Y+R) + (K+R)) = (Y-K)/(Y+K+2 \cdot R) \quad \text{eqn. 10}$$

Thus the visual security level (VSL), is equivalent (but not identical to) 1/M. In the present discussion, for a given off-axis relative luminance, P the wide angle image visibility, W is approximated as $$W = 1/VSL = 1/(1 + I \cdot \rho/(\pi \cdot P \cdot L)) \quad \text{eqn. 11}$$

Switchable directional display apparatuses for use in privacy display for example and comprising plural retarders arranged between a display polariser and an additional polariser are described in U.S. Pat. No. 10,126,575 and in U.S. Patent Publ. No. 2019-0086706, both of which are herein incorporated by reference in their entireties. Directional display apparatuses further comprising reflective polarisers arranged between the display polariser and retarders are described in U.S. Pat. No. 10,303,030 and in U.S. patent application Ser. No. 16/256,120 filed Jan. 24, 2019, both of which are herein incorporated by reference in their entireties. Directional display polarisers comprising passive retarders arranged between a display polariser and an additional polariser are described in U.S. Patent Publ. No. 2018-0321553, which is herein incorporated by reference in its entirety. Also herein incorporated by reference in their entireties are U.S. patent application Ser. No. 16/256,754 filed Jan. 24, 2019, U.S. Provisional Patent Appl. No. 62/756,902 filed Nov. 7, 2018, and U.S. Provisional Patent Appl. No. 62/844,980 filed May 8, 2019.

Figure 1B:
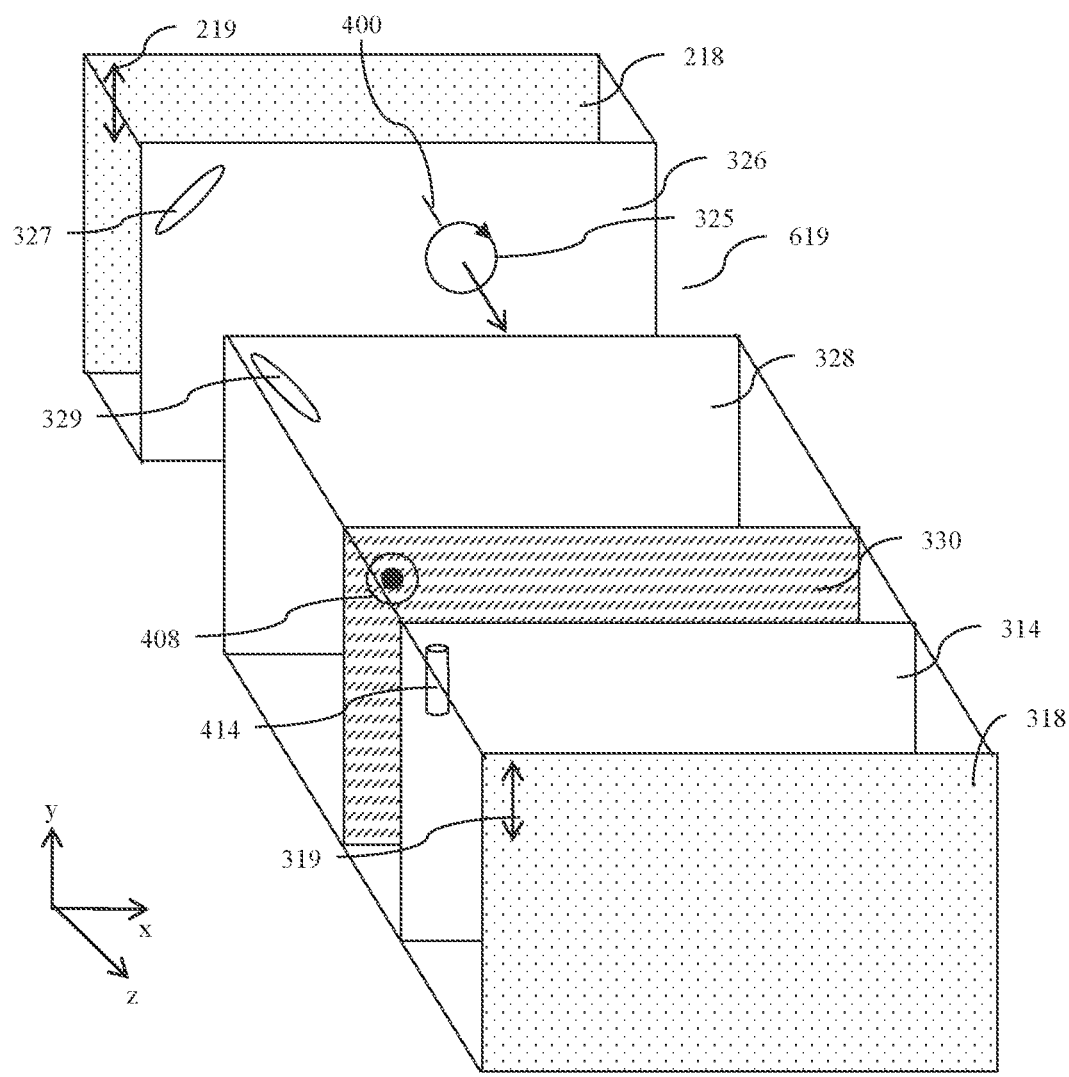
FIG. 1B is a schematic diagram illustrating in expanded view the arrangement of polarisers and retarders of FIG. 1.

FIG. 1A is a schematic diagram illustrating in perspective side view a privacy display device 100 comprising a spatial light modulator 48 with an air gap input quarter waveplate 326; an air gap 619; an air gap output quarter waveplate 328, a switchable retarder stack 300 and an additional polariser 318; and FIG. 1B is a schematic diagram illustrating in expanded view the arrangement of polarisers and retarders of FIG. 1.

The display device 100 comprises a spatial light modulator 48; a display polariser 218 arranged on the output side of the spatial light modulator 48, the display polariser 218 being a linear polariser; an additional polariser 318 arranged on the output side of display polariser 218, the additional polariser 318 being a linear polariser; and plural polar control retarders 300 arranged between the additional polariser 318 and the display polariser 218, wherein an air gap 619 divides the plural polar control retarders 300 into at least one air gap input retarder 326 between the display polariser 218 and the air gap 619 and at least one air gap output retarder 328 between the air gap 619 and the additional polariser 318, the at least one air gap input retarder 326 being arranged to convert linearly polarised light passed by the display polariser 218 into circularly polarised light 325, and the plural polar control retarders 300 together being capable of simultaneously introducing no net, relative phase shift to orthogonal polarisation components of light passed by the display polariser 218 along an axis 199 along a normal to the plane of the plural polar control retarders 326, 328, 330, 314 and introducing a net, relative phase shift to orthogonal polarisation components of light passed by the display polariser 218 along an axis 191 inclined to a normal to the plane of the plural polar control retarders 300.

In the privacy mode of operation the plural control retarders 300 and additional polariser 318 do not affect the luminance of light from the display polariser 218 passing through the retarders 300 and the additional polariser 318 along an axis 199 along a normal to the plane of the retarders 300 and simultaneously the retarders 300 and additional polariser 318 do reduce the luminance of light from the display polariser 218 passing therethrough along an axis inclined to a normal to the plane of the retarders 300, at least in one of the switchable states of the switchable retarder 301. The principles leading to this effect are described in greater detail below with reference to FIGS. 22A-26 and arise from the presence or absence of a net relative phase shift introduced by the retarders 300 to light along axes 191 that are angled differently with respect to the liquid crystal material of the retarders 300. A similar effect is achieved in all the devices described below.

The plural polar control retarders 300 include at least one passive retarder. In the embodiment of FIGS. 1A-1B retarders air gap input retarder 326, air gap output retarder 328, and passive polar control retarder 330 are passive retarders while retarder 314 is a switchable liquid crystal retarder. The plural polar control retarders 300 include a switchable liquid crystal retarder 301 comprising a layer 314 of liquid crystal material 414. The at least one passive polar control retarder 330 comprises a passive retarder having an optical axis perpendicular to the plane of the retarder.

The spatial light modulator 48 comprises a liquid crystal display comprising input polariser 210, output polariser 218 with substrates 212, 216, liquid crystal pixel layer 214 and red, green and blue pixels 220, 222, 224. In the case when the spatial light modulator 48 is a liquid crystal display, the input electric vector transmission direction 211 at the input polariser 210 provides an input polarisation component that may be transformed by the liquid crystal pixel layer 214 to provide output polarisation component determined by the electric vector transmission direction 219 of the output polariser 218.

Typical polarisers 210, 218, 318 may be linear polarisers such as dichroic polarisers.

FIG. 1B further illustrates that the retarders 326, 328, 330 have optical axis directions 327, 329, 408 respectively. The optical axis direction of the material 414 in the liquid crystal retarder layer 314 is determined by the voltage applied to the layer 314, as will be described further below.

The display device 100 further comprises a backlight 20 arranged to output light, wherein the spatial light modulator 48 is a transmissive spatial light modulator arranged to receive output light from the backlight 20.

Backlight 20 may be arranged to illuminate the spatial light modulator 48 and may comprise input light sources 15, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

In the present embodiments, the backlight 20 may be arranged to provide an angular light distribution that has reduced luminance for off-axis viewing positions in comparison to head-on luminance. A typical wide angle backlight has a roll-off at higher angles such that the full width half maximum of relative luminance may be preferably greater than 40°, more preferably greater than 60° and most preferably greater than 80°.

In the embodiment of FIG. 1A, the backlight 20 may provide a luminance at polar angles to the normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator. In an illustrative embodiment of FIG. 1A, the luminance at polar angles to the normal to the spatial light modulator greater than 45 degrees may be at most 18%.

In combination with the plural polar control retarders 300 and polariser 318, the luminance for off-axis snoopers in a privacy display may be provided at sufficiently low levels, for example less than 1% and preferably less than 0.5%. In typical operating environments with ambient illuminance to display head-on luminance ratio of 1 lux/nit advantageously a desirable visual security level can be achieved for high contrast images provided by the spatial light modulator 48.

Backlight 20 may further comprise a switchable backlight arranged to switch the output angular luminance profile in order to provide reduced off-axis luminance in a privacy mode of operation and higher off-axis luminance in a public mode of operation. Such a directional backlight provides some off-axis luminance reduction, advantageously increasing head-on efficiency and reducing display visibility and stray light for off-axis locations.

The spatial light modulator 48 may alternatively be provided by other display types that provide output light 400 by emission, such as organic LED displays (OLED), with output polariser 218 in which case backlight 20 is omitted as will be illustrated in FIG. 21 below.

The substrates 312, 316 of the switchable liquid crystal retarder 301 comprise electrodes arranged to provide a voltage across the layer 314 of liquid crystal material 414. Control system 352 is arranged to control the voltage applied by voltage driver 350 across the electrodes of the switchable liquid crystal retarder 301.

Retarder 300 comprises a switchable liquid crystal retarder 301 comprising a layer 314 of liquid crystal material, and substrates 312, 316 arranged between the reflective polariser 302 and the additional polariser 318. An illustrative example for the arrangement of FIG. 1A is given in TABLE 1. Retarder 300 further comprises a passive polar control retarder 330 as will be described further below.

TABLE 1

Active LC retarder 314

| Mode | Alignment layers | Pretilt/ deg | Δn.d/ nm | Δε | Voltage/ V |
|---|---|---|---|---|---|
| Wide | Homeotropic | 88 | 810 | −4.3 | 0 |
| Privacy | Homeotropic | 88 | | | 2.2 |

TABLE 2

| Layer | Orientation/° | Retarder | Retardance/nm |
|---|---|---|---|
| Polariser 218 | 0 | — | — |
| Retarder 326 | 45 | A-plate | +135 ($\lambda_o/4$) |
| Air gap 619 | | | |
| Retarder 328 | 135 | A-plate | +135 ($\lambda_o/4$) |
| Retarder 330 | 45 | Negative C-plate | −700 |
| Switchable LC 314 | | See TABLE 1 | |
| Polariser 318 | 0 | — | — |

Arrangements of plural polar control retarders 300 will now be described in further detail. Plural control retarders are described in U.S. Pat. No. 10,126,575 and in U.S. Patent Publ. No. 2018-0321553, both of which are herein incorporated by reference in their entireties.

In one alternative, the switchable liquid crystal retarder 301 may comprise two surface alignment layers disposed adjacent to the layer 413 of liquid crystal material 414 and on opposite sides thereof and each arranged to provide homeotropic alignment in the adjacent liquid crystal material. The layer 413 of liquid crystal material 414 of the switchable liquid crystal retarder 301 may comprise a liquid crystal material with a negative dielectric anisotropy. The layer 413 of liquid crystal material 414 may have a retardance for light of a wavelength of 550 nm in a range from 500 nm to 1000 nm, preferably in a range from 600 nm to 900 nm and most preferably in a range from 700 nm to 850 nm.

Where two surface alignment layers providing homeotropic alignment are provided, the at least one passive polar control retarder 330 may comprise a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm.

Alternatively, where two surface alignment layers providing homeotropic alignment are provided, the at least one passive polar control retarder 330 may comprise a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm. Advantageously, in this case increased field of view in public mode of operation may be provided. Further, zero voltage operation in public mode of operation may be provided, reducing power consumption.

In another alternative, the switchable liquid crystal retarder 301 may comprise two surface alignment layers disposed adjacent to the layer 413 of liquid crystal material 414 and on opposite sides thereof and each arranged to provide homogeneous alignment in the adjacent liquid crystal material. Advantageously in comparison to homeotropic alignment on opposite sides of the liquid crystal, increased resilience to the visibility of flow of liquid crystal material during applied pressure may be achieved.

The layer 413 of liquid crystal material 414 of the switchable liquid crystal retarder 301 may comprise a liquid crystal material with a positive dielectric anisotropy. The layer 413 of liquid crystal material 414 may have a retardance for light of a wavelength of 550 nm in a range from 500 nm to 900 nm, preferably in a range from 600 nm to 850 nm and most preferably in a range from 700 nm to 800 nm.

Where two surface alignment layers providing homogeneous alignment are provided, the at least one passive polar control retarder 330 may comprise a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm.

Alternatively, where the two surface alignment layers providing homogeneous alignment are provided, the at least one passive polar control retarder 330 may comprise a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm. Advantageously, in this case increased resilience to the visibility of flow of liquid crystal material during applied pressure may be achieved.

In another alternative, the switchable liquid crystal retarder 301 may comprise two surface alignment layers disposed adjacent to the layer 413 of liquid crystal material 414 and on opposite sides thereof, one of the surface alignment layers being arranged to provide homeotropic alignment in the adjacent liquid crystal material and the other of the surface alignment layers being arranged to provide homogeneous alignment in the adjacent liquid crystal material.

When the surface alignment layer arranged to provide homogeneous alignment is between the layer 413 of liquid crystal material 414 and the polar control retarder 330, the layer 413 of liquid crystal material 414 may have a retardance for light of a wavelength of 550 nm in a range from 700 nm to 2000 nm, preferably in a range from 1000 nm to 1500 nm and most preferably in a range from 1200 nm to 1500 nm.

When the surface alignment layer arranged to provide homogeneous alignment is between the layer 413 of liquid crystal material 414 and the polar control retarder 330, the at least one passive polar control retarder 330 may comprise a retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm.

When the surface alignment layer arranged to provide homogeneous alignment is between the layer 413 of liquid crystal material 414 and the polar control retarder 330, the at least one passive polar control retarder 330 may comprise a pair of retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

When the surface alignment layer arranged to provide homeotropic alignment is between the layer 413 of liquid crystal material 414 and the polar control retarder 330, the layer 413 of liquid crystal material 414 may have a retardance for light of a wavelength of 550 nm in a range from 500 nm to 1800 nm, preferably in a range from 700 nm to 1500 nm and most preferably in a range from 900 nm to 1350 nm.

When the surface alignment layer arranged to provide homeotropic alignment is between the layer 413 of liquid crystal material 414 and the polar control retarder 330, the at least one passive polar control retarder 330 may comprise a retarder having its optical axis perpendicular to the plane of the retarder, the at least one passive retarder having a retardance for light of a wavelength of 550 nm in a range from −300 nm to −1600 nm, preferably in a range from −500 nm to −1300 nm and most preferably in a range from −700 nm to −1150 nm.

When the surface alignment layer arranged to provide homeotropic alignment is between the layer 413 of liquid crystal material 414 and the passive polar control retarder 330, the at least one passive polar control retarder 330 may comprise a pair of retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm. Advantageously, in this case increased resilience to the visibility of flow of liquid crystal material during applied pressure may be achieved.

Each alignment layer may have a pretilt having a pretilt direction with a component in the plane of the liquid crystal layer that is parallel or anti-parallel or orthogonal to the electric vector transmission direction of the display polariser. Advantageously a display may be provided with narrow viewing angle in a lateral direction and a wide viewing freedom for display rotation about a horizontal axis. Such a display may be comfortable to view for a head-on display user and difficult to view for an off-axis display user.

The at least one passive retarder may comprise at least two passive retarders with at least two different orientations of optical axes which may have optical axes in the plane of the retarders that are crossed. Field of view for liquid crystal retarders with homogeneous alignment is increased while providing resilience to the visibility of flow of liquid crystal material during applied pressure.

The pair of passive retarders may have optical axes that extend at 45° and at 135°, respectively, with respect to an electric vector transmission direction that is parallel to the electric vector transmission of the display polariser. The passive retarders may be provided using stretched films to advantageously achieve low cost and high uniformity.

The switchable liquid crystal retarder 301 may be provided between the pair of passive retarders. Advantageously the thickness and complexity of the plural retarders may be reduced.

A transparent electrode and a liquid crystal alignment layer may be formed on a side of each of the pair of passive retarders adjacent the switchable liquid crystal retarder 301; and may further comprise first and second substrates between which the switchable liquid crystal retarder 301 is provided, the first and second substrates each comprising one of the pair of passive retarders, wherein each of the pair of passive retarders has a retardance for light of a wavelength of 550 nm in a range from 150 nm to 800 nm, preferably in a range from 200 nm to 700 nm and most preferably in a range from 250 nm to 600 nm.

In one alternative, the at least one passive polar control retarder 330 may comprise a retarder having an optical axis perpendicular to the plane of the retarder. Advantageously the thickness and complexity of the passive retarder stack may be reduced.

The at least one passive polar control retarder 330 may comprise two passive retarders having an optical axis perpendicular to the plane of the passive retarders, and the switchable liquid crystal retarder 301 is provided between the two passive retarders. Advantageously the thickness and complexity of the plural retarders may be reduced. High head-on efficiency may be achieved in both wide and privacy modes, a wide field of view for public mode and snoopers may be unable to perceive image data from a wide range of off-axis viewing locations.

A transparent electrode and a liquid crystal alignment layer may be formed on a side of each of the two passive retarders adjacent the switchable liquid crystal retarder 301. First and second substrates between which the switchable liquid crystal retarder 301 may be provided, the first and second substrates each comprising one of the two passive retarders. The two passive retarders may have a total retardance for light of a wavelength of 550 nm in a range from −300 nm to −700 nm, preferably in a range from −350 nm to −600 nm and most preferably in a range from −400 nm to −500 nm.

In another alternative, the at least one passive polar control retarder 330 may comprise a retarder having an optical axis with a component perpendicular to the plane of the retarder and with a component in the plane of the retarder. Advantageously fields of view in public mode may be increased and snoopers may be unable to perceive image data from a wide range of off-axis viewing locations.

The component in the plane of the passive retarder may extend at 0°, with respect to an electric vector transmission direction that is parallel or perpendicular to the electric vector transmission of the display polariser. The at least one passive retarder may further comprise a passive retarder having an optical axis perpendicular to the plane of the passive retarder or a pair of passive retarders which have optical axes in the plane of the passive retarders that are crossed.

The retardance of the at least one passive polar control retarder 330 may be equal and opposite to the retardance of the switchable liquid crystal retarder 301.

The switchable liquid crystal retarder 301 may comprise first and second pretilts; and the at least one passive polar control retarder 330 may comprise a polar control retarder 330 with first and second pretilts, the first pretilt of the polar control retarder 330 being the same as the first pretilt of the liquid crystal retarder and the second pretilt of the polar control retarder 330 being the same as the second pretilt of the liquid crystal retarder.

The switchable liquid crystal retarder 301 may further comprise electrodes arranged to apply a voltage for controlling the layer 413 of liquid crystal material 414. The electrodes may be on opposite sides of the layer 413 of liquid crystal material 414. The display may be switched by control of the liquid crystal layer, advantageously achieving a switchable privacy display, or other display with reduced off-axis stray light. The display may further comprise a control system arranged to control the voltage applied across the electrodes of the at least one switchable liquid crystal retarder 301.

It would be desirable to provide high contrast for on-axis image viewing of a switchable privacy display in both privacy and public modes of operation. Further it would be desirable to provide an air gap 619 between the spatial light modulator and other components in the optical system to achieve reduced cost and complexity of assembly.

The plural polar control retarders 300 further comprise: an air gap input retarder 326 comprising at least one retarder arranged between the display polariser 218 and the air gap 619; and an air gap output retarder 328 comprising at least one retarder arranged between the air gap 619 and the additional polariser 318.

The air gap input retarder 326 is arranged to provide a phase shift to provide a circularly polarised light component 325 in the air gap 619 of light passed by the display polariser 218 along an axis along a normal to the plane of the air gap input retarder 326.

In combination the plural polar control retarders 300 are capable of simultaneously introducing no phase shift to polarisation components of light passed by the display polariser 218 along an axis along a normal to the plane of the plural polar control retarders 300 and introducing a phase shift to polarisation components of light passed by the display polariser along an axis inclined to a normal to the plane of the plural polar control retarders 300. In the embodiment of FIGS. 1A-1B, the plural polar control retarders 300 comprise passive polar control retarder 330, switchable liquid crystal retarder 301 air gap input retarder 326 and air gap output retarder 328, but in general may be replaced by other configurations of at least one retarder, some examples of which are present in the devices described below. The retarders 300 do not affect the luminance of light passing through the reflective polariser 302, the retarders 300 and the additional polariser 318 along an axis along a normal to the plane of the retarders 300 but the retarders 300 do reduce the luminance of light passing therethrough along an axis inclined to a normal to the plane of the retarders 300, at least in one of the switchable states of the switchable retarder 301. The principles leading to this effect are described in greater detail below with reference to FIGS. 22A-26 and arises from the presence or absence of a phase shift introduced by the retarders 300 to light along axes that are angled differently with respect to the liquid crystal material of the retarders 300. A similar effect is achieved in all the devices described below.

The display device 100 may further comprise a further additional polariser 318 and further polar control retarders (not shown) 300 arranged on the input side of the transmissive spatial light modulator 48 and between the backlight 20 and the spatial light modulator. Advantageously the luminance may be further reduced for off-axis snoopers. Further, wide angle backlights may be used so that viewing angle in public mode of operation may be increased, as described further below with respect to FIG. 5 and FIG. 8.

A view angle control element will now be described.

Figure 1C:
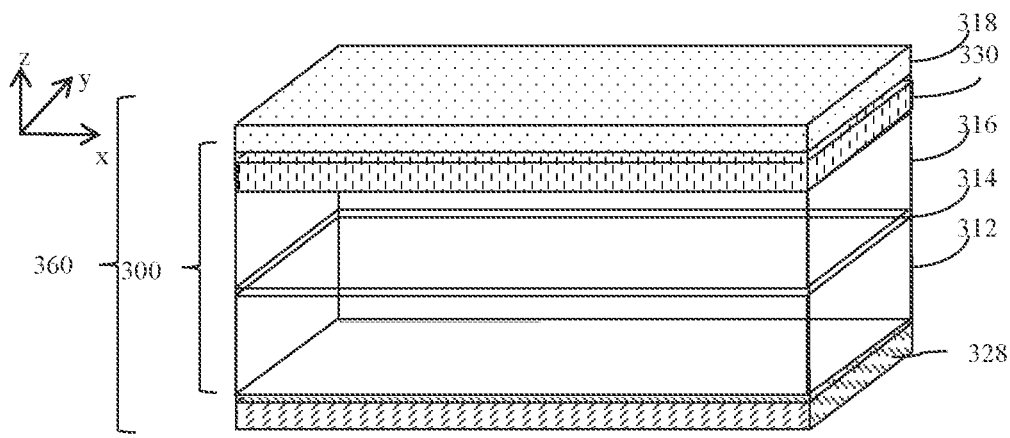
FIG. 1C is a schematic diagram illustrating in perspective side views components for use in the privacy display device of FIG. 1.

FIG. 1C is a schematic diagram illustrating in perspective side views components for use in the privacy display device of FIGS. 1A-1B.

A view angle control optical element 360 for application to a display device comprising a spatial light modulator 48 and a display polariser 218 arranged on the output side of the spatial light modulator 48, the view angle control optical element 360 comprising a control polariser 318, being a linear polariser, and plural polar control retarders 300 for arrangement between the control polariser 318 and the display polariser 218 on application of the view angle control optical element 360 to the display device, wherein an air gap 619 divides the plural polar control retarders 300 into at least one air gap input retarder 326 and at least one air gap output retarder 328, the at least one air gap input retarder 326 being arranged to convert linearly polarised light passed by the display polariser 218 into circularly polarised light 325, and the plural polar control retarders 300 together being capable of simultaneously introducing no net, relative phase shift to orthogonal polarisation components of light passed by the display polariser 218 along an axis 199 along a normal to the plane of the plural polar control retarders 300 and introducing a net, relative phase shift to orthogonal polarisation components of light passed by the display polariser along an axis 191 inclined to a normal to the plane of the plural polar control retarders 300.

Thus the air gap input retarder 326 may be arranged on the output of the display polariser 218, as illustrated in FIG. 1A and the view angle control element 360 comprises the air gap output retarder 328.

Advantageously a display apparatus may be fitted with a view angle control element 360 separately to the construction of the display. The fitting may be a retrofit. Image contrast due to frontal reflections for a head-on user may be optimised. Multiple spatial light modulators may be provided for a single view angle control element to increase display area. Thermal and mechanical variations between the spatial light modulator 48 and view angle control element 360 may be mitigated by using the air gap 619. Manufacturing yield may be increased in comparison to bonded optical components.

It may be desirable to increase the visual security level of a display for operation in an ambient illuminance environment.

Figure 2A:
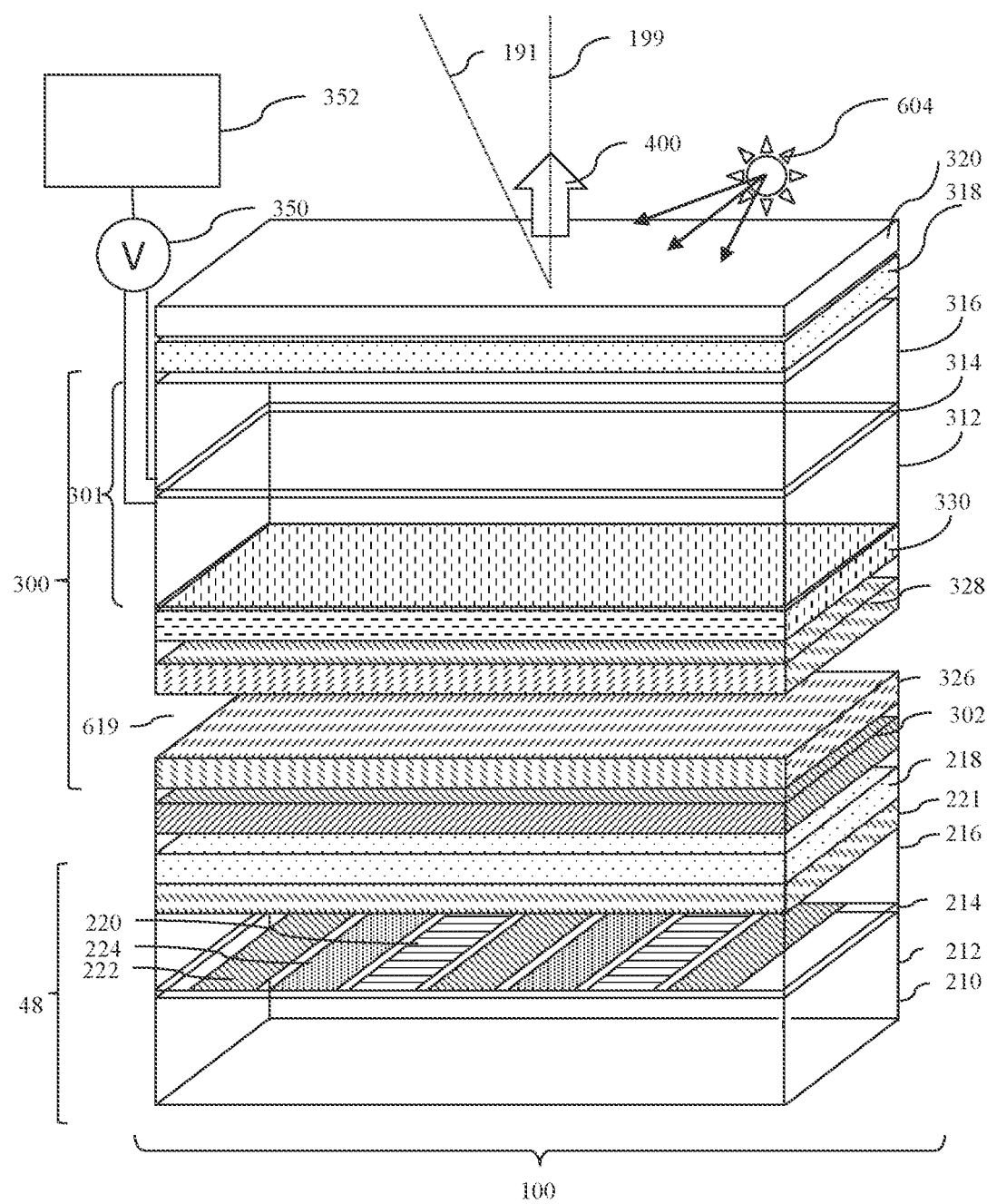
FIG. 2A is a schematic diagram illustrating in perspective side view a privacy display device comprising an emissive spatial light modulator with an output quarter waveplate; an air gap; an input quarter waveplate, a switchable retarder stack and an additional polariser, further comprising a reflective polariser.
Figure 2B:
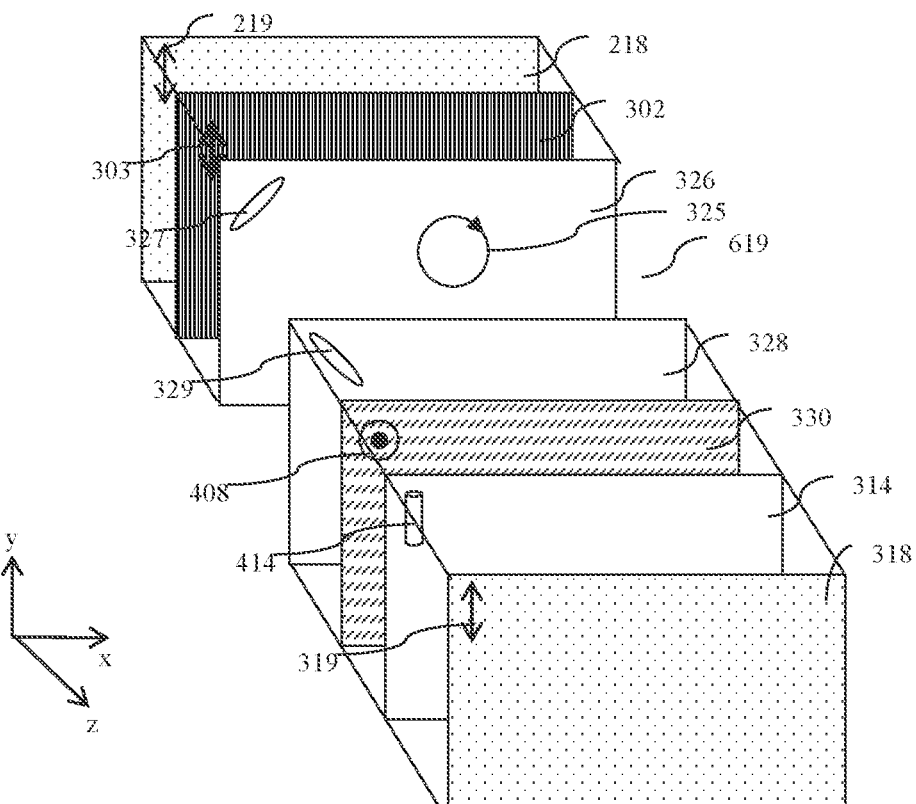
FIG. 2B is a schematic diagram illustrating in expanded view the arrangement of polarisers and retarders of FIG. 2A.

FIG. 2A is a schematic diagram illustrating in perspective side view a privacy display device comprising an emissive spatial light modulator with an output quarter waveplate; an air gap; an input quarter waveplate, a switchable retarder stack and an additional polariser, further comprising a reflective polariser; and FIG. 2B is a schematic diagram illustrating in expanded view the arrangement of polarisers and retarders of FIG. 2A.

In comparison to the arrangement of FIG. 1A, a reflective polariser 302 is arranged between the display polariser 218 and air gap input retarder 326, the reflective polariser 302 being a linear polariser.

The structure of FIG. 2A will now be described in more detail.

The spatial light modulator 48 of FIG. 2A comprises an emissive spatial light modulator in comparison to the transmissive spatial light modulator 48 and backlight 20 of FIG. 1A. The emissive spatial light modulator 48 may comprise emissive pixels 220, 222, 224 that comprise organic LED (OLED) materials and/or inorganic LED (micro-LED) materials. The pixel layer 214 may further comprise a reflective surface. Undesirable reflections from the reflective surface may be reduced by means of quarter waveplate 221 arranged between the reflective pixel layer 214 and output polariser 218. Advantageously device thickness may be reduced in comparison to the arrangement of FIG. 1A. In the case that the pixels 220, 222, 224 comprise micro-LEDs, output brightness may be increased.

The display device 100 comprises: a spatial light modulator 48 arranged to output light 400; wherein the spatial light modulator 48 comprises an output polariser 218 arranged on the output side of the spatial light modulator 48; an additional polariser 318 arranged on the output side of the output polariser 218; a reflective polariser 302 arranged between the output polariser 218 and the additional polariser 318; and plural polar control retarders 300 arranged between the reflective polariser 302 and the additional polariser 318. The electric vector transmission direction 303 of the reflective polariser 302 is parallel to the electric vector transmission direction 319 of the additional polariser 318. The electric vector transmission direction 303 of the reflective polariser 302 is parallel to the electric vector transmission direction 219 of the output polariser 218.

The display device may be arranged for use in ambient illumination 604.

Figure 2C:
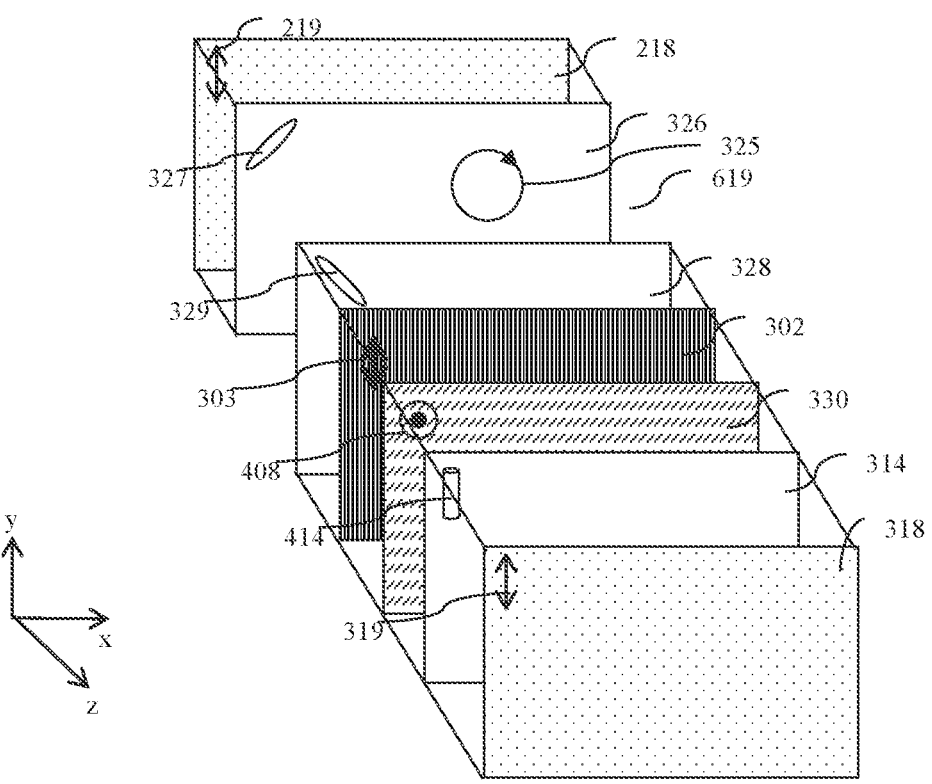
FIG. 2C is a schematic diagram illustrating in expanded view an alternative arrangement of polarisers and retarders for a switchable privacy display comprising a reflective polariser.

Features of the embodiment of FIGS. 2A-C not discussed in further detail may be assumed to correspond to the features with equivalent reference numerals as discussed above, including any potential variations in the features.

FIG. 2C is a schematic diagram illustrating in expanded view an alternative arrangement of display polarisers 218, plural polar control retarders 326, 328, reflective polariser, 302 plural polar control retarders 300 and additional polariser 318 for a switchable privacy display. In comparison to FIG. 2B, the reflective polariser is arranged on the output side of the air gap 619. A circular polarisation 325

The reflectivity of the display to ambient illumination 604 may be increased as will now be described.

Figure 3A:
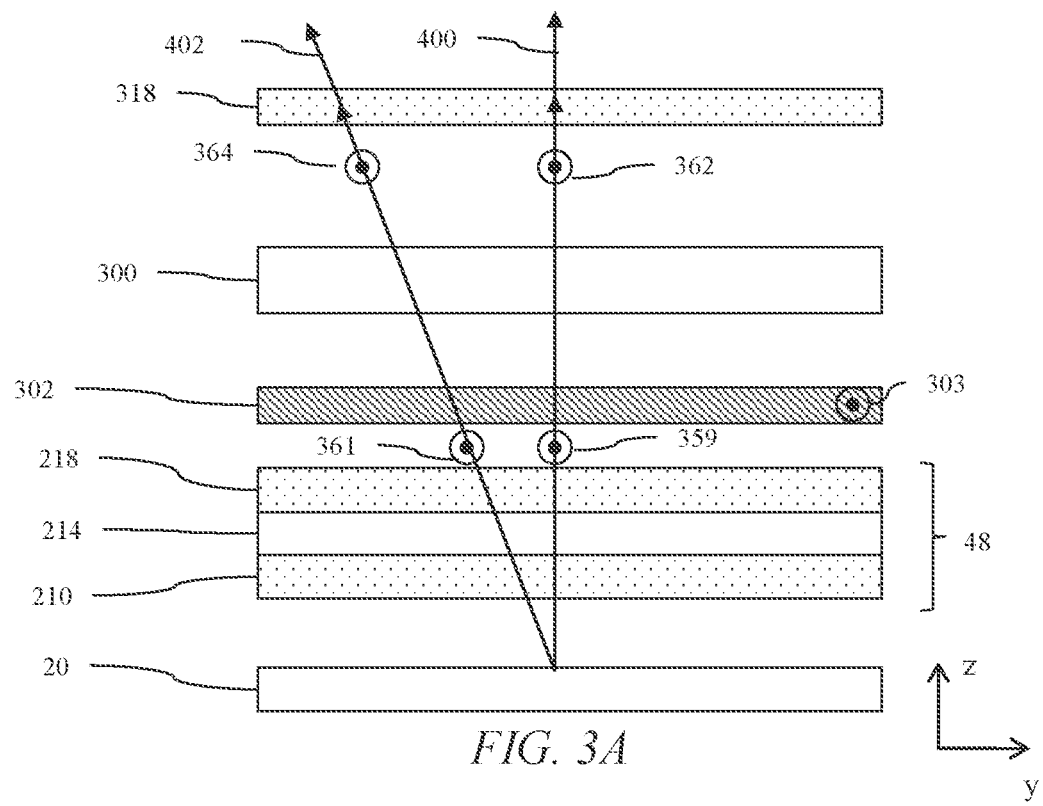
FIG. 3A is a schematic diagram illustrating in side view propagation of output light from a spatial light modulator through the optical stack of FIG. 1A in a public mode of operation.

FIG. 3A is a schematic diagram illustrating in side view propagation of output light from a spatial light modulator 48 through the optical stack of FIG. 1A in a public mode of operation.

In the public mode of operation, light rays 400, 402 emitted by the backlight 20 in an on-axis direction have a polarisation component 359 parallel to the electric vector transmission direction 219 of the output polariser 218 on exiting the spatial light modulator 48. The on-axis ray 400 then traverses the plural polar control retarders 300 to the linear polarisation 362 which is the same as component 359. In public mode, the switchable liquid crystal retarder 301 is in the off state where typically (but not necessarily) a voltage is not applied. In the case where the switchable liquid crystal retarder 301 has a positive dielectric anisotropy, the switchable liquid crystal retarder 301 therefore acts in a similar manner to an A-plate retarder in the first state.

The on-axis light ray 400 therefore experiences minimal retardation when passing through the plural polar control retarders 300. The combined effect off the plural polar control retarders 300 results in the on-axis light ray 400 exiting the plural polar control retarders 300 with the same or similar linear polarisation 362 to the linear polarisation 359 with which the on-axis light ray 400 entered the plural polar control retarders 300. This linear polarisation 362 is parallel to the electric vector transmission direction 319 of the additional polariser 318 and the on-axis ray 400 therefore exits the display device 100 with a relatively unchanged luminance.

In the public mode, the off-axis ray 402 traverses the plural polar control retarders 300 in a similar fashion to the on-axis ray 400. Polarisation 362 is substantially the same as polarisation 359 and polarisation 364 is substantially the same as polarisation 361. Thus the angular transmission profile is substantially uniformly transmitting across a wide polar region.

In other words, when the layer 314 of liquid crystal material 414 is in a first state of two states, the plural polar control retarders 300 provide no overall retardance to light passing therethrough perpendicular to the plane of the retarders or at an acute angle to the perpendicular to the plane of the plural polar control retarders 300.

Advantageously the variation of display luminance with viewing angle in the first state is substantially unmodified. Multiple users may conveniently view the display from a wide range of viewing angles.

Figure 3B:
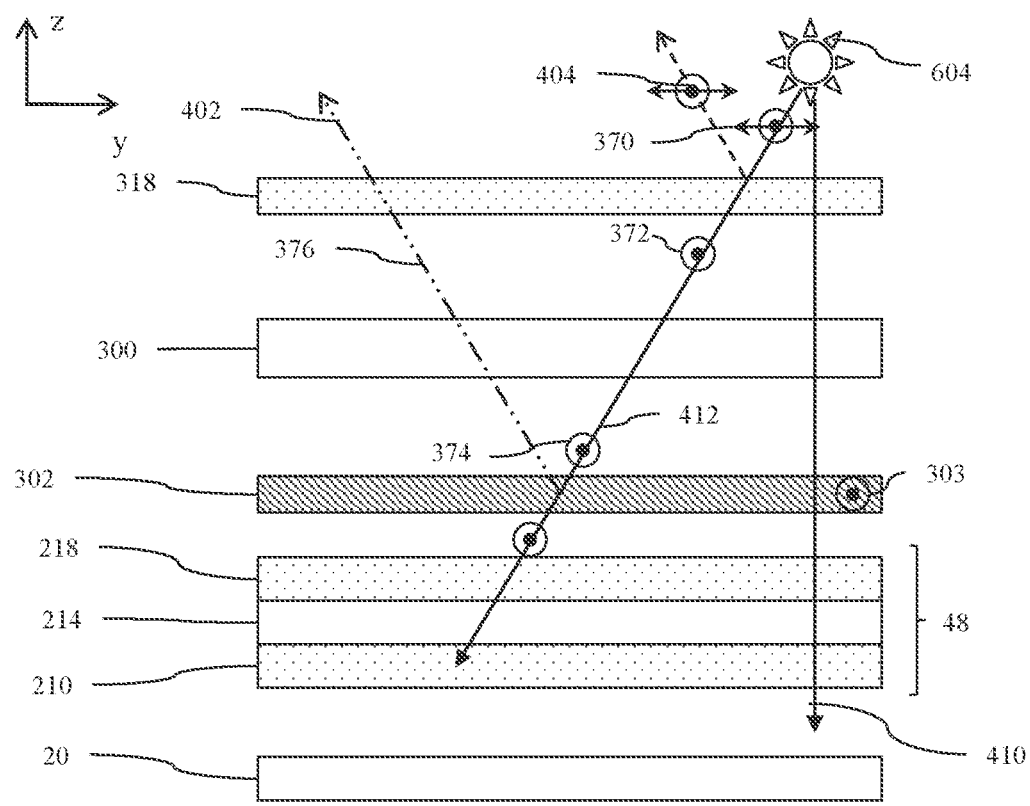
FIG. 3B is a schematic diagram illustrating in side view propagation of light rays from an ambient light source through the optical stack of FIG. 1A in a public mode of operation.

FIG. 3B is a schematic diagram illustrating in side view propagation of light rays from an ambient light source 604 through the optical stack of FIG. 1A in a public mode of operation.

The on-axis ray 410 of ambient light 604 traverses the plural polar control retarders 300 in a similar fashion to the on-axis ray 400 emitted from the backlight 20 discussed above. Although the on-axis ray 410 traverses the plural polar control retarders 300 in the reverse direction to the on-axis ray 400 emitted from the backlight 20, the traversal of the plural polar control retarders 300 in a reverse direction may not change the effect of the plural polar control retarders 300 on the light ray as discussed above for light emitted from the backlight 20. The on-axis ray 410 therefore reaches the backlight 20 where it may be absorbed or recirculated as emitted light 400 from the display device 100.

In a similar fashion, the off-axis ray 402 experiences no overall transformation of polarisation when passing through the plural polar control retarders 300. Ambient light 604 is unpolarised and the off-axis light ray initially has no polarisation 370. The additional polariser 318 passes the polarisation 372 that is parallel to the electric vector transmission direction 319 of the additional polariser. The additional polariser 318 absorbs the majority of the polarisation 372 that is perpendicular to the electric vector transmission direction 319 of the additional polariser. Some light is reflected from the front surface of the polariser 318 by Fresnel reflections at the outer air interface. After traversing the plural polar control retarders 300, the linear polarisation 374 of the off-axis ray 402 is therefore parallel to the electric vector transmission direction 303 of the reflective polariser 302 and the off-axis ray is not reflected but instead passes the reflective polariser 302 to reach the spatial light modulator 448 where it may be absorbed by the input polariser 210 or transmitted into the backlight 20.

Advantageously the display reflectance in the public mode is reduced across a wide range of viewing angles. Multiple users may conveniently view the display from a wide range of viewing angles with high image contrast.

Figure 3C:
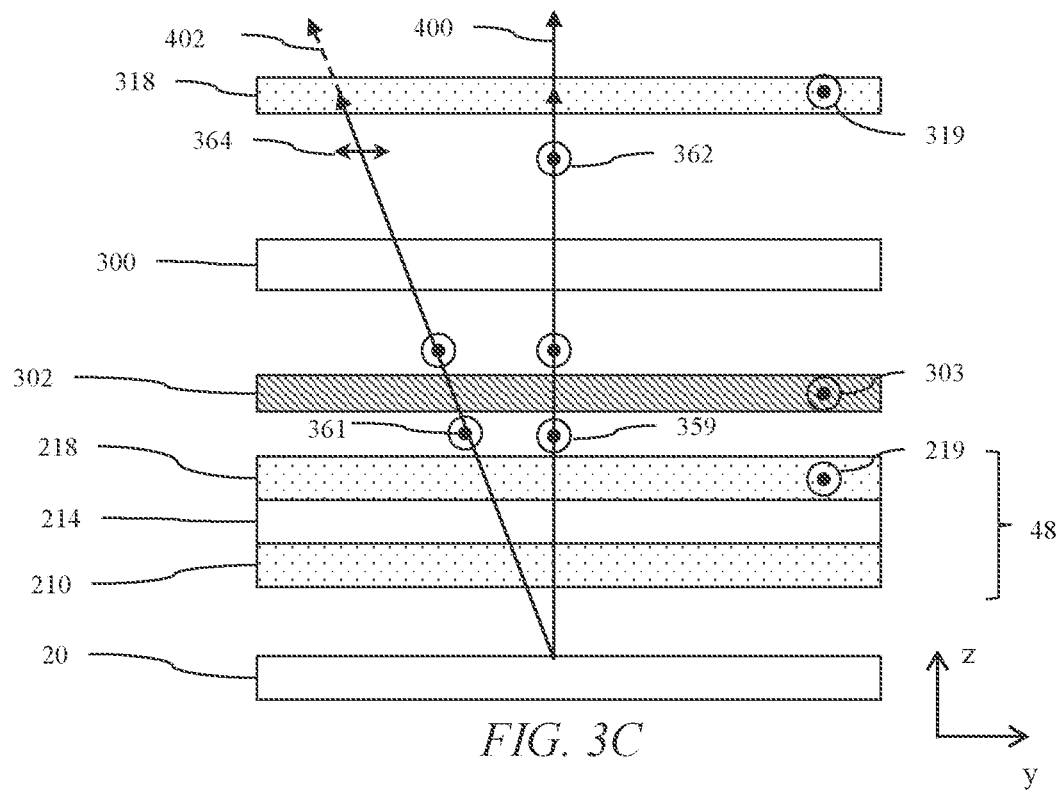
FIG. 3C is a schematic diagram illustrating in side view propagation of output light from a spatial light modulator through the optical stack of FIG. 1A in a privacy mode of operation.

FIG. 3C is a schematic diagram illustrating in side view propagation of output light from a spatial light modulator 48 through the optical stack of FIG. 1A in a privacy mode of operation.

In the privacy mode, the switchable liquid crystal retarder 301 is in the on state where a voltage is applied to the liquid crystal layer 314. The switchable liquid crystal retarder 301 may therefore be in the second state of the said two states. The on-axis light ray 400 experiences no retardation when passing and has the same polarisation as the linear polarisation 362 after traversing the plural polar control retarders 300. The on-axis ray 400 therefore exits the display via the additional polariser 318 with a largely unchanged luminance in the privacy mode of operation.

Off-axis light rays 402 emitted from the backlight 20 experience a transformation of polarisation when passing through plural polar control retarders 300. This is because of the acute angle of entry of the off-axis light ray 402, as discussed in further detail herein. The off-axis light ray 402 therefore arrives at the additional polariser 318 with a linear polarisation 364 that has polarisation components that have a relative phase shift. The linear polarisation 364 has at least some perpendicular component to the electric vector transmission direction 319 of the additional polariser 318 and the luminance of the off-axis light ray 402 is therefore reduced compared to the on-axis ray 400.

Advantageously the display luminance at wide viewing angles may be reduced in the second state. Snoopers may therefore be prevented from viewing the image emitted by the display device 100 at wide viewing angles. Stray light may be reduced in night-time operation while the head-on user may see an image.

Figure 3D:
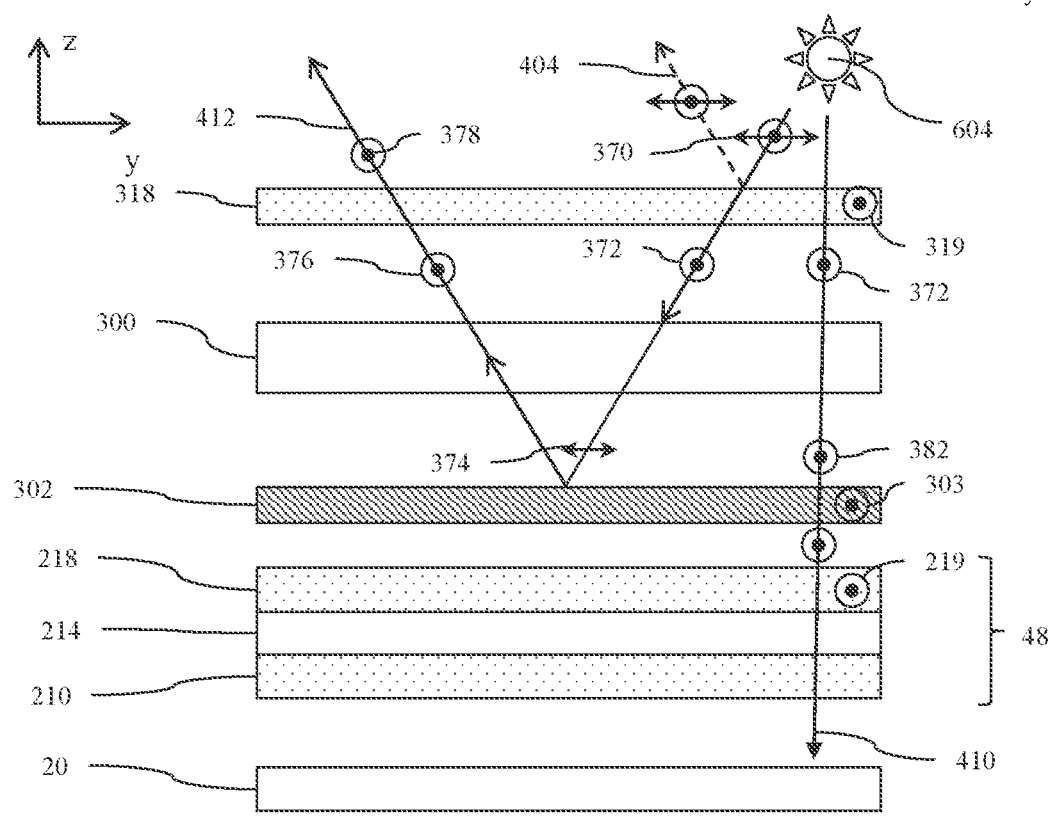
FIG. 3D is a schematic diagram illustrating in side view propagation of light rays from an ambient light source through the optical stack of FIG. 1A in a privacy mode of operation.

FIG. 3D is a schematic diagram illustrating in side view propagation of light rays from an ambient light source 604 through the optical stack of FIG. 1A in a privacy mode of operation.

In privacy mode operation, incident on-axis light rays 410 from the ambient light source 604 traverse the plural polar control retarders 300 in a similar fashion to the on-axis ray 400 emitted from the backlight 20 as described in relation to FIG. 3C. Although the on-axis ray 410 traverses the plural polar control retarders 300 in the reverse direction to the on-axis ray 400 emitted from the backlight 20, the direction of traversal of the plural polar control retarders 300 into or out of the display does not change the effect of the plural polar control retarders 300 on the light ray as discussed for light emitted from the backlight 20. The on-axis ray 410 therefore reaches the backlight 20 where it may be absorbed or recirculated as emitted light 400 from the display device 100.

In contrast to this, off-axis light rays 412 emitted from the backlight 20 experience a transformation of polarisation when passing through the plural polar control retarders 300. This is because of the acute angle of entry of the off-axis light ray 412, as discussed in further detail below. The off-axis light ray 412 therefore arrives at the reflective polariser 302 with a linear polarisation 374 that is at least partially rotated when compared to the linear polarisation 372. The linear polarisation 374 has at least some perpendicular component to the electric vector transmission direction 303 of the reflective polariser 302 and is therefore at least partially reflected by the reflective polariser 302. The ray 412 then traverses the plural polar control retarders 300 in the reverse direction, reversing the polarisation conversion from the first pass of the plural polar control retarders 300 and resulting in a polarisation 376 that is parallel to the electric vector transmission direction of the additional polariser 318. The off-axis ray 412 therefore leaves the display device 100 with polarisation 378, resulting in the stack appearing as a mirror when viewed from a wide angle. The additional polariser 318 absorbs the majority of the polarisation 372 that is perpendicular to the electric vector transmission direction 319 of the additional polariser, but may reflect a small proportion of the perpendicular component 404.

Advantageously the reflectance at wide viewing angles may be increased in the second state. Snoopers may therefore be prevented from viewing the image emitted by the display device 100 at wide viewing angles due to the reflected light reducing the contrast of the image being emitted by the display device, and so increasing visual security level, VSL as described in equation 4, above due to increased reflectivity, R.

The operation of the air gap input retarder 326 and air gap output retarder 328 will now be described.

Figure 4A:
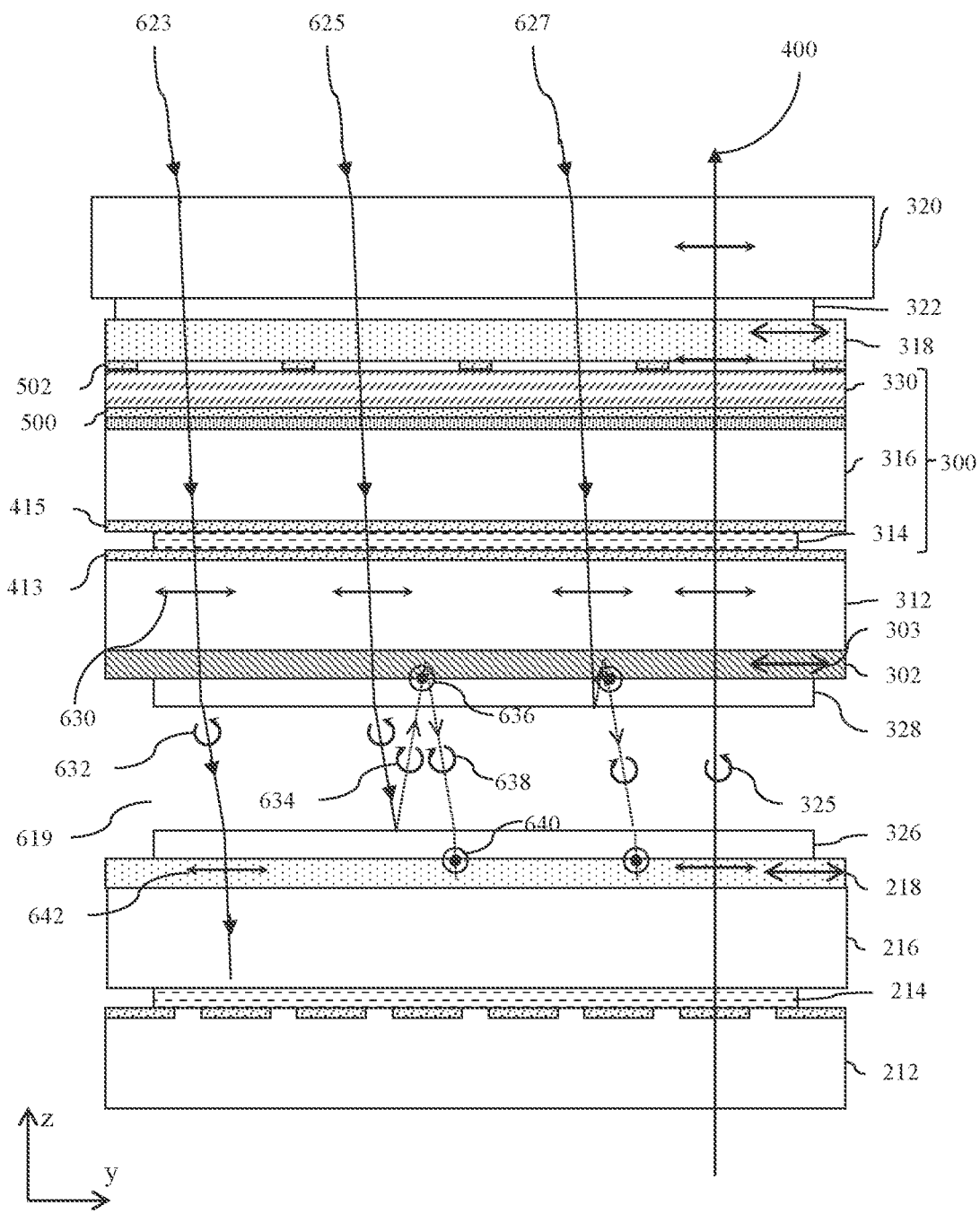
FIG. 4A and FIG. 4B are schematic diagrams illustrating in side views surface reflections in a privacy display device comprising a pair of quarter waveplates arranged on opposite sides of an air gap.
Figure 4B:
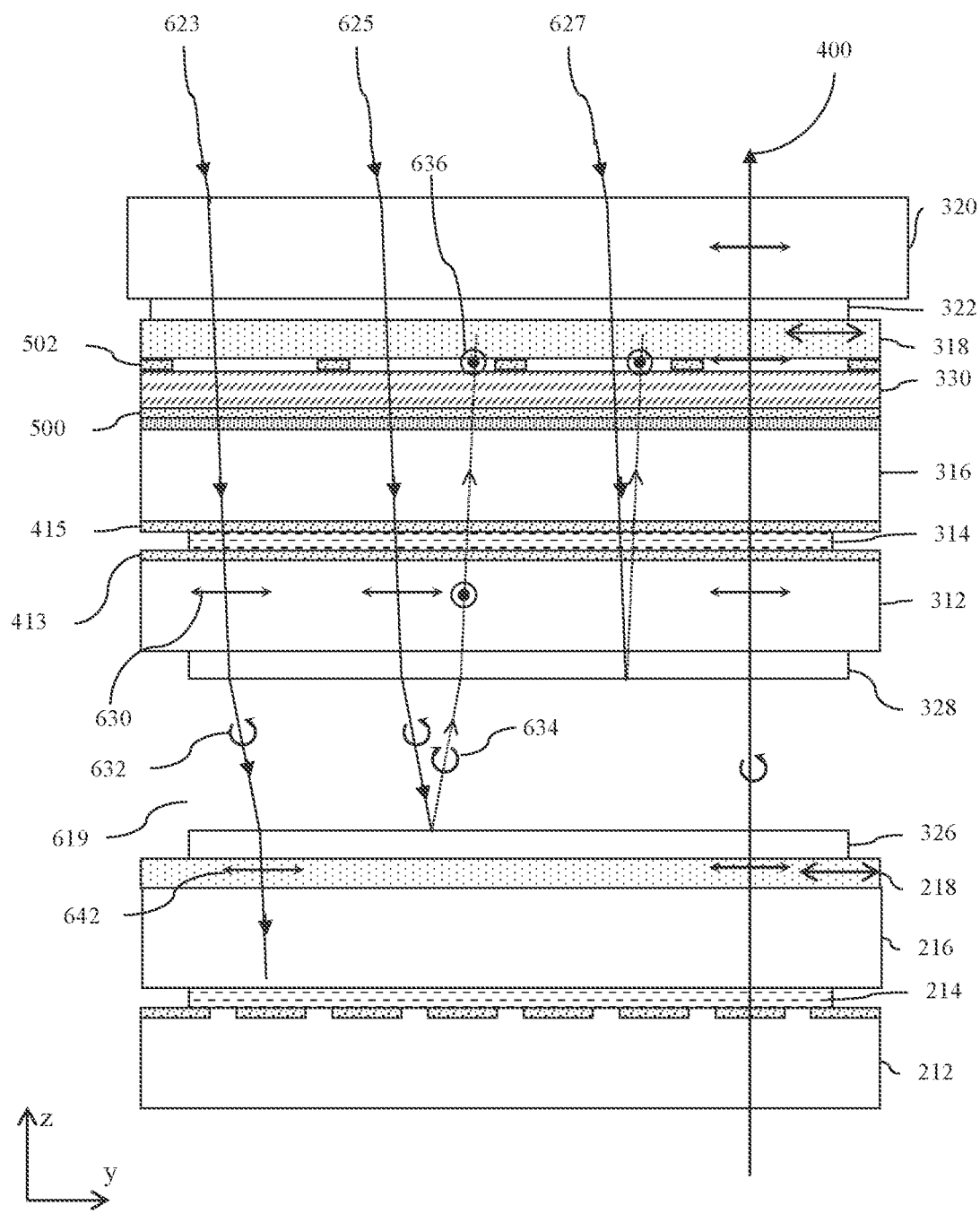

FIGS. 4A-B are schematic diagrams illustrating in side views surface reflections in a privacy display device 100 comprising a pair of quarter waveplates 326, 328 arranged on opposite sides of an air gap.

FIG. 4A illustrates the propagation of circularly polarised light for the arrangement of FIG. 2C. However the principles of operation of reflection reduction at the air gap 619 interfaces are common in the present embodiments.

The air gap input retarder 326 is arranged on one side of the air gap 619 and air gap output retarder 328 is arranged on the opposite side of the air gap 619 and comprise respectively quarter waveplates.

The first and second quarter waveplates of the air gap input and output retarders 326, 328 have optical axes that are crossed; and light 400 from the spatial light modulator 48 has a polarisation that undergoes equal and opposite phase shifts in the first and second crossed retarders 326, 328.

In operation on-axis ambient light rays 623 are incident onto the reflective polariser 302 with a polarisation 630 that is substantially linear after transmission through the passive polar control retarder 330 and switchable liquid crystal layer 314. The polarisation 630 is parallel to the transmission electric vector direction of the reflective polariser 302 and is transmitted into the quarter waveplate of retarder 328 and undergoes a quarter wave phase shift to provide left circular polarisation 632.

Quarter waveplate of retarder 328 provides an opposite phase shift for transmitted light ray 623 such that light is transmitted by polariser 218 and absorbed in the input polariser 210 or backlight 20 in the example of an LCD, or is extinguished by an optical isolator in the example of an OLED display.

For output light rays 400, the opposite retarders 326, 328 also cancel each other, advantageously achieving high output efficiency.

As illustrated by ambient light rays 625 some of the light at the interface of the quarter waveplate retarder 326 to air gap 619 undergoes a Fresnel reflection at which it undergoes a phase shift providing right circular polarisation 634 that is incident onto quarter waveplate retarder 328 and converted to linear polarisation 636 that is reflected at the reflective polariser 302 that is orthogonal to component 630. Such polarisation is phase shifted to output right circular polarisation 638 that is incident on quarter waveplate of retarder 326 that is phase shifted to linear polarisation state 640 that is extinguished by the display polariser 218.

Further as illustrated by ambient light rays 627, Fresnel reflections from the interface of the waveplate of retarder 328 are absorbed in a similar manner at the display polariser 218.

Advantageously a display with high on-axis contrast and low off-axis contrast may be provided while providing an air gap to increase yield and reduce cost and complexity of assembly.

FIG. 4B differs from FIG. 4A in that reflective polariser 302 is omitted, as illustrated in FIG. 1A.

The operation of the quarter waveplates 326, 328 is similar to that of FIG. 4A, other than the reflective polariser 302 is omitted so that the Fresnel reflections are absorbed in additional polariser 318 rather than reflected from reflective polariser 302. Advantageously a display with high on-axis contrast and low off-axis luminance may be provided while providing an air gap to increase yield and reduce cost and complexity of assembly.

FIGS. 4A-B further illustrate that electrodes 500, 502 of a touch screen apparatus may be provided on the passive polar control retarder 330. Advantageously a compact touch screen apparatus with low reflectivity may be provided.

Features of the embodiment of FIGS. 4A-B not discussed in further detail may be assumed to correspond to the features with equivalent reference numerals as discussed above, including any potential variations in the features.

By way of comparison with the present embodiments, the operation of a display with no air gap input retarder 326 and air gap output retarder 328 will now be described.

Figure 4C:
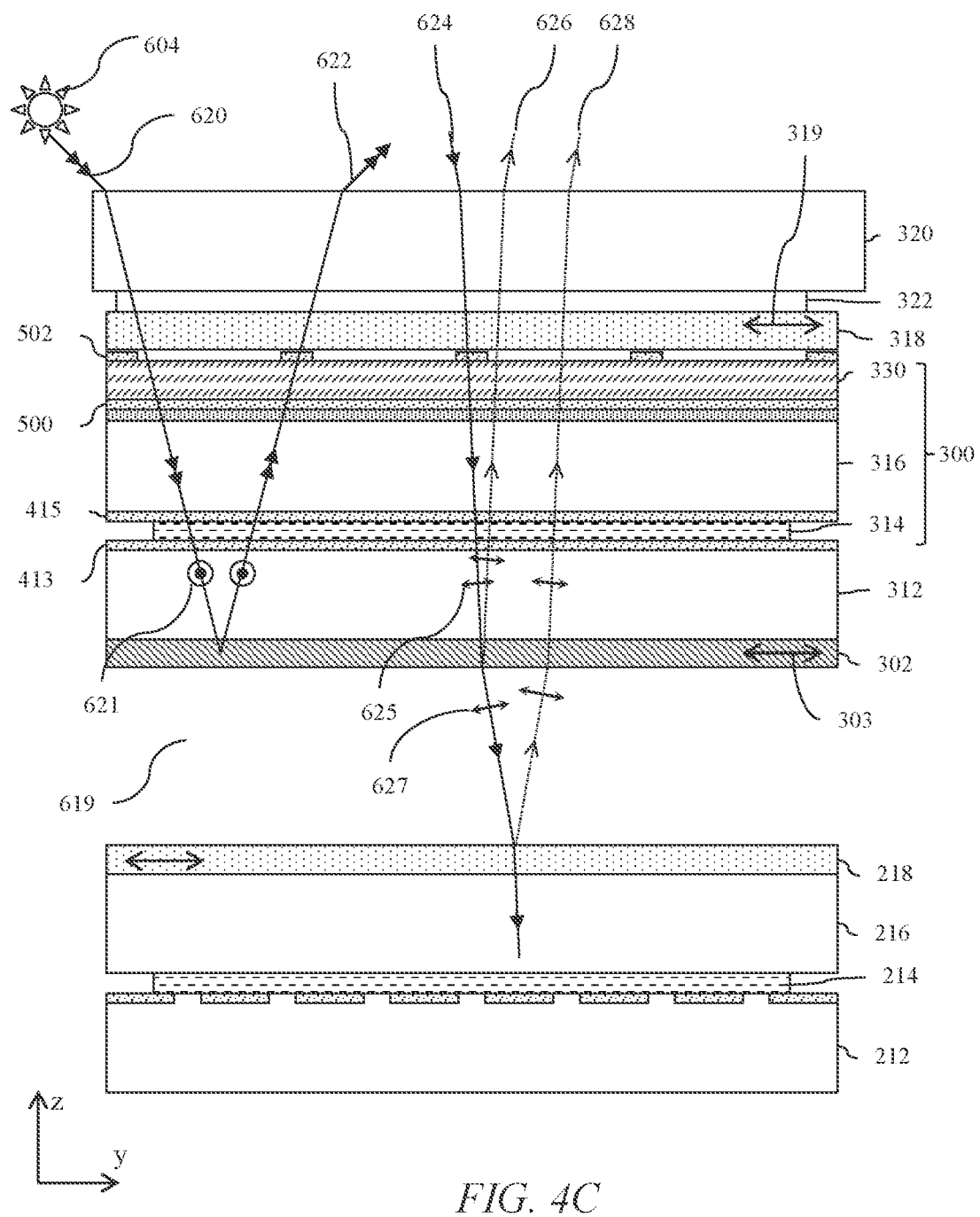
FIG. 4C is a schematic diagram illustrating in a side view surface reflections in a privacy display device with no pair of quarter waveplates.

FIG. 4C is a schematic diagram illustrating in a side view surface reflections in a privacy display device with no pair of quarter waveplates.

In operation in privacy mode, off-axis light rays 620 from external light source 604 are directed through the substrate 320 and directed through the retarders 300 towards the reflective polariser 302, at which the polarisation state 621 has polarisations that are orthogonal to the transmission direction of the reflective polariser 302.

Air gap 619 provides Fresnel reflections at the air interfaces of the reflective polariser 302 and display polariser 218, as illustrated by rays 626, 628 that degrade contrast for the on-axis user. An index matched interface may be provided but reduces yield during manufacture.

It would be desirable to provide a public mode of operation that has very wide viewing freedom. Such displays are desirable for large area displays viewed from relatively short viewing distances such as computer monitors for example. The backlight of FIG. 1A may have a FWHM of less than 30 degrees, however desirably such displays have a FWHM of greater than 50 degrees.

Switchable privacy displays may be provided with high visual security level in privacy mode and wide viewing freedom in privacy mode by stacking more than one plural retarder 300 and additional polariser 318 as will be described below.

It would be further desirable to provide a public mode with a wide viewing freedom. Such wide viewing freedom can be achieved from an emissive spatial light modulator 48 or a wide angle backlight 20 and transmissive spatial light modulator 48 as illustrated in FIG. 1A. With such displays, to achieve desirable visual security level more than one view angle control element 360 may be arranged with the display. Such a display can be expensive to assemble as a single bonded stack and so additional air gaps between component parts of the stack are desirable. It would be desirable to achieve high image contrast for such stacks of components for a head-on user in both privacy and public modes of operation.

Figure 5:
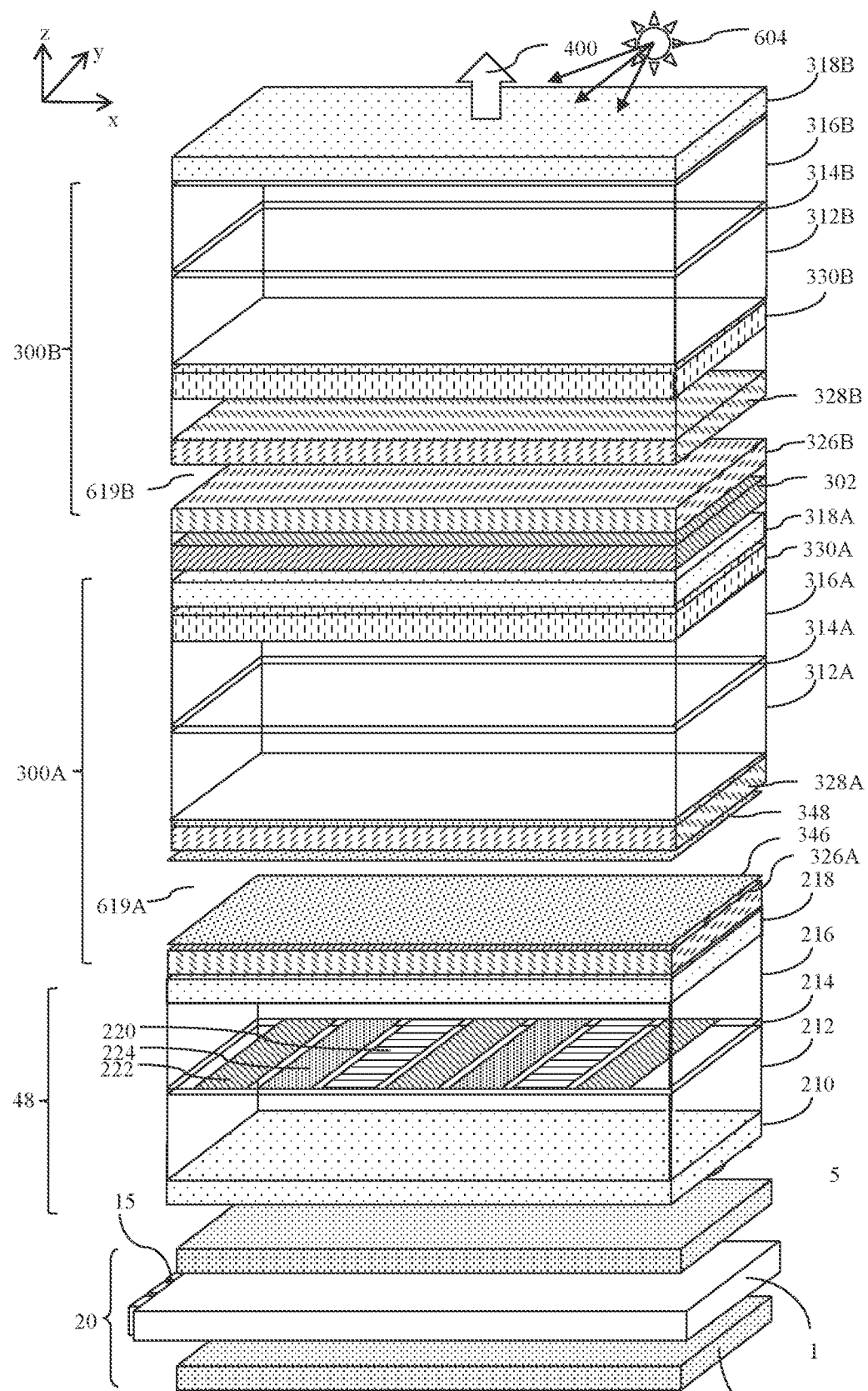
FIG. 5 is a schematic diagram illustrating in perspective side view a privacy display device comprising a spatial light modulator, first and second pairs of quarter waveplates, first and second switchable retarder stacks and an additional polariser and further additional polariser wherein the switchable retarder stacks comprise compensation retarders that are negative C-plates.
Figure 6:
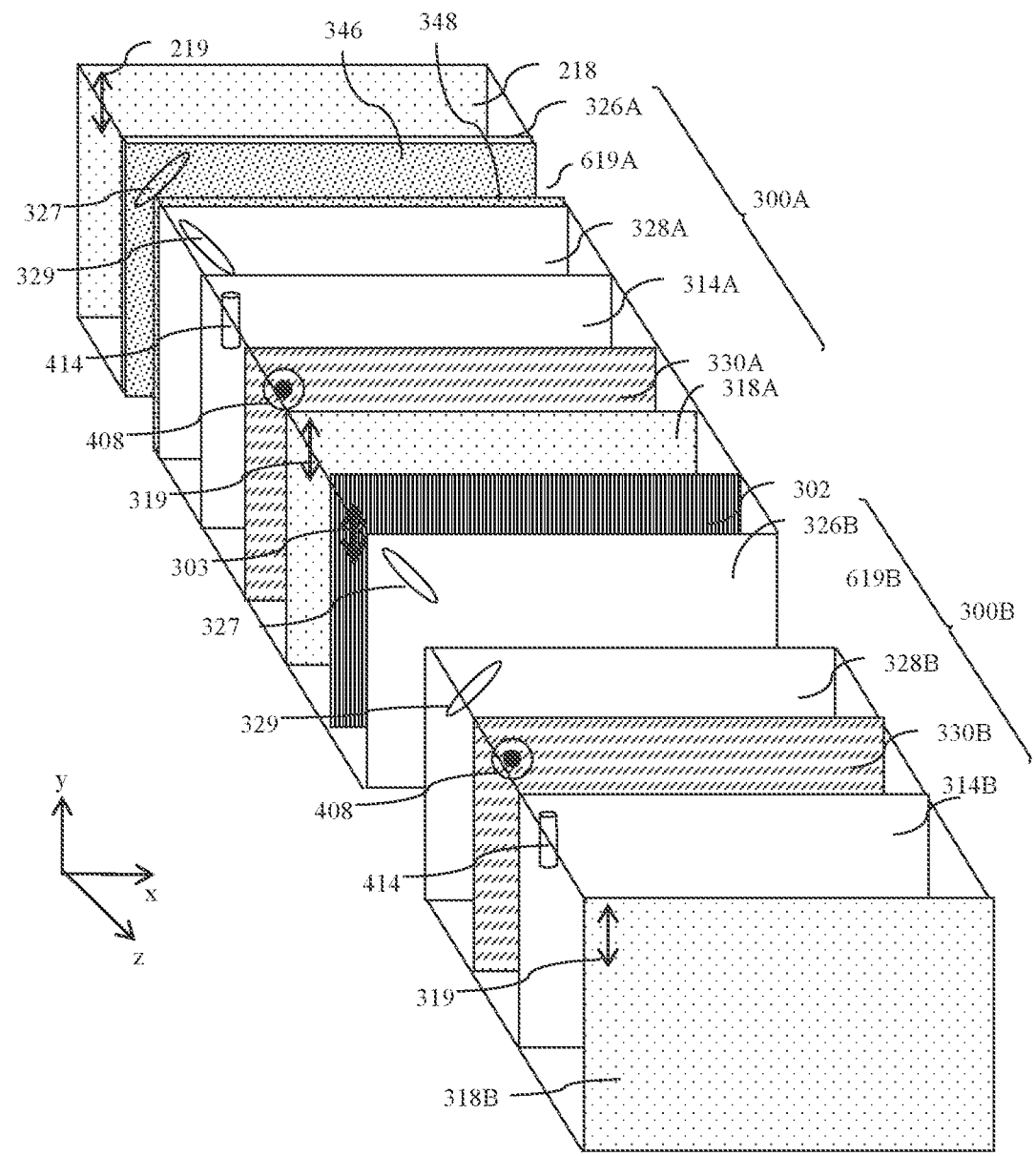
FIG. 6 is a schematic diagram illustrating in expanded view the arrangement of polarisers and retarders of FIG. 5.

FIG. 5 is a schematic diagram illustrating in perspective side view a privacy display device 100 comprising a spatial light modulator 48, first and second plural polar control retarders 300A, 300B, an additional polariser 318A and further additional polariser 318B; and FIG. 6 is a schematic diagram illustrating in expanded view the arrangement of polarisers and retarders of FIG. 5. Air gap 619A is arranged between the spatial light modulator 48 and additional polariser 318A, and a second air gap 619B is arranged between the additional polariser 318A and further additional polariser 318B.

The display device 100 thus further comprises a first-mentioned retarder 300A, a first-mentioned polariser 318A, at least one further retarder 300B and a further additional polariser 318B, wherein the at least one further retarder 300B is arranged between the first-mentioned polariser 318A and the further additional polariser 318B.

In an illustrative embodiment, the structure of the retarders 300A, 300B are each the same as the structure of the retarders 300 in FIG. 1A and illustrated in TABLES 1-2.

In comparison to the arrangement of FIG. 1A, a backlight 20 with wide field of view may be provided for a transmissive spatial light modulator 48, or a wide field of view emissive spatial light modulator 48 may be provided.

The display 100 may comprise a non-collimated (wide angle) backlight 20. Non-collimated backlights 20 may have reduced sensitivity to tooling and replication errors and may advantageously have reduced cost. Advantageously the present embodiment may achieve very wide viewing angle and image uniformity in a public mode of operation, while having reduced assembly cost and complexity.

The off-axis luminance may be increased, advantageously improving the image visibility to off-axis viewers in public mode. Further, the contrast for the head-on and off-axis users may be improved in public mode of operation. In privacy mode of operation, the contrast for the head-on user may be increased because reflections at air gaps are reduced. Further, the number of bonding steps during manufacture may be reduced and the yield increased.

The embodiment of FIGS. 5-6 further illustrate that a diffuser structure may be used. A diffusing surface 346, 348 structure is provided on the air gap input retarder 326 and the air gap output retarder 328. Diffuser surfaces 346, 348 may be applied to at least some of the air gap input and output retarders 326A, 326B. The diffuser surfaces 346, 348 may be embossed structures formed on the retarders. Diffusers (not shown) may also be formed on the further additional polariser 318B and other layers within the structure such as retarders 326B, 328B. Advantageously the visibility of residual specular frontal reflections may be improved.

For each air gap 619A, 619B air gap input retarders 326A, 326B and air gap output retarders 328A, 328B are arranged on opposite sides of the respective gap. The operation of the retarders for each gap is as illustrated above. Features of the embodiment of FIGS. 5-6 not discussed in further detail may be assumed to correspond to the features with equivalent reference numerals as discussed above, including any potential variations in the features.

Figure 7:
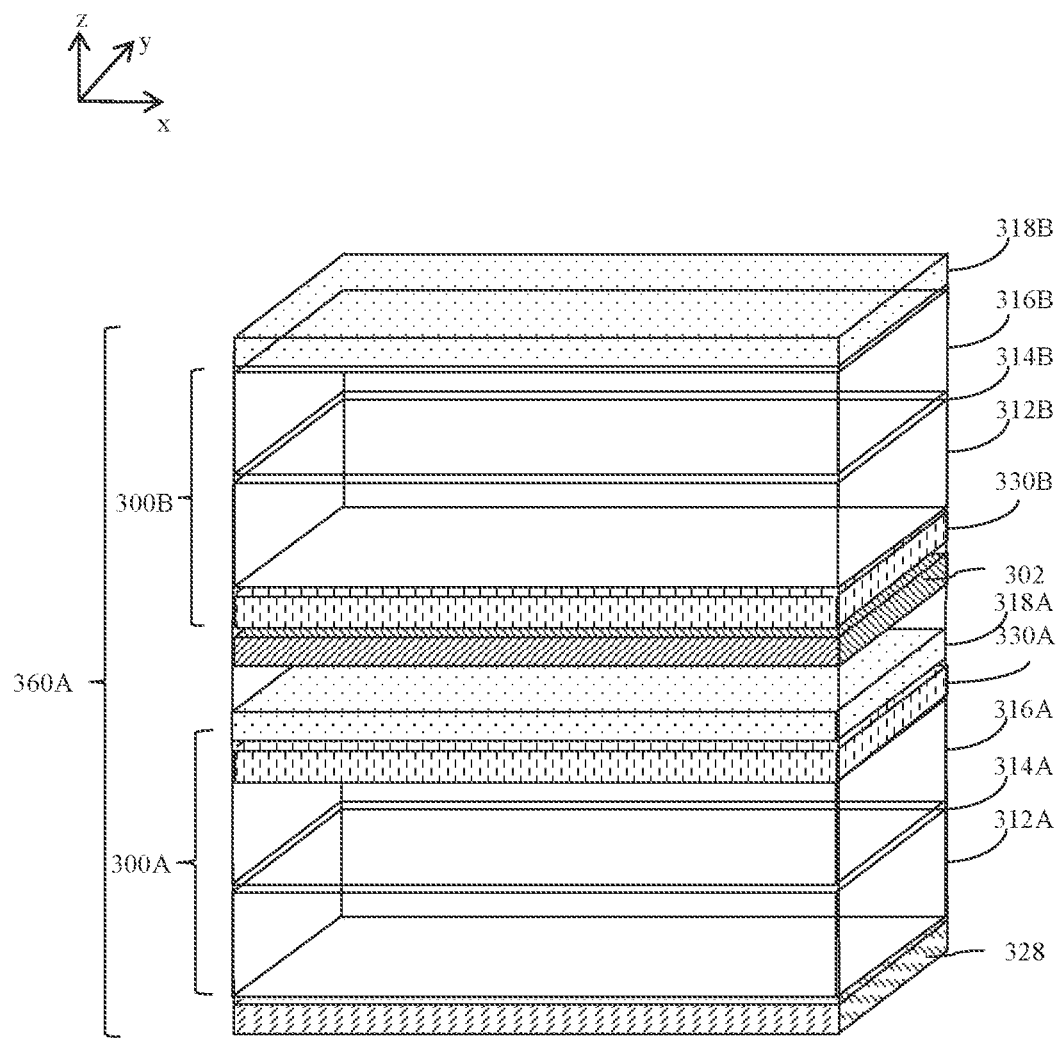
FIG. 7 is a schematic diagram illustrating in perspective side views components for use in the privacy display device of FIG. 5.

FIG. 7 is a schematic diagram illustrating in perspective side views a view angle control element 360 for use in the privacy display device similar to FIGS. 5-6. Features of the embodiment of FIG. 7 not discussed in further detail may be assumed to correspond to the features with equivalent reference numerals as discussed above, including any potential variations in the features.

In comparison to FIGS. 5-6, the second input air gap retarder 326B and air gap output retarder 328B are omitted, and the structure is bonded. Input retarder 328 is provided to the component 360 as an air gap output retarder for an air gap between the component and an air gap input retarder 326 arranged on the output polariser 218 of a spatial light modulator 48 (not shown).

Advantageously a high contrast switchable privacy display can be provided at low cost with a wide angle public mode and high visual security level for off-axis snoopers in privacy mode.

A similar arrangement of FIG. 5 wherein the plural polar control retarders 300 comprise crossed A-plates instead of a negative C-plate will now be described.

Figure 8:
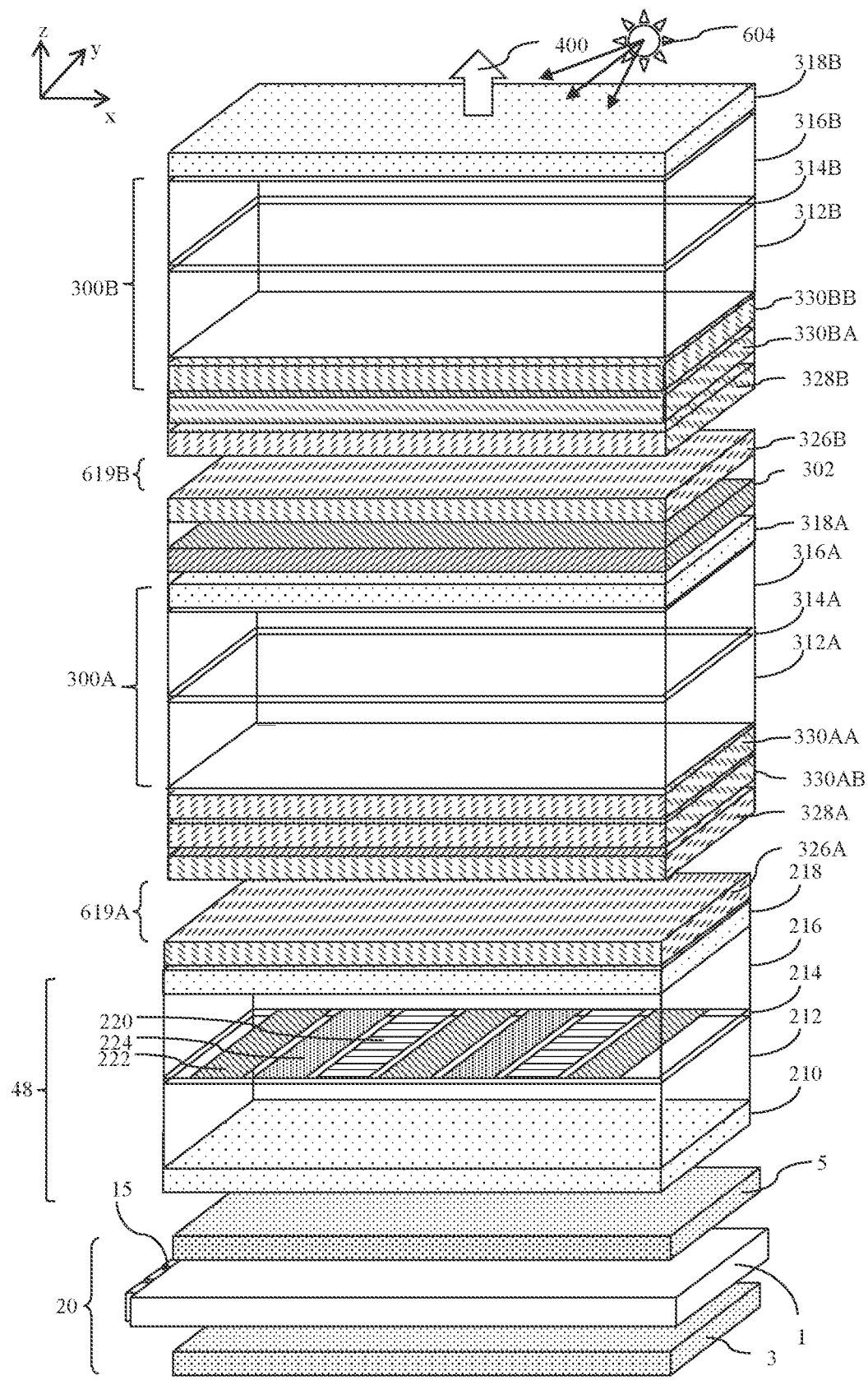
FIG. 8 is a schematic diagram illustrating in perspective side view a privacy display device comprising a spatial light modulator, first and second pairs of quarter waveplates, first and second switchable retarder stacks, an additional polariser and a further additional polariser wherein the switchable retarder stacks comprise compensation retarders that are crossed A-plates.
Figure 9:
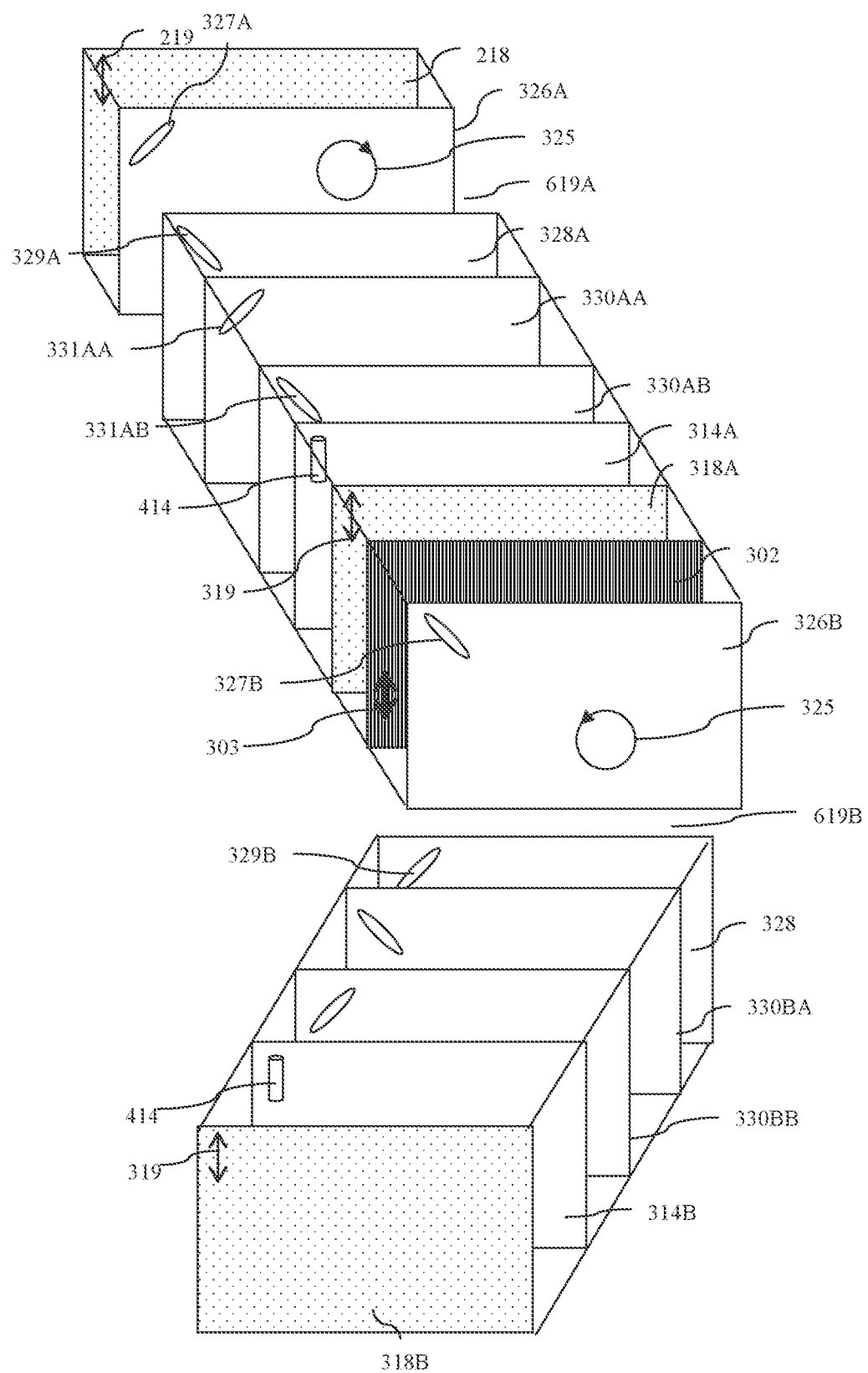
FIG. 9 is a schematic diagram illustrating in expanded view the arrangement of polarisers and retarders of FIG. 8.

FIG. 8 is a schematic diagram illustrating in perspective side view a privacy display device comprising a spatial light modulator, first and second pairs of quarter waveplates, first and second switchable retarder stacks and an additional polariser and further additional polariser wherein the switchable retarder stacks comprise compensation retarders that are crossed A-plates; and FIG. 9 is a schematic diagram illustrating in expanded view the arrangement of polarisers and retarders of FIG. 1. Features of the embodiment of FIGS. 8-9 not discussed in further detail may be assumed to correspond to the features with equivalent reference numerals as discussed above, including any potential variations in the features.

In comparison to the C-plates embodiment of FIGS. 1A-1B and FIGS. 5-6, the at least one passive polar control retarder 330 comprises two passive polar control retarders 330AA, 330AB which are A-plates with optical axes in the plane of the retarders that are crossed and further comprises two passive retarders 330BA, 330BB which have optical axes in the plane of the retarders that are crossed.

The pair of passive retarders 330A, 330B have optical axes that extend at 45° and at 135°, respectively, with respect to an electric vector transmission direction 219 that is parallel to the electric vector transmission of the display polariser 218. Advantageously A-plates are simpler to manufacture and lower cost than C-plates.

A further illustrative embodiment of a liquid crystal retarder 301 will now be described with reference to TABLE 3.

TABLE 3

| | Active LC retarder | | | | | |
|---|---|---|---|---|---|---|
| Mode | Alignment layers | Orientation/ deg | Pretilt/ deg | Δn.d nm | Δε | Voltage/ V |
| Wide | Homogeneous | +90 | 4 | 750 | 16.4 | 10 |
| Privacy | Homogeneous | −90 | 4 | | | 2.1 |

The switchable liquid crystal retarder 301 comprises two surface alignment layers disposed adjacent to the layer of liquid crystal material 314 and on opposite sides thereof and each arranged to provide homogeneous alignment in the adjacent liquid crystal material 314. The layer of liquid crystal material 314 of the switchable liquid crystal retarder 301 comprises a liquid crystal material 314 with a positive dielectric anisotropy. The layer of liquid crystal material 314 has a retardance for light of a wavelength of 550 nm in a range from 500 nm to 1000 nm, preferably in a range from 600 nm to 850 nm and most preferably in a range from 700 nm to 800 nm.

In comparison to the illustrative embodiment of TABLE 1 that uses homeotropic alignment, the homogeneous alignment of TABLE 3 may provide a display with improved resilience to applied stress. In particular relaxation times for homeotropic alignment are relatively long and may leave noticeable visual defects. While the illustrative embodiments below are provided by liquid crystal retarders 314 that use homogeneous alignment, homeotropic liquid crystal alignment similar to that illustrated in TABLE 1 may also be used. A lower drive voltage in public mode may be provided by homeotropic alignment, advantageously reducing power consumption.

An arrangement of plural polar control retarders 300 in arrangements comprising an air gap between the display polariser 218 and additional polariser 318 will now be further described.

Figure 10A:
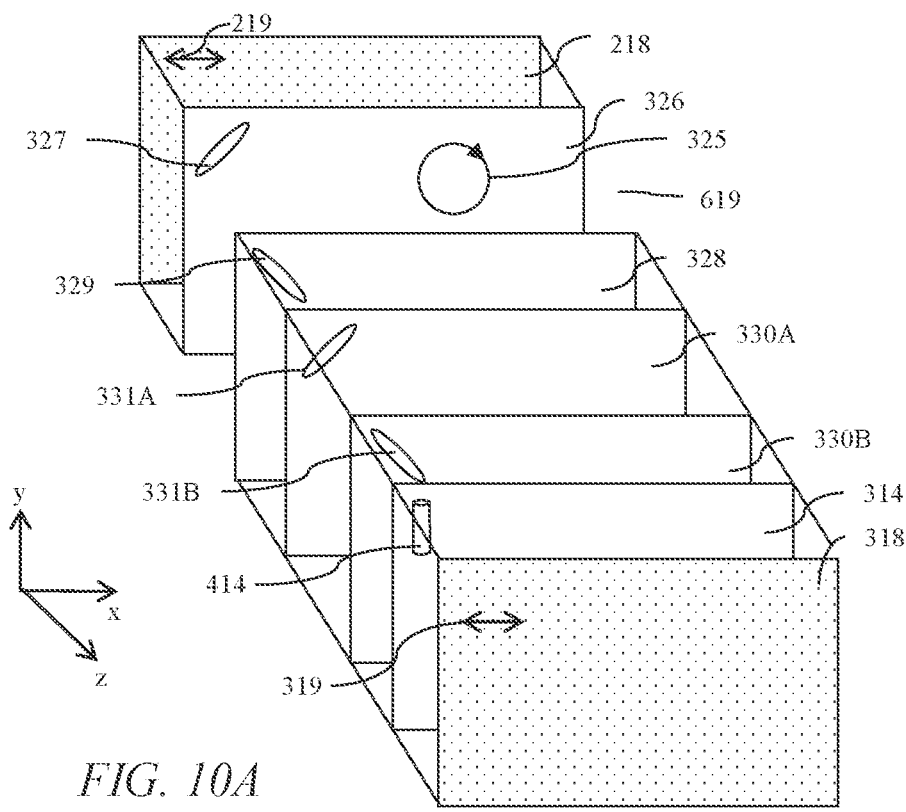
FIG. 10A is a schematic diagram illustrating in expanded view an arrangement of polarisers and retarders comprising a pair of quarter waveplates either side of an air gap, crossed A-plates and a switchable liquid crystal retarder arranged between a display polariser that is an output polariser, and an additional polariser.
Figure 10B:
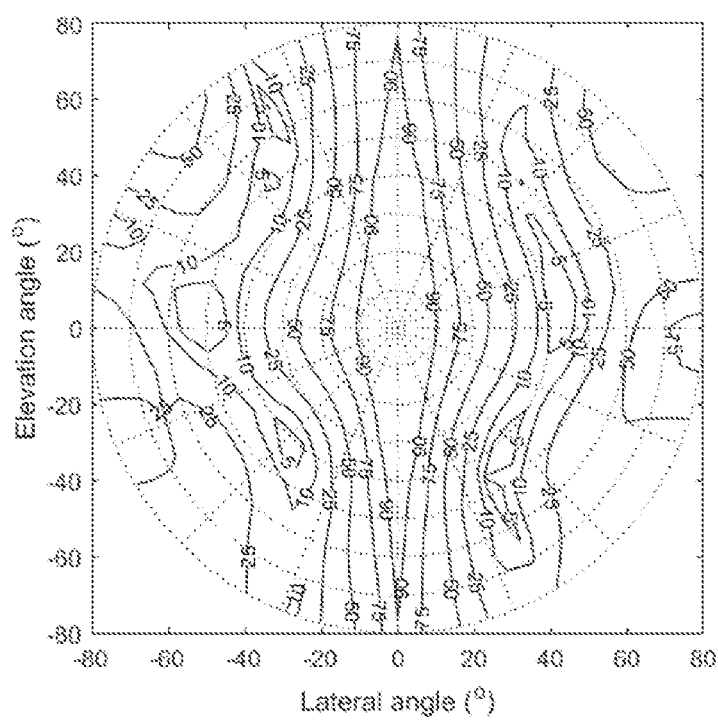
FIG. 10B is a schematic graph illustrating the variation in transmission with polar direction for transmitted light rays in FIG. 10A in a privacy mode of operation.

FIG. 10A is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser; and FIG. 10B is a schematic graph illustrating the variation in transmission with polar direction for transmitted light rays in FIG. 10A in a privacy mode of operation, with the illustrative embodiment of TABLE 4, where $\lambda_0$ is the design wavelength of 540 nm in this illustrative example. Features of the embodiment of FIGS. 10A-B not discussed in further detail may be assumed to correspond to the features with equivalent reference numerals as discussed above, including any potential variations in the features.

TABLE 4

| Layer | Orientation/° | Retarder | Retardance/nm |
|---|---|---|---|
| Polariser 218 | 0 | — | — |
| Retarder 326 | 45 | A-plate | +135 ($\lambda_0/4$) |
| Air gap 619 | | | |
| Retarder 328 | 135 | A-plate | +135 |
| Retarder 330A | 45 | A-plate | +575 |
| Retarder 330B | 135 | A-plate | +575 |

TABLE 4-continued

| Layer | Orientation/° | Retarder | Retardance/nm |
|---|---|---|---|
| Switchable LC 314 | | See TABLE 3 | |
| Polariser 318 | 0 | — | — |

The two passive retarders 330A, 330B introduce no net, relative phase shift to orthogonal polarisation components of light passed by the display polariser 218 along an axis along a normal to the plane of the plural polar control retarders 300, and at least one compensation retarder comprises a further two passive retarders 330A, 330B which have optical axes 331A, 331B in the plane of the retarders that are crossed, the further two passive retarders 330A, 330B being respectively included in the at least one air gap output retarder 328 and the at least one air gap input retarder 326, the further two passive retarders 330A, 330B introducing no net, relative phase shift to orthogonal polarisation components of light passed by the display polariser 218 along an axis along a normal to the plane of the plural polar control retarders 300, and the one of the further two passive retarders 326 which is arranged in the at least one air gap retarder being arranged to convert linearly polarised light passed by the display polariser 218 into circularly polarised light.

Advantageously a display may be arranged to switch between a public and private mode of operation. Air gaps 619 may be provided while maintaining high contrast for on-axis images and increased manufacturing yield in comparison to arrangements wherein the plural polar control retarders 300 are bonded to the spatial light modulator 48. The retarders 326, 328 may be provided at low cost and complexity. In embodiments with crossed quarter wave retarders 326, 328 no net effect on retardance for on-axis and off-axis light rays is achieved. Advantageously the reflection reduction at the air gap 619 is provided for off-axis viewing positions in public mode, achieving increased contrast.

It would be desirable to reduce the number of retarder layers to reduce cost and complexity. The A-plates of passive compensation retarder can further comprise at least one of the air gap input retarder 326 and air gap output retarder 328, as will now be described.

Figure 10C:
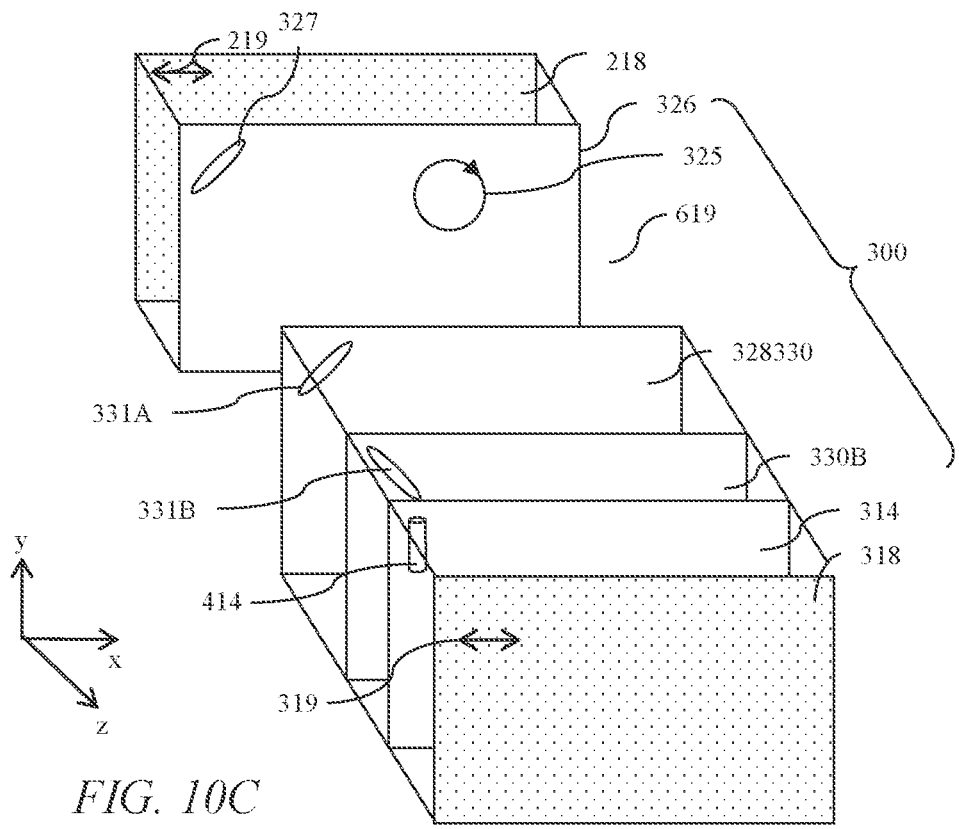
FIG. 10C is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser, wherein one of the A-plates of the crossed A-plates comprises one of the pair of quarter waveplates.
Figure 10D:
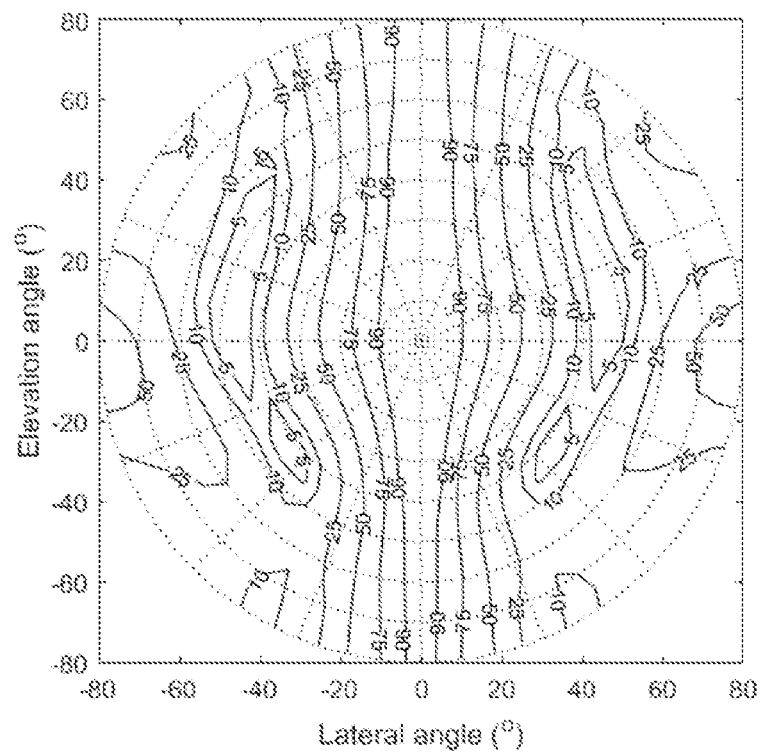
FIG. 10D is a schematic graph illustrating the variation in transmission with polar direction for transmitted light rays in FIG. 10C in a privacy mode of operation.

FIG. 10C is a schematic diagram illustrating in expanded view an arrangement of polarisers and retarders comprising a pair of quarter waveplates 326, 328 either side of an air gap 619, crossed A-plates 330A, 330B and a switchable liquid crystal retarder 314 arranged between an output polariser 218 and an additional polariser 318, wherein one of the A-plates 330A of the crossed A-plates comprises one of the pair of quarter waveplates 328; and FIG. 10D is a schematic graph illustrating the variation in transmission with polar direction for transmitted light rays in FIG. 10C in a privacy mode of operation, with the illustrative embodiment of TABLE 5. Features of the embodiment of FIGS. 10C-D not discussed in further detail may be assumed to correspond to the features with equivalent reference numerals as discussed above, including any potential variations in the features.

TABLE 5

| Layer | Orientation/° | Retarder | Retardance/nm |
|---|---|---|---|
| Polariser 218 | 0 | — | — |
| Retarder 326 | 45 | A-plate | +135 ($\lambda_o/4$) |
| Air gap 619 | | | |
| Retarder 328330 | 45 | A-plate | +440 (575-$\lambda_o/4$) |
| Retarder 330B | 135 | A-plate | +575 |

TABLE 5-continued

| Layer | Orientation/° | Retarder | Retardance/nm |
|---|---|---|---|
| Switchable LC 314 | | See TABLE 3 | |
| Polariser 318 | 0 | — | — |

In comparison to the arrangement of FIG. 10A the two passive retarder 330A is included in air gap output retarder 328. In the embodiment of FIG. 10C, retarder 328330 has a retardance of the passive polar control retarder 330A minus the retardance of air gap output retarder 328, as illustrated in TABLE 5 for the illustrative nominal wavelength of 540 nm.

The two passive retarders 330A, 330B introduce no net, relative phase shift to orthogonal polarisation components of light passed by the display polariser 218 along an axis 199 along a normal to the plane of the plural polar control retarders 300, and the at least one passive compensation retarder comprises a further two passive retarders 326, 328 which have optical axes in the plane of the retarders that are crossed, the further two passive retarders being respectively included in the at least one air gap output retarder and the at least one air gap input retarder, the further two passive retarders introducing no net, relative phase shift to orthogonal polarisation components of light passed by the display polariser along an axis along a normal to the plane of the plural polar control retarders, and the one of the further two passive retarders which is arranged in the at least one air gap retarder being arranged to convert linearly polarised light passed by the display polariser into circularly polarised light.

One of the two passive retarders has a retardance for light of a wavelength of 550 nm in a range from 150 nm to 800 nm, preferably in a range from 200 nm to 700 nm and most preferably in a range from 250 nm to 600 nm.

Said one of the two passive retarders and the further passive retarder have optical axes in the plane of the retarders that are crossed, and the other of the two passive retarders has a retardance for light of a wavelength of 550 nm that is equal to the retardance of said one of the two passive retarders minus the retardance of the further passive retarder.

In other words, in comparison to the arrangement of FIGS. 10A-B the retarders 328 and 330 are replaced by retarder 328330. Retarder 328330 comprises the retardance of the passive polar control retarder 330A of FIG. 10A minus the retardance of the retarder 328 in FIG. 10A.

Advantageously the circular polarisation 325 in the air gap 619 as illustrated in FIGS. 4A-B are converted to the appropriate linear polarisation state at the additional polariser 318.

Figure 11A:
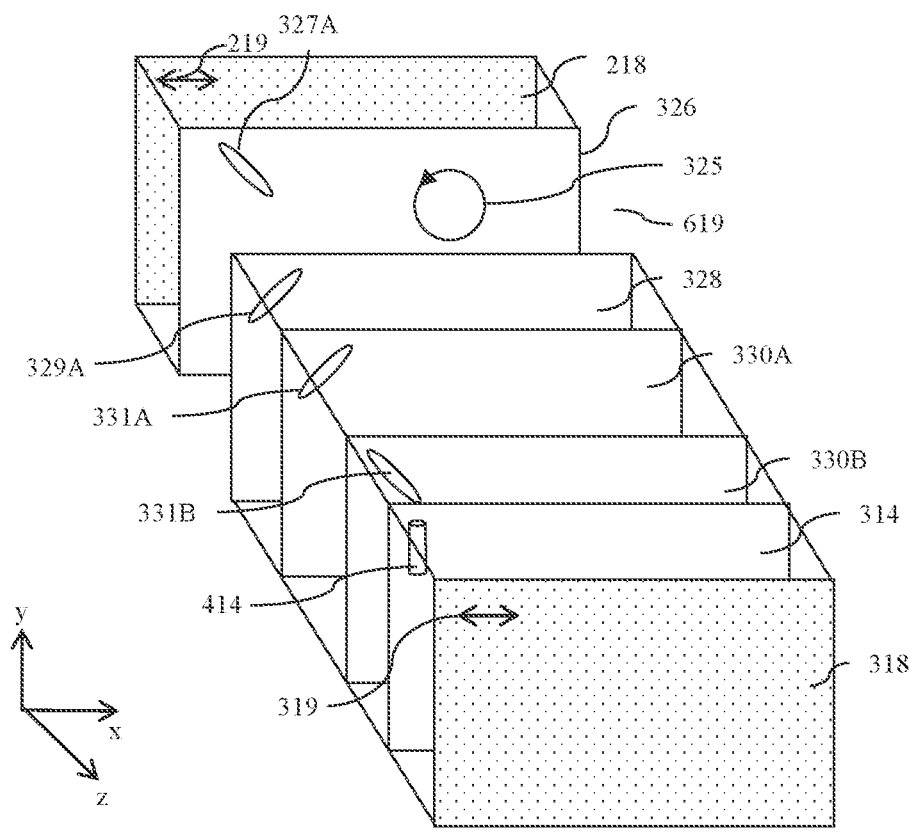
FIG. 11A is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser.
Figure 11B:
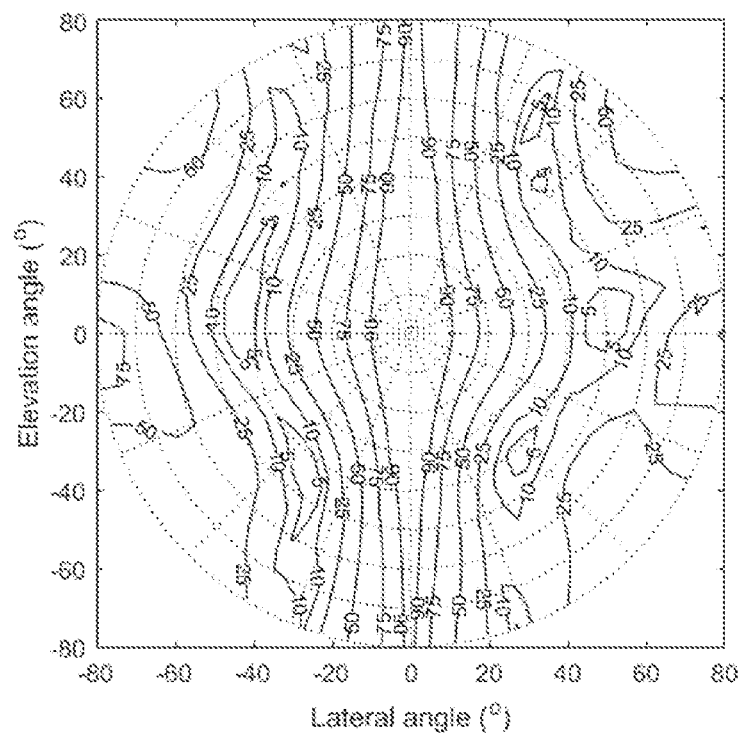
FIG. 11B is a schematic graph illustrating the variation in transmission with polar direction for transmitted light rays in FIG. 11A in a privacy mode of operation.

FIG. 11A is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser; and FIG. 11B is a schematic graph illustrating the variation in transmission with polar direction for transmitted light rays in FIG. 11A in a privacy mode of operation, with the illustrative embodiment of TABLE 6.

TABLE 6

| Layer | Orientation/° | Retarder | Retardance/nm |
|---|---|---|---|
| Polariser 218 | 0 | — | — |
| Retarder 326 | 135 | A-plate | +135 |

TABLE 6-continued

| Layer | Orientation/° | Retarder | Retardance/nm |
|---|---|---|---|
| Air gap 619 | | | |
| Retarder 328 | 45 | A-plate | +135 |
| Retarder 330A | 45 | A-plate | +575 |
| Retarder 330B | 135 | A-plate | +575 |
| Switchable LC 314 | | See TABLE 3 | |
| Polariser 318 | 0 | — | — |

Features of the embodiment of FIGS. 11A-B not discussed in further detail may be assumed to correspond to the features with equivalent reference numerals as discussed above, including any potential variations in the features.

The two passive retarders 326, 328 introduce no net, relative phase shift to orthogonal polarisation components of light passed by the display polariser 218 along an axis along a normal to the plane of the plural polar control retarders 300, and at least one compensation retarder comprises a further two passive retarders 330A, 330B which have optical axes 331A, 331B in the plane of the retarders that are crossed, the further two passive retarders 330A, 330B being respectively included in the at least one air gap output retarder 328 and the at least one air gap input retarder 326, the further two passive retarders 330A, 330B introducing no net, relative phase shift to orthogonal polarisation components of light passed by the display polariser 218 along an axis along a normal to the plane of the plural polar control retarders 300, and the one of the further two passive retarders 326 which is arranged in the at least one air gap retarder being arranged to convert linearly polarised light passed by the display polariser 218 into circularly polarised light.

Figure 11C:
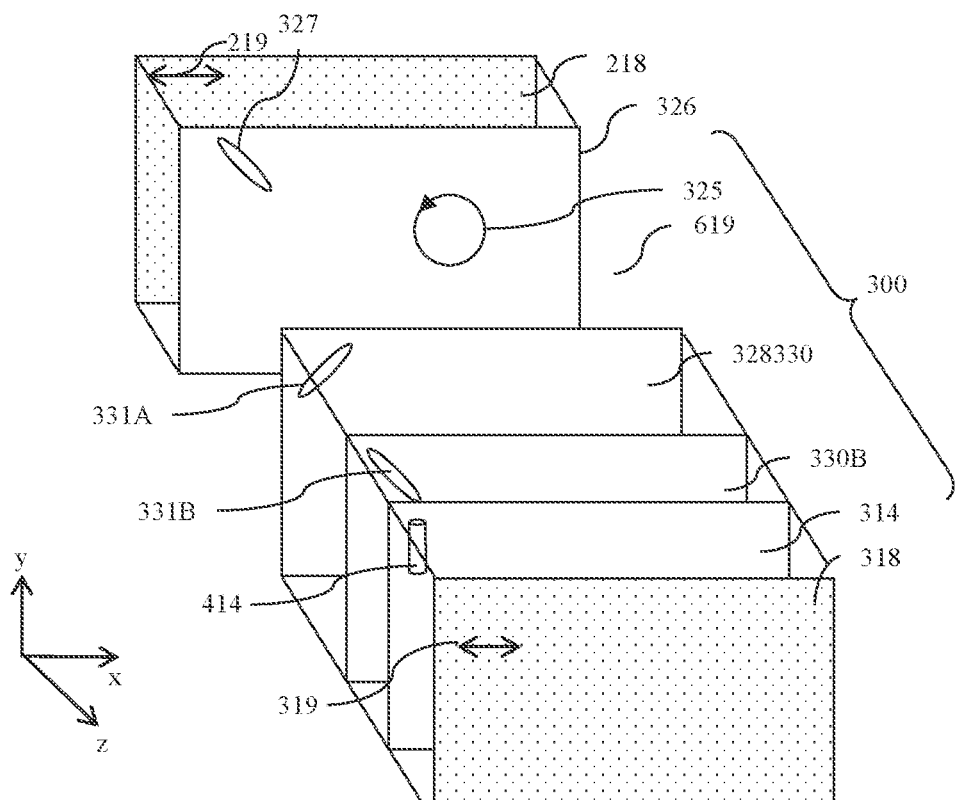
FIG. 11C is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser, wherein one of the A-plates of the crossed A-plates comprises one of a pair of quarter waveplates.
Figure 11D:
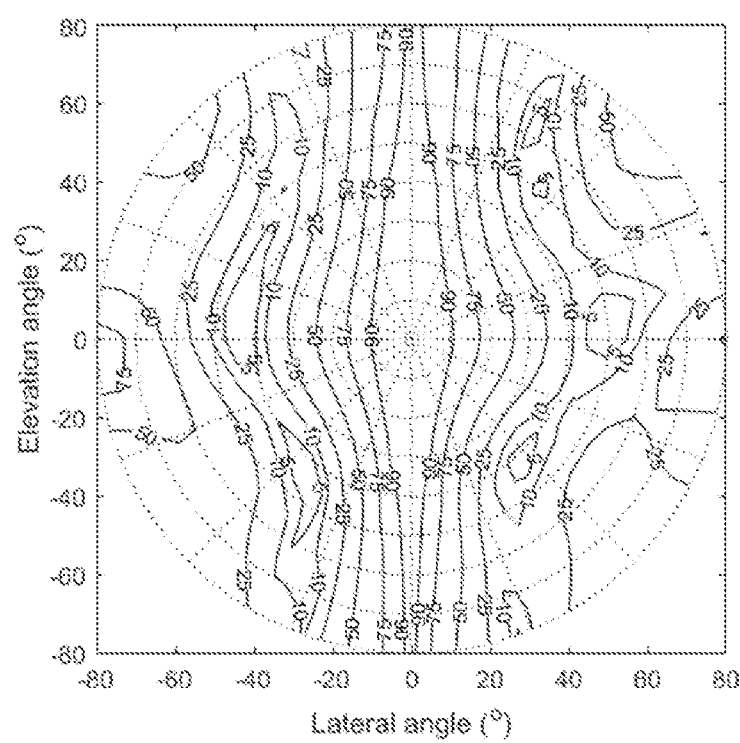
FIG. 11D is a schematic graph illustrating the variation in transmission with polar direction for transmitted light rays in FIG. 11C in a privacy mode of operation.

FIG. 11C is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser, wherein one of the A-plates of the crossed A-plates comprises one of the pair of quarter waveplates; and FIG. 11D is a schematic graph illustrating the variation in transmission with polar direction for transmitted light rays in FIG. 11C in a privacy mode of operation, with the illustrative embodiment of TABLE 7. Features of the embodiment of FIGS. 11C-D not discussed in further detail may be assumed to correspond to the features with equivalent reference numerals as discussed above, including any potential variations in the features.

TABLE 7

| Layer | Orientation/° | Retarder | Retardance/nm |
|---|---|---|---|
| Polariser 218 | 0 | — | — |
| Retarder 326 | 135 | A-plate | +135 |
| Air gap 619 | | | |
| Retarder 328330 | 45 | A-plate | +710 (575 + $\lambda_o$/4) |
| Retarder 330B | 135 | A-plate | +575 |
| Switchable LC 314 | | See TABLE 1 | |
| Polariser 318 | 0 | — | — |

The plural polar control retarders 300 introduce no net, relative phase shift to orthogonal polarisation components of light passed by the display polariser 218 along an axis along a normal to the plane of the plural polar control retarders 300, and at least one passive polar control retarder 330 comprises a further two passive retarders 328330, 330B which have optical axes in the plane of the retarders that are crossed. The further two passive retarders are respectively included in the at least one air gap output retarder 328 and the at least one air gap input retarder 326, the further two passive retarders introducing no net, relative phase shift to orthogonal polarisation components of light passed by the display polariser 218 along an axis along a normal to the plane of the plural polar control retarders 300, and the one of the further two passive retarders 326 which is arranged in the at least one air gap retarder 326 being arranged to convert linearly polarised light passed by the display polariser 218 into circularly polarised light 325.

In comparison to FIG. 10C, the retardance of the retarder 328330 is increased.

Said one of the two passive retarders and the further passive retarder have optical axes in the plane of the retarders that are aligned, and the other of the two passive retarders has a retardance for light of a wavelength of 550 nm that is equal to the retardance of said one of the two passive retarders plus the retardance of the further passive retarder.

The plural polar control retarders 300 include a switchable liquid crystal retarder comprising a layer of liquid crystal material, the switchable liquid crystal retarder being provided between the pair of passive retarders.

The display device further comprises a transparent electrode and a liquid crystal alignment layer formed on a side of each of the pair of passive retarders adjacent the switchable liquid crystal retarder.

The display device further comprises first and second substrates between which the switchable liquid crystal retarder is provided, the first and second substrates each comprising one of the pair of passive retarders.

The two passive retarders are respectively included in the at least one air gap output retarder and the at least one air gap input retarder.

It would be desirable to provide further reduction in the number of retarders used.

Figure 12A:
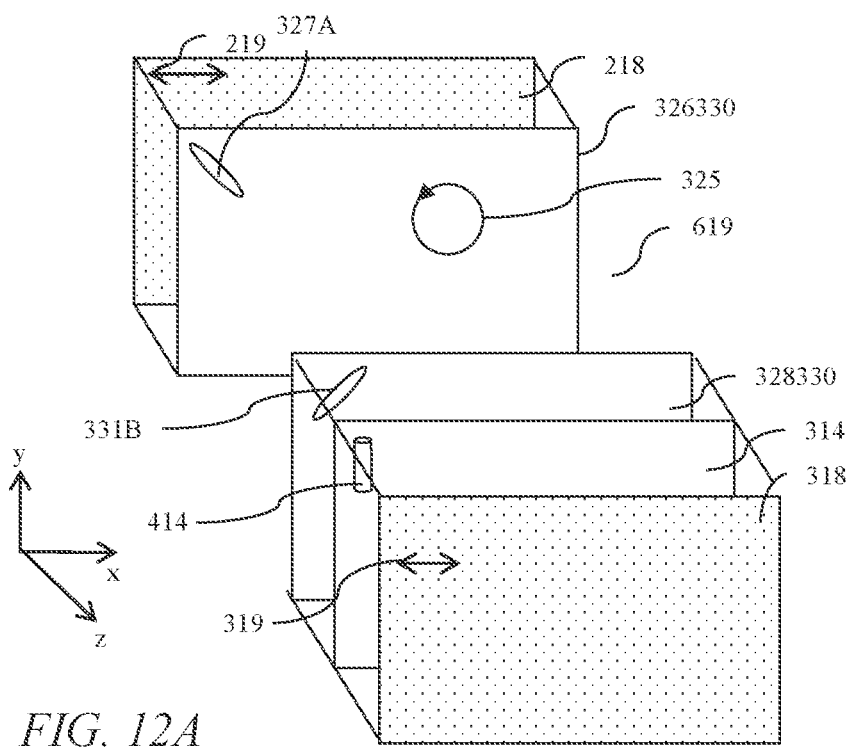
FIG. 12A is a schematic diagram illustrating in expanded view an arrangement of polarisers and retarders comprising crossed A-plates that operate as multiple order quarter waveplates either side of an air gap and a switchable liquid crystal retarder arranged between an output polariser and an additional polariser.
Figure 12B:
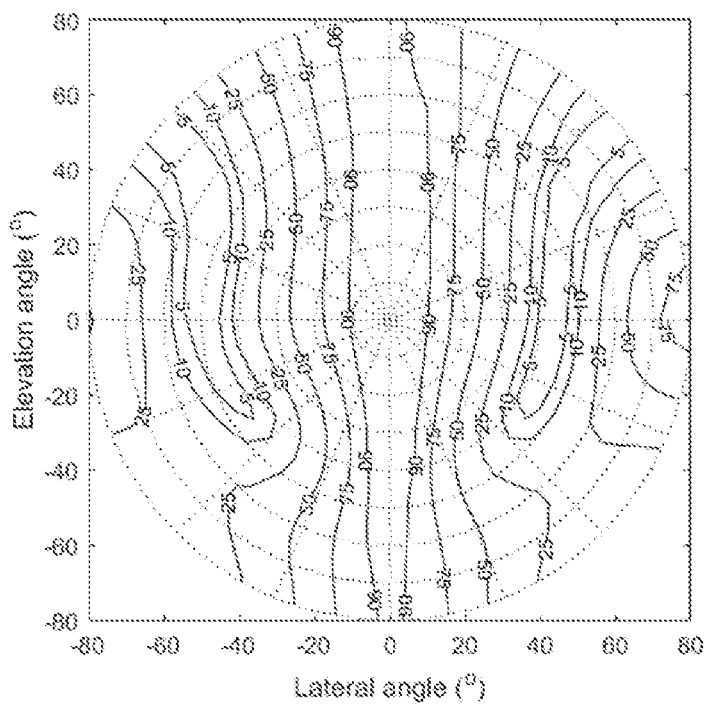
FIG. 12B is a schematic graph illustrating the variation in transmission with polar direction for transmitted light rays in FIG. 11A in a privacy mode of operation.

FIG. 12A is a schematic diagram illustrating in expanded view an arrangement of polarisers and retarders comprising crossed A-plates 326330, 328330 that operate as multiple order quarter waveplates either side of an air gap 619 and a switchable liquid crystal retarder 314 arranged between an output polariser and an additional polariser; and FIG. 12B is a schematic graph illustrating the variation in transmission with polar direction for transmitted light rays in FIG. 11A in a privacy mode of operation for the illustrative embodiment of TABLE 8. Features of the embodiment of FIGS. 12A-B not discussed in further detail may be assumed to correspond to the features with equivalent reference numerals as discussed above, including any potential variations in the features.

TABLE 8

| Layer | Orientation/° | Retarder | Retardance/nm |
|---|---|---|---|
| Polariser 218 | 0 | — | — |
| Retarder 326330 | 45 | A-plate | +405 (3$\lambda_o$/4) |
| Air gap 619 | | | |
| Retarder 328330 | 135 | A-plate | +405 (3$\lambda_o$/4) |
| Switchable LC 314 | | See TABLE 3 | |
| Polariser 318 | 0 | — | — |

In comparison to the arrangements above, the circular polarisation 325 is provided by the first compensation retarder 326330. The second compensation retarder 328330 that is crossed with retarder 328330 provides the desirable viewing angle characteristics. In order to achieve luminance roll-off that is minimised at 45 degrees lateral angle, the retardance of the retarders 326330 and 328330 is increased in comparison to zero order quarter waveplates 326, 328 of other illustrative embodiments herein. Advantageously cost and complexity is reduced while a switchable privacy display is achieved.

Figure 13:
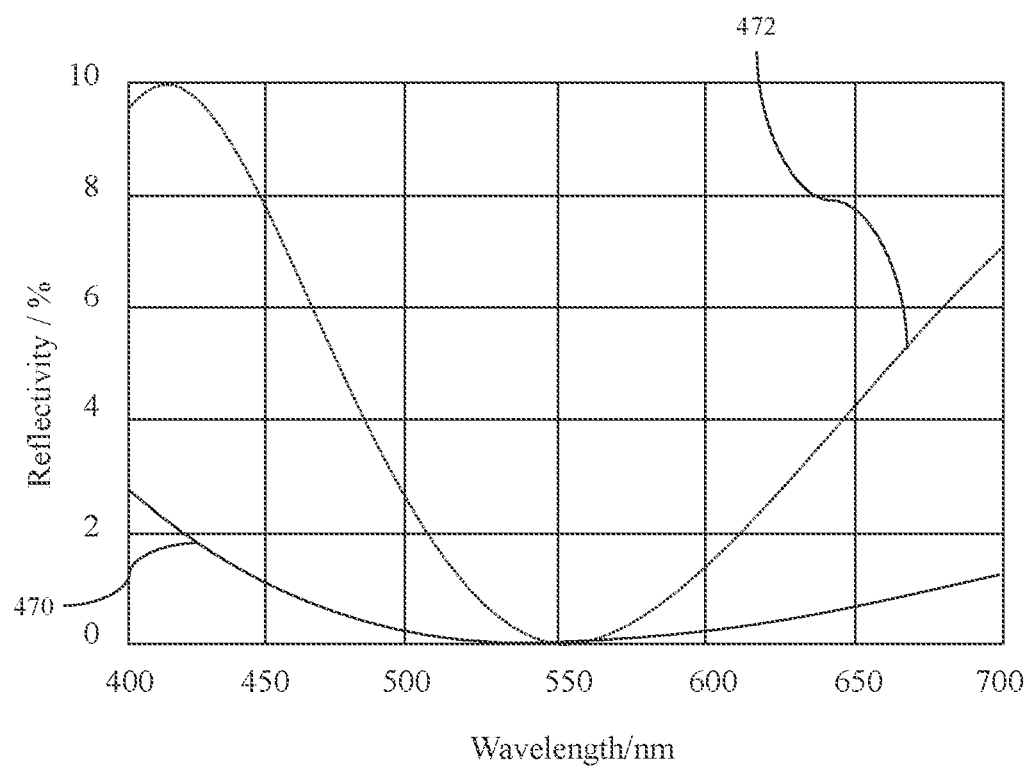
FIG. 13 is a schematic graph illustrating the variation in reflectivity with wavelength for reflected light rays at air interfaces for the arrangements of FIG. 10A and FIG. 12A.

FIG. 13 is a schematic graph illustrating the variation in reflectivity with wavelength for reflected light rays at air interface 619, with the illustrative embodiments of TABLE 8 for profile 472 and TABLE 4 for profile 470. Additional colouration is provided for the circular polarisation 325 in FIG. 12A in comparison to the colouration of polarisation 325 in FIG. 10A.

Arrangements of retarders for spatial light modulators such as twisted nematic LCDs that do not have a horizontal or vertical linear polarisation state output will now be described.

Figure 14:
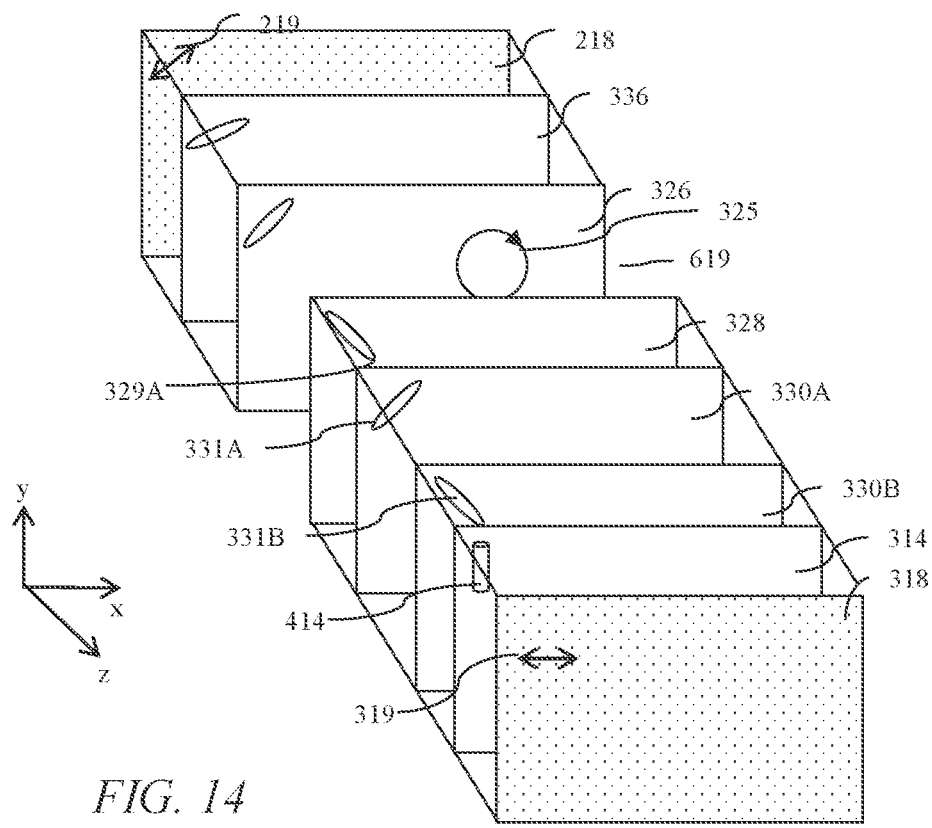
FIG. 14 is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser further comprising a half wave retarder arranged to rotate the polarisation component from the output polariser.

FIG. 14 is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser further comprising a half wave retarder arranged to rotate the polarisation component from the output polariser, with the illustrative embodiment of TABLE 9. Features of the embodiment of FIG. 14 not discussed in further detail may be assumed to correspond to the features with equivalent reference numerals as discussed above, including any potential variations in the features.

TABLE 9

| Layer | Orientation/° | Retarder | Retardance/nm |
|---|---|---|---|
| Polariser 218 | 0 | — | — |
| Retarder 336 | 22.5 | A-plate | +270 |
| Retarder 326 | 45 | A-plate | +135 |
| Air gap 619 | | | |
| Retarder 328 | 135 | A-plate | +135 |
| Retarder 330A | 45 | A-plate | +575 |
| Retarder 330B | 135 | A-plate | +575 |
| Switchable LC 314 | | See TABLE 3 | |
| Polariser 318 | 0 | — | — |

The display polariser 218 and the additional polariser 318 have electric vector transmission directions 219, 319 that are not parallel, and the display device 100 further comprises a rotator retarder 336 arranged between the additional polariser 318 and the display polariser 218, the rotator retarder 336 being arrange to rotate a polarisation direction of polarised light incident thereon between the electric vector transmission directions of the display polariser 218 and the additional polariser 318. Such an embodiment may be used when the spatial light modulator 48 includes a layer 214 of twisted nematic liquid crystal material.

Advantageously a switchable privacy display may be provided for a twisted nematic LCD while maintaining a lateral roll-off in viewing angle in privacy mode and low reflection from air gaps 619.

Figure 15:
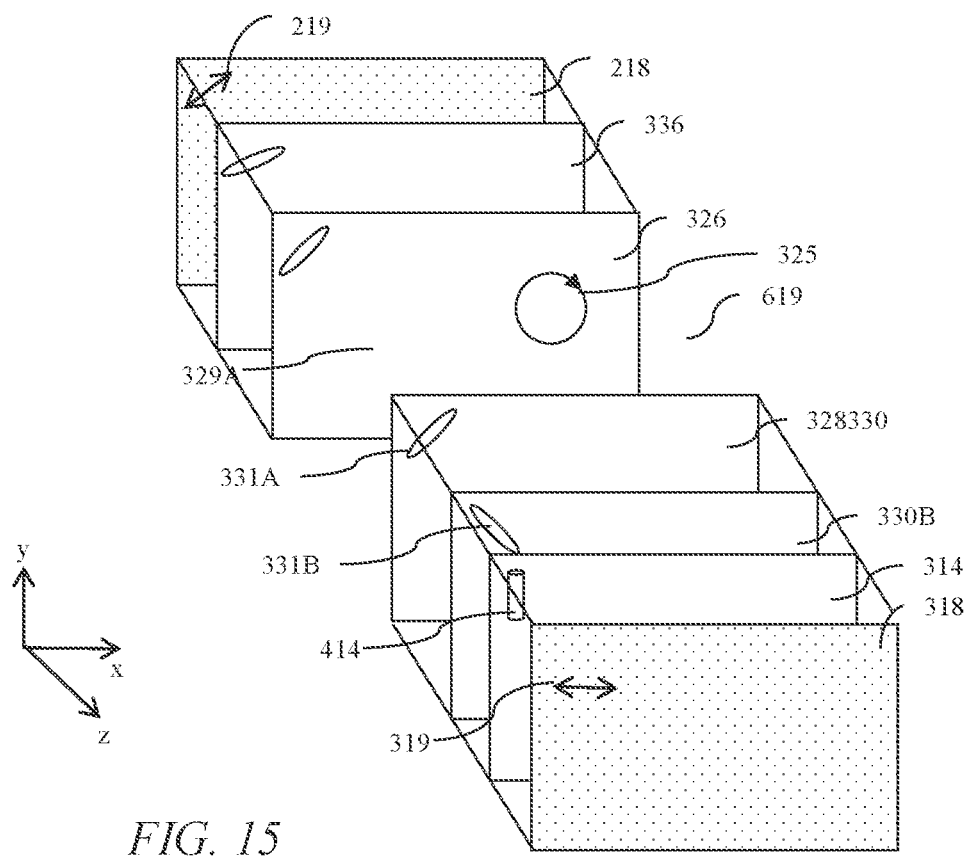
FIG. 15 is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser, wherein one of the A-plates of the crossed A-plates comprises one of the pair of quarter waveplates further comprising a half wave retarder arranged to rotate the polarisation component from the output polariser.

FIG. 15 is a schematic diagram illustrating in expanded view an arrangement of polarisers and retarders comprising a pair of quarter waveplates either side of an air gap, crossed A-plates and a switchable liquid crystal retarder arranged between an output polariser and an additional polariser, wherein one of the A-plates of the crossed A-plates comprises one of the pair of quarter waveplates further comprising a half wave retarder arranged to rotate the polarisation component from the output polariser, with the illustrative embodiment of TABLE 10. Features of the embodiment of FIG. 15 not discussed in further detail may be assumed to correspond to the features with equivalent reference numerals as discussed above, including any potential variations in the features.

TABLE 10

| Layer | Orientation/° | Retarder | Retardance/nm |
|---|---|---|---|
| Polariser 218 | 0 | — | — |
| Retarder 336 | 22.5 | A-plate | +270 |
| Retarder 326 | 45 | A-plate | +135 |
| Air gap 619 | | | |
| Retarder 328330 | 45 | A-plate | +440 (575-$\lambda_o$/4) |
| Retarder 330B | 135 | A-plate | +575 |
| Switchable LC 314 | | See TABLE 3 | |
| Polariser 318 | 0 | — | — |

Such an arrangement provides the advantages of FIG. 10C for example while providing a switchable privacy display for a twisted nematic LCD.

The embodiments above have been described for switchable privacy displays. It may be desirable to provide non-switchable displays. The embodiments above have also described privacy displays with a luminance and reflectivity roll-off in a lateral direction. It may be desirable to provide luminance and reflectivity variations that are operable in both landscape and portrait display orientations for example, that is polar luminance and reflectivity profiles that have some degree of circular symmetry.

Figure 16A:
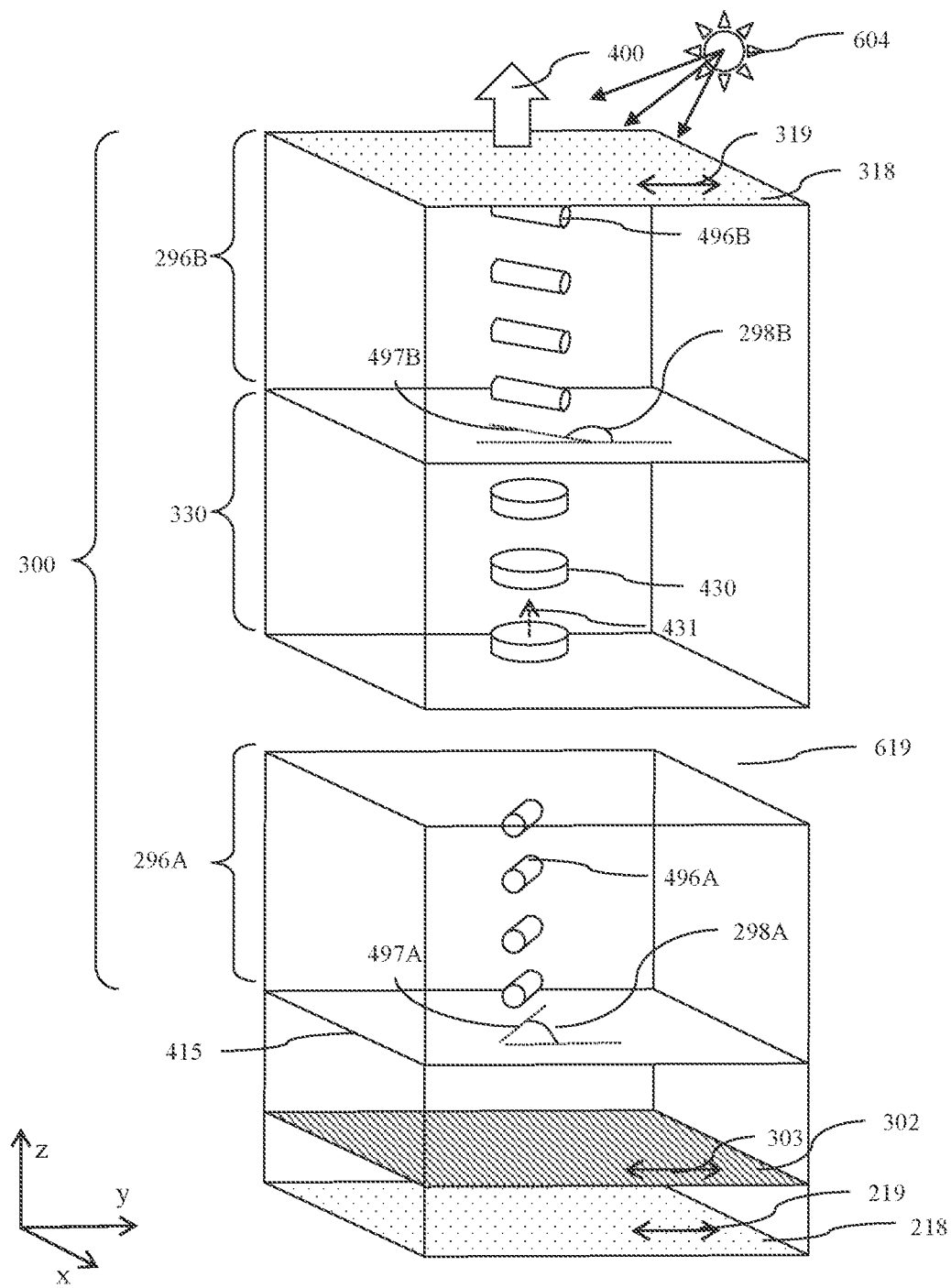
FIG. 16A is a schematic diagram illustrating in perspective side view an arrangement of a negative C-plate retarder arranged between quarter waveplates and a reflective polariser arranged between parallel polarisers wherein an air gap is arranged between the negative C-plate and one of the quarter waveplates.
Figure 16B:
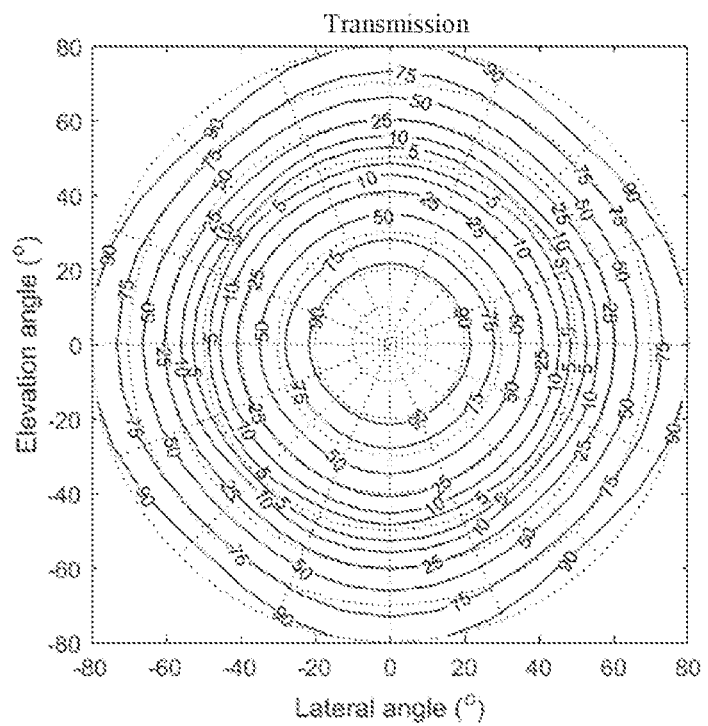
FIG. 16B is a schematic graph illustrating the variation of transmission with polar direction for the transmitted light rays for the arrangement of FIG. 16A.
Figure 16C:
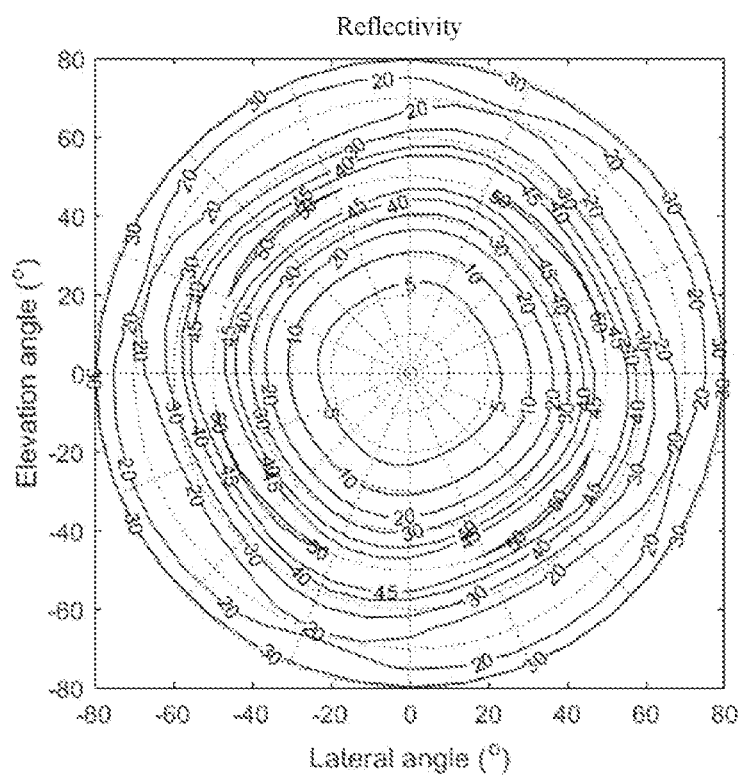
FIG. 16C is a schematic graph illustrating the variation of reflectivity with polar direction for the reflected light rays for the arrangement of FIG. 16A.

FIG. 16A is a schematic diagram illustrating in perspective side view an arrangement of a negative C-plate retarder arranged between quarter waveplates and a reflective polariser arranged between parallel polarisers wherein an air gap is arranged between the negative C-plate and one of the quarter waveplates; FIG. 16B is a schematic graph illustrating the variation of transmission with polar direction for the transmitted light rays for the arrangement of FIG. 16A; and FIG. 16C is a schematic graph illustrating the variation of reflectivity with polar direction for the reflected light rays for the arrangement of FIG. 16A, with the illustrative embodiment of TABLE 11. Features of the embodiment of FIGS. 16A-C not discussed in further detail may be assumed to correspond to the features with equivalent reference numerals as discussed above, including any potential variations in the features.

The plural polar control retarders 300 further comprise two passive retarders 296A, 296B which have optical axes in the plane of the retarders that are crossed, the two passive retarders being respectively included in the at least one air gap output retarder 330, 296B and the at least one air gap input retarder 296A, the two passive retarders 296A, 296B introducing no net, relative phase shift to orthogonal polarisation components of light passed by the display polariser along an axis 199 along a normal to the plane of the plural polar control retarders 300, and the one of the two passive retarders 296A which is arranged in the at least one air gap retarder being arranged to convert linearly polarised light passed by the display polariser 218 into circularly polarised light 325.

TABLE 11

| Layer | Orientation/° | Retarder | Retardance/nm |
|---|---|---|---|
| Polariser 218 | 0 | — | — |
| Retarder 296A | 45 | A-plate | +135 |
| Air gap 619 | | | |
| Retarder 330 | Vertical | Negative C-plate | −800 |
| Retarder 296B | 135 | A-plate | +135 |
| Polariser 318 | 0 | — | — |

The at least one passive polar control retarder 330 comprises a retarder having an optical axis with a component perpendicular to the plane of the retarder. The passive retarder 330 having an optical axis perpendicular to the plane of the retarder has a retardance for light of a wavelength of 550 nm in a range from −400 nm to −1000 nm and preferably in a range from −750 nm to −850 nm.

The polar profile of FIG. 16C illustrates the reflectivity of the display including the reflective polariser 302 and front surface Fresnel reflections from the additional polariser 318. Peak reflectivity of approximately 50% may be achieved, ignoring absorption of the transmitted polarisation at the polariser 318 for ambient light.

The embodiment of FIG. 16A can advantageously provide operation in landscape and portrait operations of a display, or privacy for a snooper looking down onto the display device 100. Further reduced cost and thickness can be achieved in comparison to the arrangements comprising a switchable liquid crystal retarder 301 described above. Such an element may be used to condition the angular output of a display with a wide angular range, such as an emissive display. Image contrast to the head-on user may be maintained when air gap 619 is used.

Figure 17A:
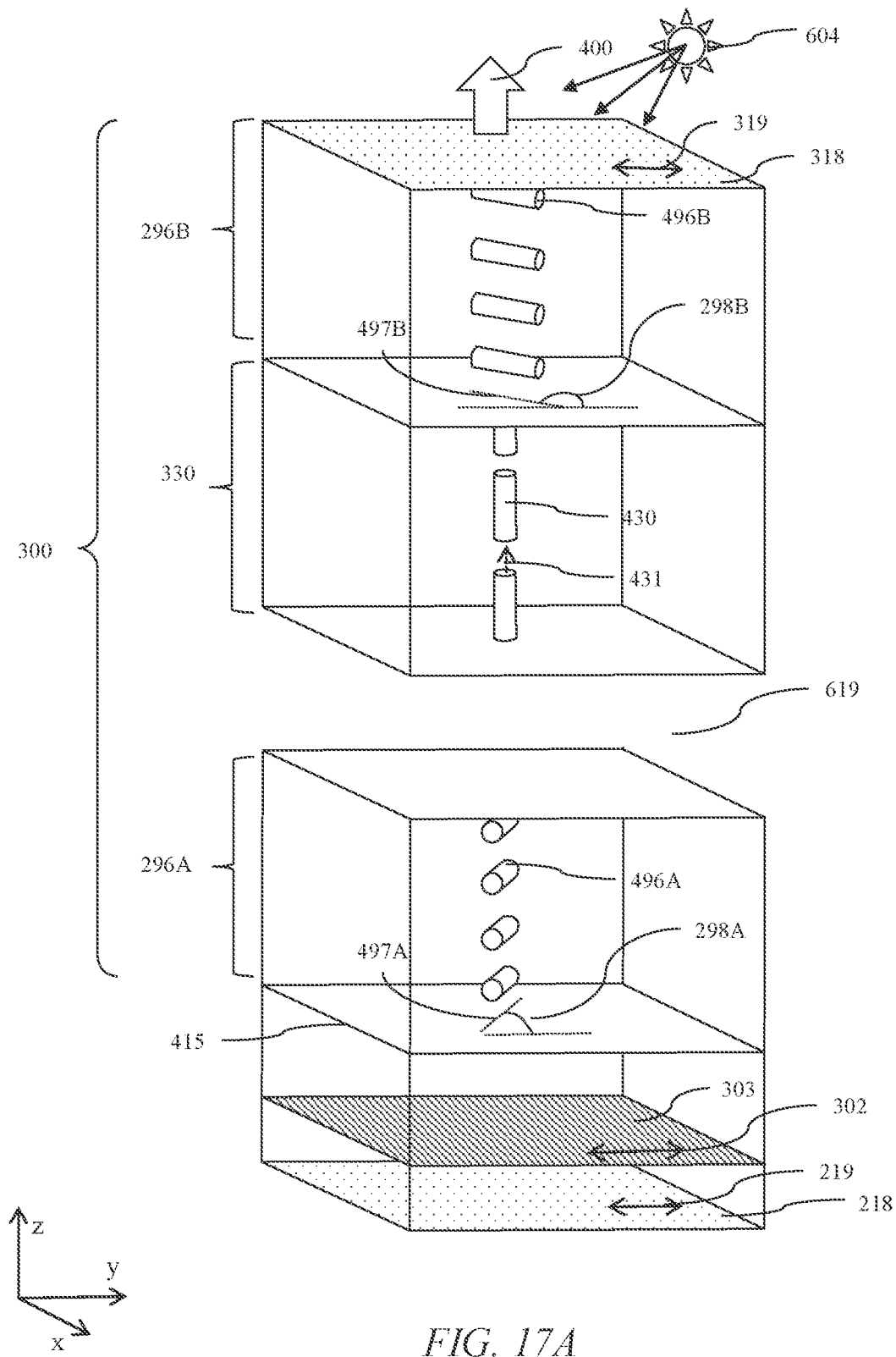
FIG. 17A is a schematic diagram illustrating in perspective side view an arrangement of a positive C-plate retarder arranged between quarter waveplates and a reflective polariser arranged between parallel polarisers.
Figure 17B:
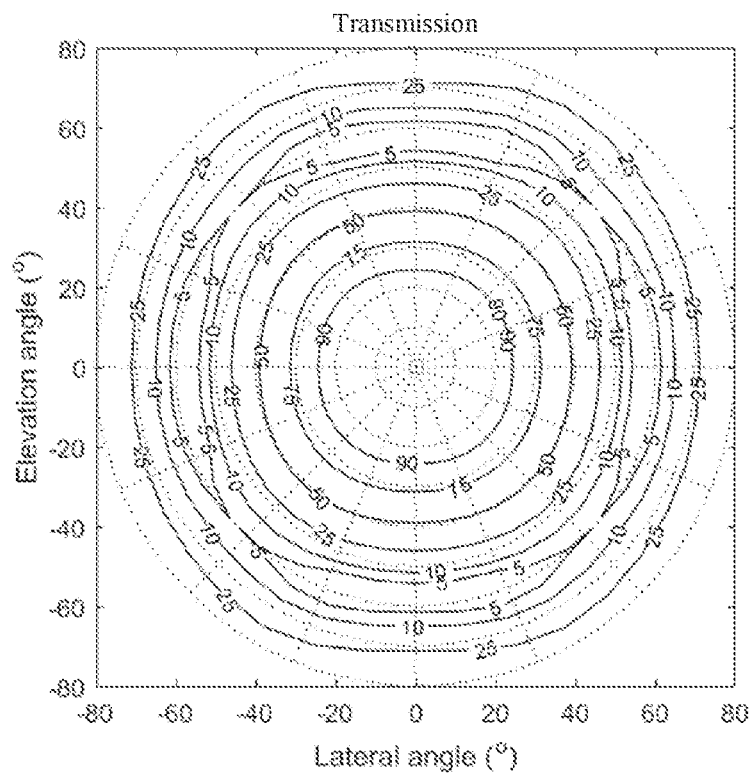
FIG. 17B is a schematic graph illustrating the variation of transmission with polar direction for the transmitted light rays for the arrangement of FIG. 17A.
Figure 17C:
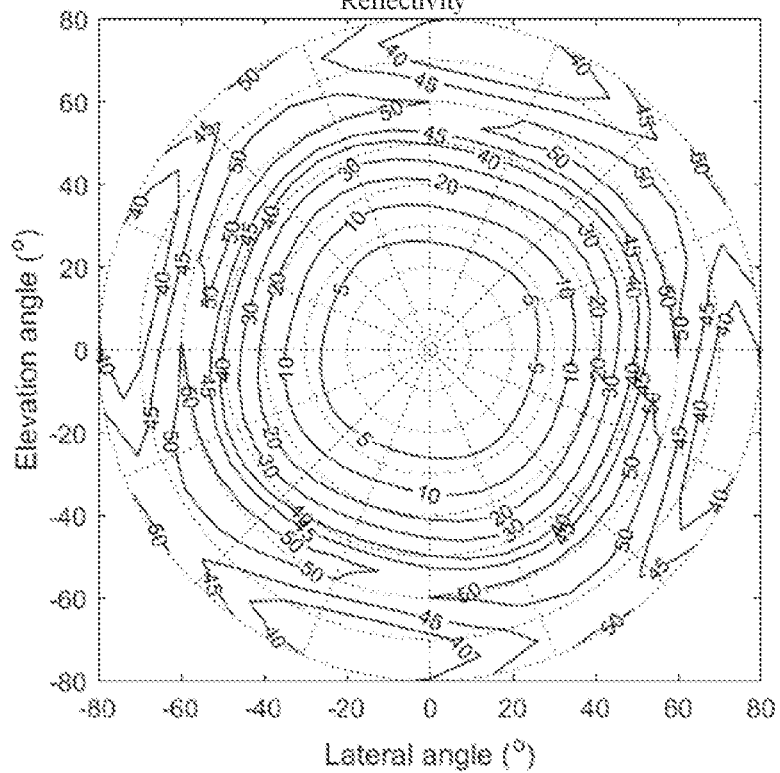
FIG. 17C is a schematic graph illustrating the variation of reflectivity with polar direction for the reflected light rays for the arrangement of FIG. 17A.

FIG. 17A is a schematic diagram illustrating in perspective side view an arrangement of a positive C-plate retarder arranged between quarter waveplates and a reflective polariser arranged between parallel polarisers; FIG. 17B is a schematic graph illustrating the variation of transmission with polar direction for the transmitted light rays for the arrangement of FIG. 17A; and FIG. 17C is a schematic graph illustrating the variation of reflectivity with polar direction for the reflected light rays for the arrangement of FIG. 17A, with the illustrative embodiment of TABLE 12. Features of the embodiment of FIG. 17A-C not discussed in further detail may be assumed to correspond to the features with equivalent reference numerals as discussed above, including any potential variations in the features.

TABLE 12

| Layer | Orientation/° | Retarder | Retardance/nm |
|---|---|---|---|
| Polariser 218 | 0 | — | — |
| Retarder 296A | 45 | A-plate | +135 |
| Air gap 619 | | | |
| Retarder 330 | Vertical | Positive C-plate | +1000 |
| Retarder 296B | 135 | A-plate | +135 |
| Polariser 318 | 0 | — | — |

The at least one passive polar control retarder 330 comprises a retarder having an optical axis with a component perpendicular to the plane of the retarder. The passive retarder 330 having an optical axis perpendicular to the plane of the retarder has a retardance for light of a wavelength of 550 nm in a range from +500 nm to +1200 nm and preferably in a range from +950 nm to +1050 nm.

The operation of FIG. 17A is similar to that of FIG. 16A other than a positive C-plate is used in place of a negative C-plate. Improved polar profile may be achieved for luminance and reflectivity. Similar advantages to those of FIG. 16A are obtained.

A-plates are more conveniently manufactured than C-plates. It would be desirable to provide a passive structure with A-plates.

Figure 18A:
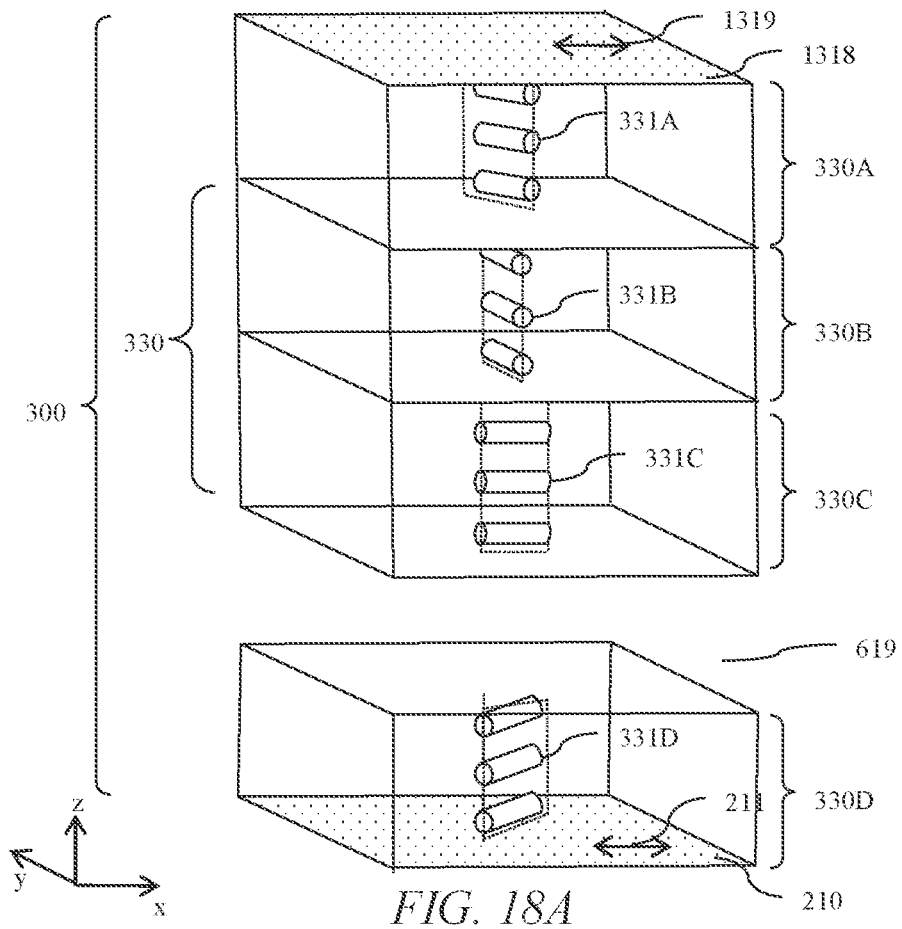
FIG. 18A is a schematic diagram illustrating in side perspective view an example of a passive retarder stack comprising a passive control retarder, comprising a series of four aligned A-plates wherein the outer A-plates are multiple order quarter waveplates.
Figure 18B:
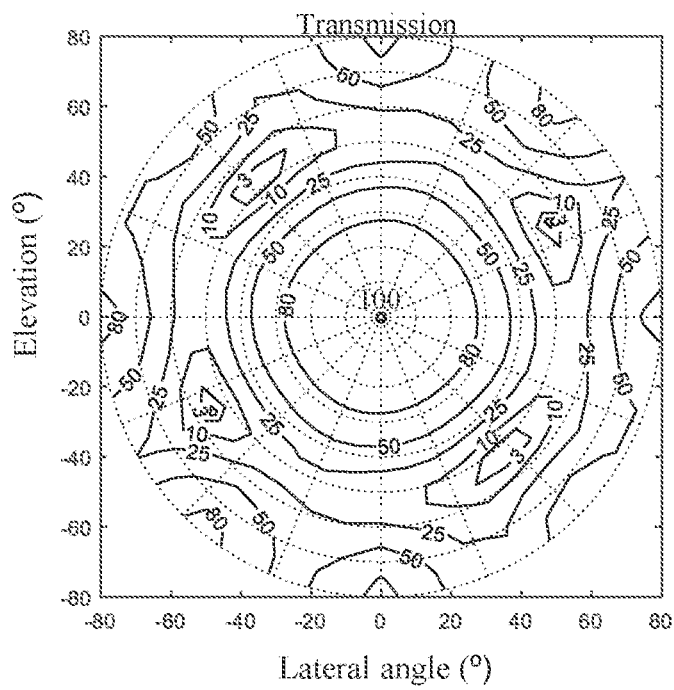
FIG. 18B is a schematic graph illustrating the variation of transmission with polar direction for the transmitted light rays for the arrangement of FIG. 18A.

FIG. 18A is a schematic diagram illustrating in side perspective view an example of a passive retarder stack comprising a passive control retarder, comprising a series of four aligned A-plates; and FIG. 18B is a schematic graph illustrating the variation of transmission with polar direction for the transmitted light rays for the arrangement of FIG. 18A, with the illustrative embodiment of TABLE 13. Features of the embodiment of FIGS. 18A-B not discussed in further detail may be assumed to correspond to the features with equivalent reference numerals as discussed above, including any potential variations in the features.

TABLE 13

| Layer | Orientation/° | Retarder | Retardance/nm |
|---|---|---|---|
| Polariser 218 | 0 | — | — |
| Retarder 330D | 45 | A-plate | +135 |
| Air gap 619 | | | |
| Retarder 330C | 0 | A-plate | +700 |
| Retarder 330B | 90 | A-plate | +700 |
| Retarder 330A | 135 | A-plate | +135 |
| Polariser 318 | 0 | — | — |

The at least one passive retarder 330 may comprise a pair of passive retarders 330B, 330C which have optical axes in the plane of the passive retarders that are crossed.

The two passive retarders 326, 328 introduce no net, relative phase shift to orthogonal polarisation components of light passed by the display polariser 218 along an axis along a normal to the plane of the plural polar control retarders 300, and at least one compensation retarder comprises a further two passive retarders 330A, 330B which have optical axes 331A, 331B in the plane of the retarders that are crossed, the further two passive retarders 330A, 330B being respectively included in the at least one air gap output retarder 328 and the at least one air gap input retarder 326, the further two passive retarders 330A, 330B introducing no net, relative phase shift to orthogonal polarisation components of light passed by the display polariser 218 along an axis along a normal to the plane of the plural polar control retarders 300, and the one of the further two passive retarders 326 which is arranged in the at least one air gap retarder being arranged to convert linearly polarised light passed by the display polariser 218 into circularly polarised light.

The operation of FIG. 18A is similar to that of FIG. 16A and FIG. 17A with similar application and advantages. A-plates are more convenient to manufacture than C-plates so that lower cost may be achieved.

Various arrangements of air spaced touch screens will now be described.

Figure 19A:
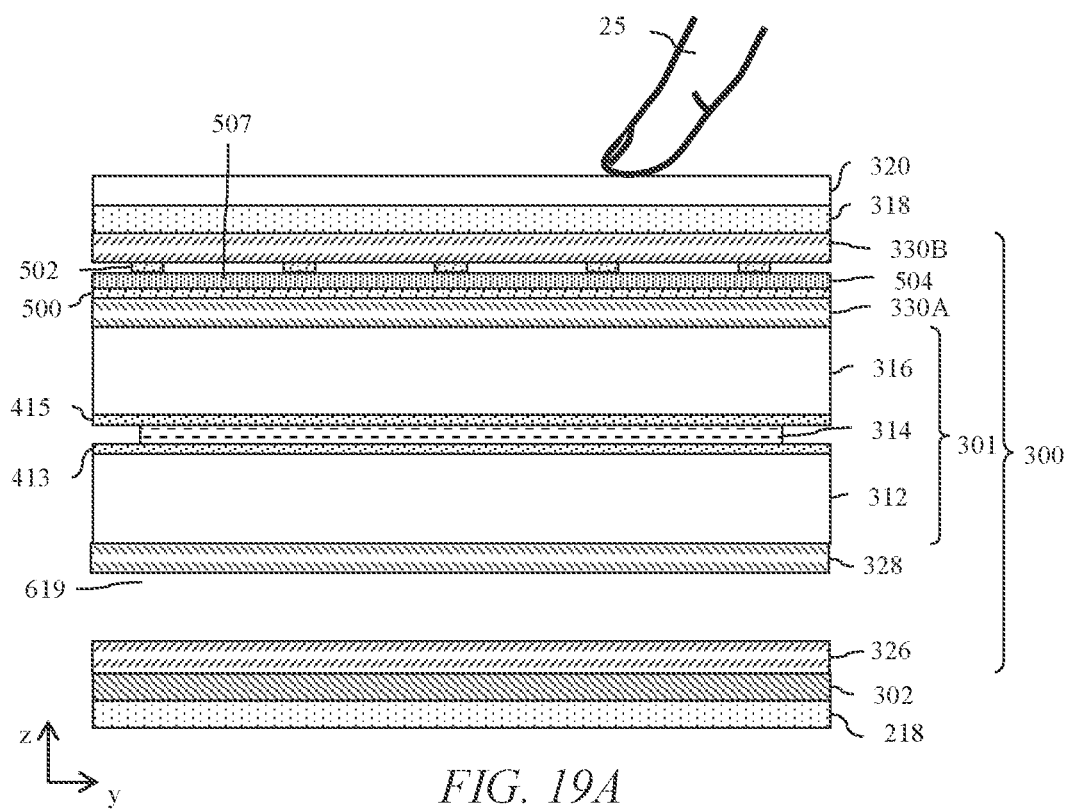
FIG. 19A is a schematic diagram illustrating in a side view the structure of a switchable privacy display comprising touch electrode arrays arranged on facing surfaces of a pair of crossed passive polar control retarders wherein the air gap is between the display polariser and the switchable liquid crystal retarder.

FIG. 19A is a schematic diagram illustrating in a side view the structure of part of a switchable privacy display device 100 comprising touch electrode arrays 500, 502 arranged on facing surfaces of a pair of crossed passive polar control retarders 330A, 330B wherein the air gap 619 is between the display polariser 218 and the switchable liquid crystal retarder 301.

FIG. 19A is similar in structure to that of FIGS. 4A-B. However the touch electrode arrays 500, 502 are arranged on the facing surfaces of the passive retarders 330A, 330B that may have the advantages described above. A dielectric layer 504 comprising dielectric material 507 is arranged between the electrode arrays 500, 502 and may for example be an adhesive.

Touch electrode arrays 500, 502 may comprise transparent conductors for example ITO, silver nanowires or conductive polymers. They may be formed by know techniques including physical vapour deposition, sputtering, evaporation, ink-jet printing or contact printing. They may be patterned by the use of masks or photo resists and etching. When the electrodes are formed on the flexible retarder substrates, for example PC or COC/COP, then the type and temperature of the electrode deposition process may be controlled to avoid melting or the substrate. Inherently low temperature processes such as ink jet and contact printing can produce electrode layers without exceeding the glass transition temperature of the substrates. The electrode arrays 500, 502 may be conveniently formed on the retarders 330A, 330B and low tolerance alignment may be provided between the two layers. Advantageously cost may be reduced while high contrast is maintained and touch screen operation enabled.

Figure 19B:
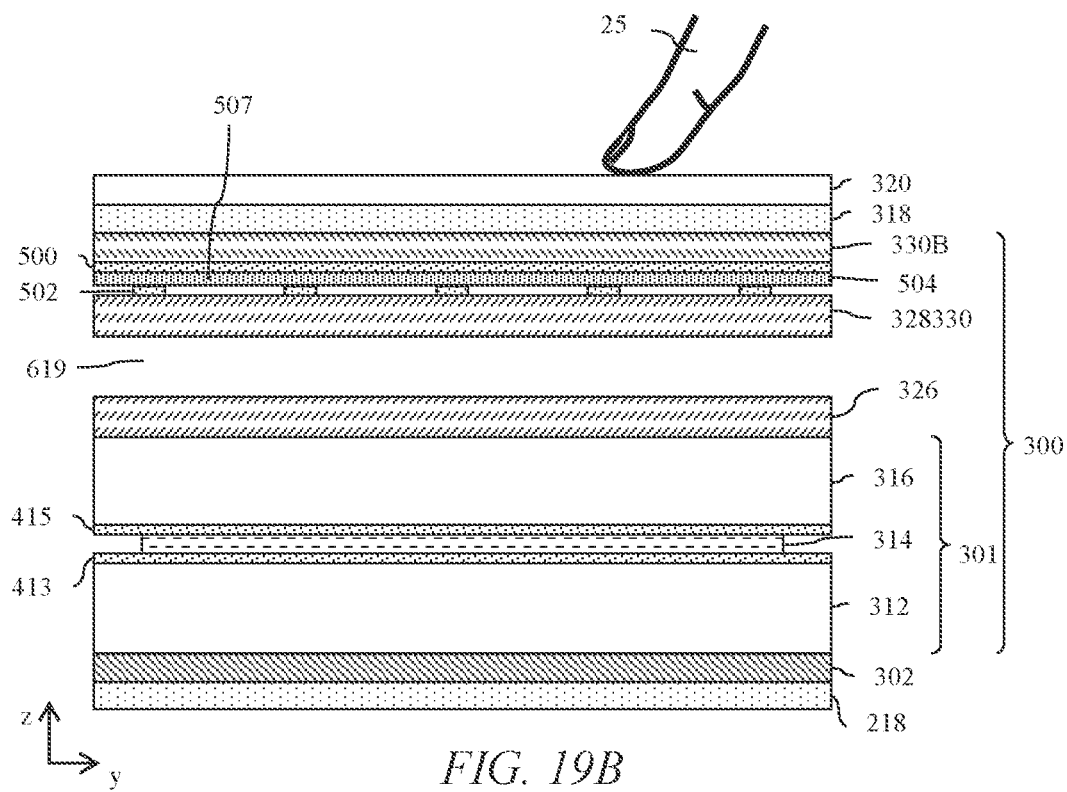
FIG. 19B is a schematic diagram illustrating in a side view the structure of a switchable privacy display comprising touch electrode arrays arranged on facing surfaces of a pair of crossed passive polar control retarders wherein the air gap is between the switchable liquid crystal retarder and the additional polariser.

FIG. 19B is a schematic diagram illustrating in a side view the structure of part of a switchable privacy display device 100 comprising touch electrode arrays arranged on facing surfaces of a pair of crossed passive polar control retarders 330A, 330B wherein the air gap 619 is between the switchable liquid crystal retarder 301 and the additional polariser 318.

FIG. 19B is similar to FIG. 19A, however the air gap 619 is located above the switchable liquid crystal retarder 301. The arrangement of polar control retarders 328330, 330B and air gap input quarter waveplate 326 as described previously may be provided. Advantageously the thickness and weight of the suspended touch screen element is reduced.

Figure 19C:
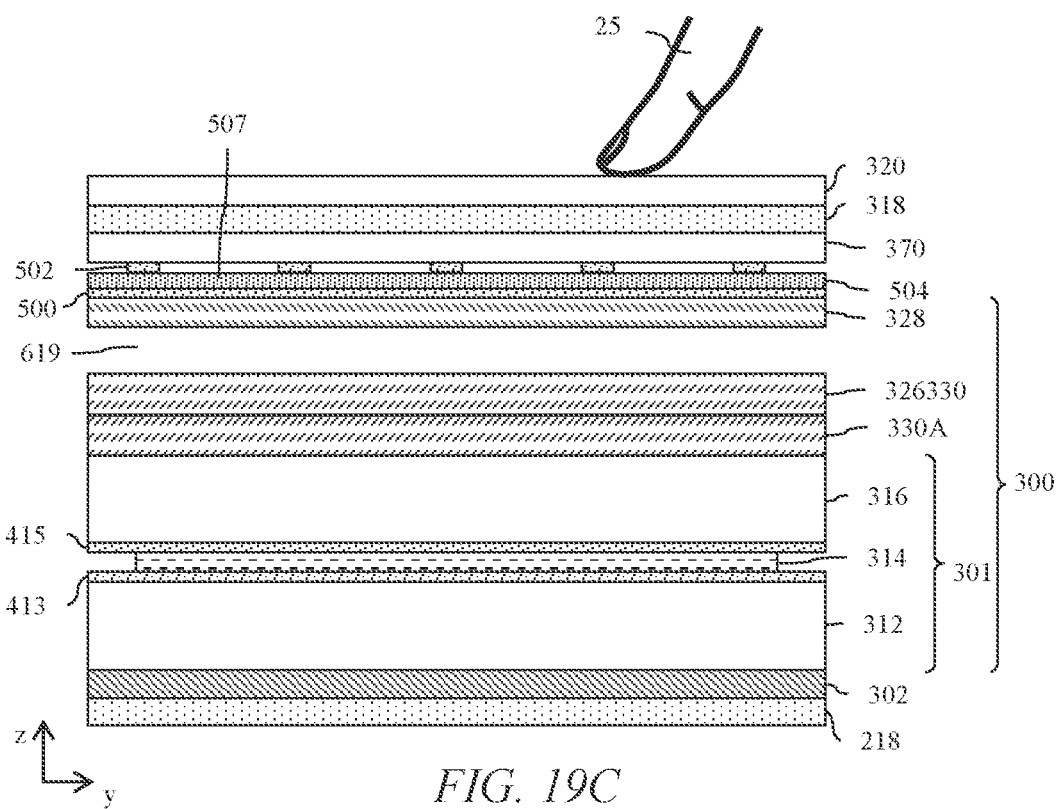
FIG. 19C is a schematic diagram illustrating in a side view the structure of a switchable privacy display comprising a touch electrode array arranged on one surface of one of a pair of crossed passive polar control retarders wherein the air gap is between the switchable liquid crystal retarder and the additional polariser.

FIG. 19C is a schematic diagram illustrating in a side view the structure of part of a switchable privacy display device 100 comprising a touch electrode array 500 arranged on one surface of one of a pair of crossed passive polar control retarders wherein the air gap 619 is between the switchable liquid crystal retarder 301 and the additional polariser 318.

FIG. 19C is similar to the arrangement of FIG. 19B, however a non-birefringent substrate 370 is provided for one of the touch screen electrode arrays. Substrate 370 may alternatively have an optical axis that is parallel or orthogonal to the electric vector transmission direction of the additional polariser 318. Advantageously the polar control retarders may be provided on the substrate 316 of the switchable liquid crystal retarder 301.

Figure 19D:
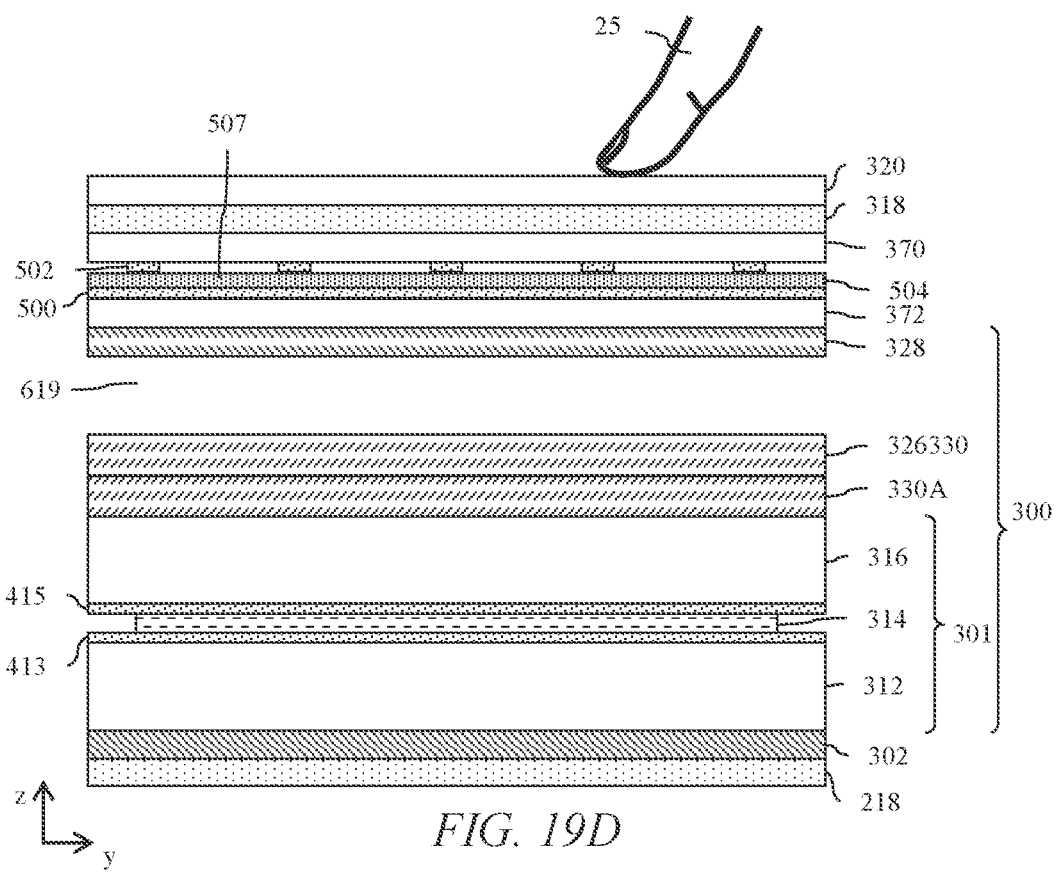
FIG. 19D is a schematic diagram illustrating in a side view the structure of a switchable privacy display comprising a touch electrode array that is not arranged on the passive polar control retarders wherein the air gap is between the switchable liquid crystal retarder and the additional polariser.

FIG. 19D is a schematic diagram illustrating in a side view the structure of part of a switchable privacy display device 100 comprising touch electrode arrays 500, 502 that is not arranged on the passive polar control retarders 330A, 330B wherein the air gap 619 is between the switchable liquid crystal retarder 301 and the additional polariser 318.

FIG. 19D is similar to FIG. 19C, but no touch screen electrodes are provided on retarders, and are provided on non-birefringent substrates 370, 372 (or substrates with optical axes aligned parallel or orthogonal to the electric vector transmission direction of the additional polariser 318). Electrode arrays 500, 502 may be arranged on substrates 370, 372 that are better suited to forming electrodes than the passive polar control retarders 330 or air gap quarter waveplates 326, 328, or polarisation rotation retarders 336. Advantageously the formation of electrode arrays 500, 502 may be cheaper and have higher reliability and performance.

Features of the embodiments of FIGS. 19A-D not discussed in further detail may be assumed to correspond to the features with equivalent reference numerals as discussed above, including any potential variations in the features.

It would be desirable to provide further reduction of off-axis luminance by means of directional illumination from the spatial light modulator 48. Directional illumination of the spatial light modulator 48 by directional backlights 20 will now be described.

Figure 20A:
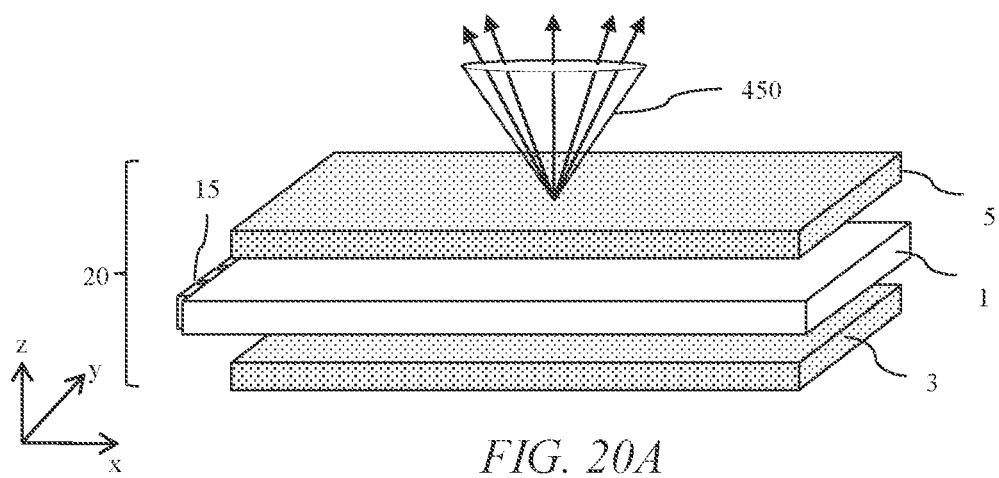
FIG. 20A is a schematic diagram illustrating in front perspective view a directional backlight.
Figure 20B:
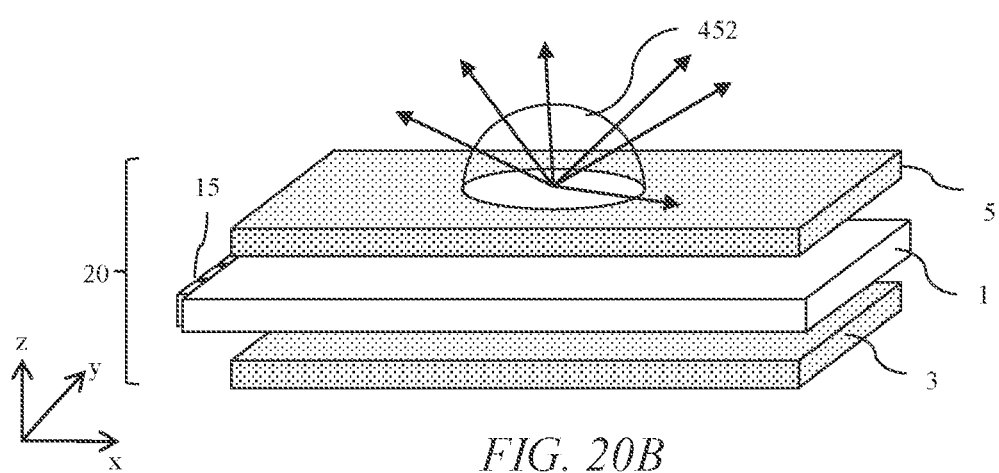
FIG. 20B is a schematic diagram illustrating in front perspective view a non-directional backlight.

FIG. 20A is a schematic diagram illustrating in front perspective view a directional backlight 20, and FIG. 20B is a schematic diagram illustrating in front perspective view a non-directional backlight 20, either of which may be applied in any of the devices described herein. Thus a directional backlight 20 as shown in FIG. 20A provides a narrow cone 450, whereas a non-directional backlight 20 as shown in FIG. 20B provides a wide angular distribution cone 452 of light output rays.

Figure 20C:
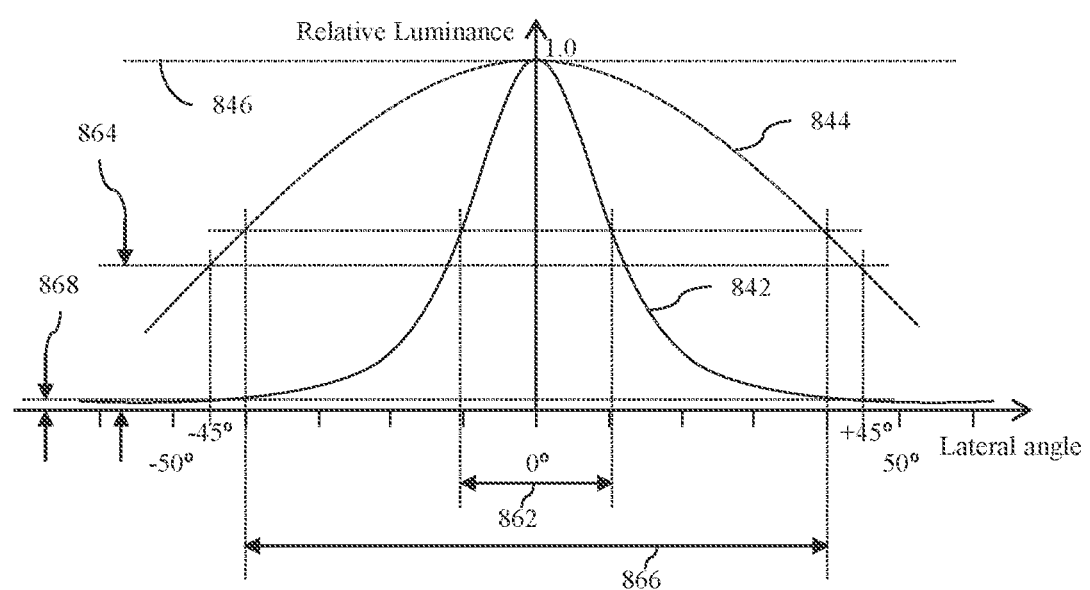
FIG. 20C is a schematic graph illustrating variation with luminance with lateral viewing angle of displays with different fields of view.

FIG. 20C is a schematic graph illustrating variation with luminance with lateral viewing angle for various different backlight arrangements. The graph of FIG. 20C may be a cross section through the polar field-of-view profiles described herein.

A Lambertian backlight has a luminance profile 846 that is independent of viewing angle.

A typical wide angle backlight has a roll-off 844 at higher angles such that the full width half maximum 866 of relative luminance may be greater than 40°, preferably greater than 60° and most preferably greater than 80°. Further the relative luminance 864 at +/−45°, is preferably greater than 7.5%, more preferably greater than 10% and most preferably greater than 20%.

By way of comparison a directional backlight 20 has a roll-off at higher angles such that the full width half maximum 862 of relative luminance may be less than 60°, preferably less than 40° and most preferably less than 20°. Further the backlight 20 may provide a luminance at polar angles to the normal to the spatial light modulator 48 greater than 45 degrees that is at most 33% of the luminance along the normal to the spatial light modulator 48, preferably at most 20% of the luminance along the normal to the spatial light modulator 48, and most preferably at most 10% of the luminance along the normal to the spatial light modulator 48.

Scatter and diffraction in the spatial light modulator 48 may degrade privacy mode operation when the switchable retarder 300 is arranged between the input display polariser 210 and additional polariser 318. The luminance at polar angles to the normal to the spatial light modulator greater than 45 degrees may be increased in arrangements wherein the switchable retarder 300 is arranged between the output display polariser 218 and additional polariser 318 in comparison to arrangements wherein the switchable retarder 300 is arranged between the input display polariser 210 and additional polariser 318.

Advantageously lower off-axis luminance may be achieved for the arrangement of FIG. 18A.

Figure 20D:
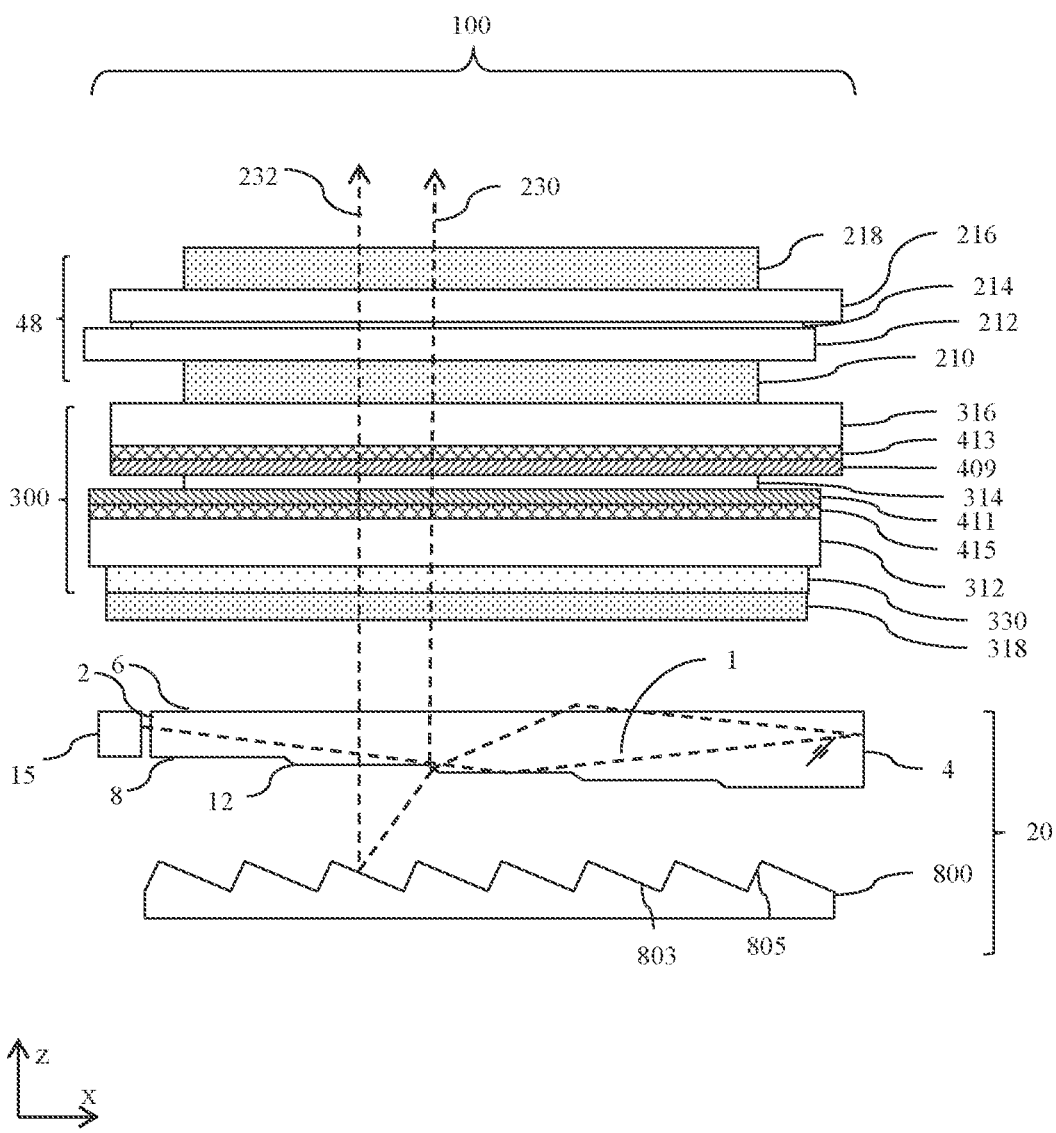
FIG. 20D is a schematic diagram illustrating in side view a switchable directional display apparatus comprising an imaging waveguide and switchable liquid crystal retarder.
Figure 20E:
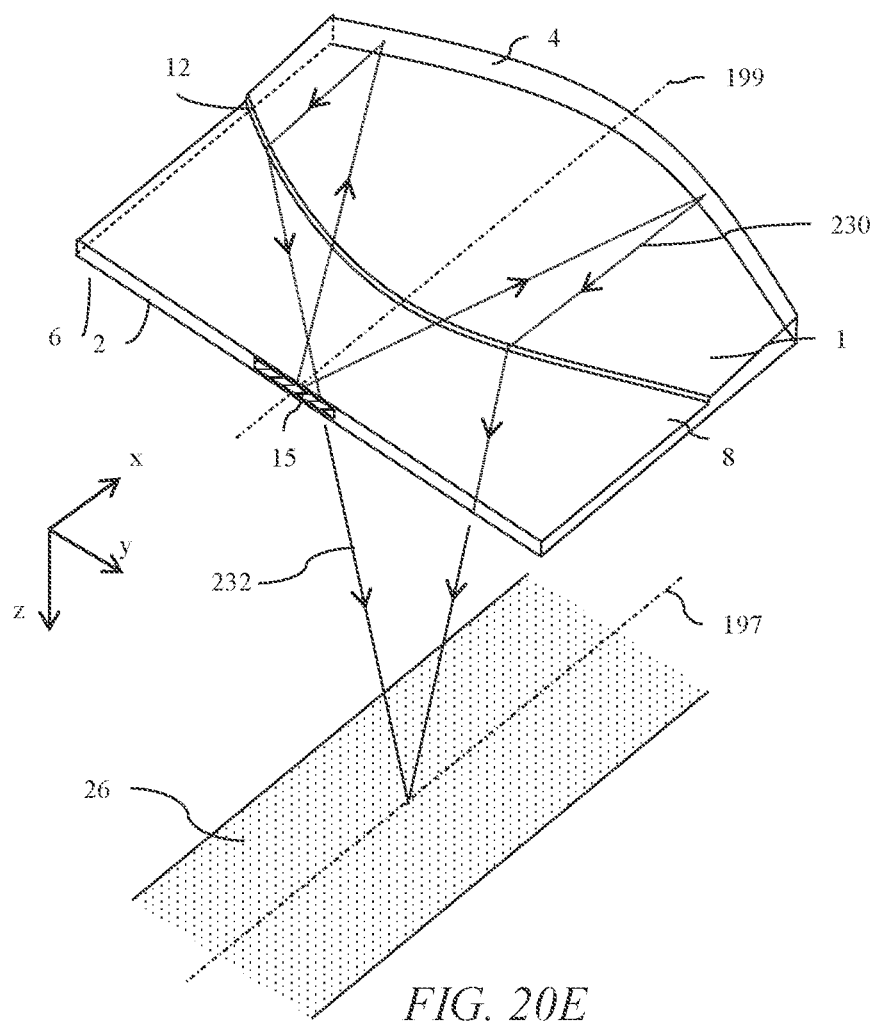
FIG. 20E is a schematic diagram illustrating in rear perspective view operation of an imaging waveguide in a narrow angle mode of operation.

FIG. 20D is a schematic diagram illustrating in side view a switchable directional display apparatus 100 comprising a switchable liquid crystal retarder 300 and backlight 20. The backlight 20 of FIG. 20D may be applied in any of the devices described herein and which comprises an imaging waveguide 1 illuminated by a light source array 15 through an input end 2. FIG. 20E which is a schematic diagram illustrating in rear perspective view operation of the imaging waveguide 1 of FIG. 20D in a narrow angle mode of operation.

The imaging waveguides 1 is of the type described in U.S. Pat. No. 9,519,153, which is herein incorporated by reference in its entirety. The waveguide 1 has an input end 2 extending in a lateral direction along the waveguide 1. An array of light sources 15 are disposed along the input end 2 and input light into the waveguide 1.

The waveguide 1 also has opposed first and second guide surfaces 6, 8 extending across the waveguide 1 from the input end 2 to a reflective end 4 for guiding light input at the input end 2 forwards and back along the waveguide 1. The second guide surface 8 has a plurality of light extraction features 12 facing the reflective end 4 and arranged to deflect at least some of the light guided back through the waveguide 1 from the reflective end 4 from different input positions across the input end 2 in different directions through the first guide surface 6 that are dependent on the input position.

In operation, light rays are directed from light source array 15 through an input end and are guided between first and second guiding surfaces 6, 8 without loss to a reflective end 4. Reflected rays are incident onto facets 12 and output by reflection as light rays 230 or transmitted as light rays 232. Transmitted light rays 232 are directed back through the waveguide 1 by facets 803, 805 of rear reflector 800. Operation of rear reflectors are described further in U.S. Pat. No. 10,054,732, which is herein incorporated by reference in its entirety.

As illustrated in FIG. 20E, optical power of the curved reflective end 4 and facets 12 provide an optical window 26 that is transmitted through the spatial light modulator 48 and has an axis 197 that is typically aligned to the optical axis 199 of the waveguide 1. Similar optical window 26 is provided by transmitted light rays 232 that are reflected by the rear reflector 800.

Figure 20F:
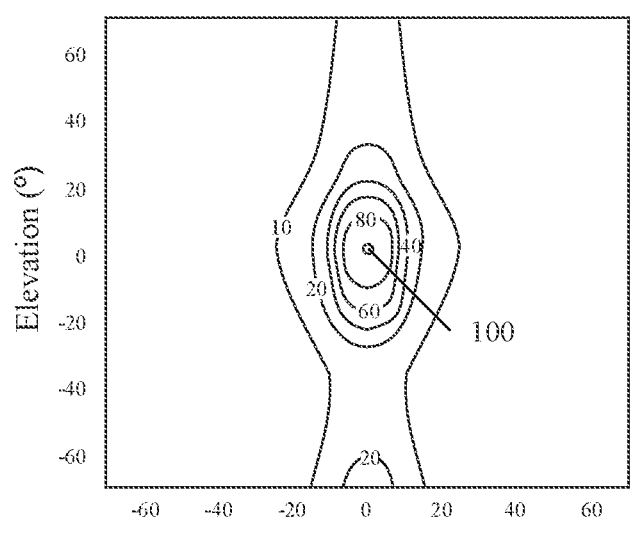
FIG. 20F is a schematic graph illustrating a field-of-view luminance plot of the output of FIG. 20E when used in a display apparatus with no switchable liquid crystal retarder.

FIG. 20F is a schematic graph illustrating field-of-view luminance plot of the output of FIG. 20E when used in a display apparatus with no switchable liquid crystal retarder.

Thus for off-axis viewing positions observed by snoopers 47 may have reduced luminance, for example between 1% and 3% of the central peak luminance at an elevation of 0 degrees and lateral angle of +/−45 degrees. Further reduction of off-axis luminance is achieved by the plural retarders 301, 330 of the present embodiments.

Another type of directional backlight with low off-axis luminance will now be described.

Figure 20G:
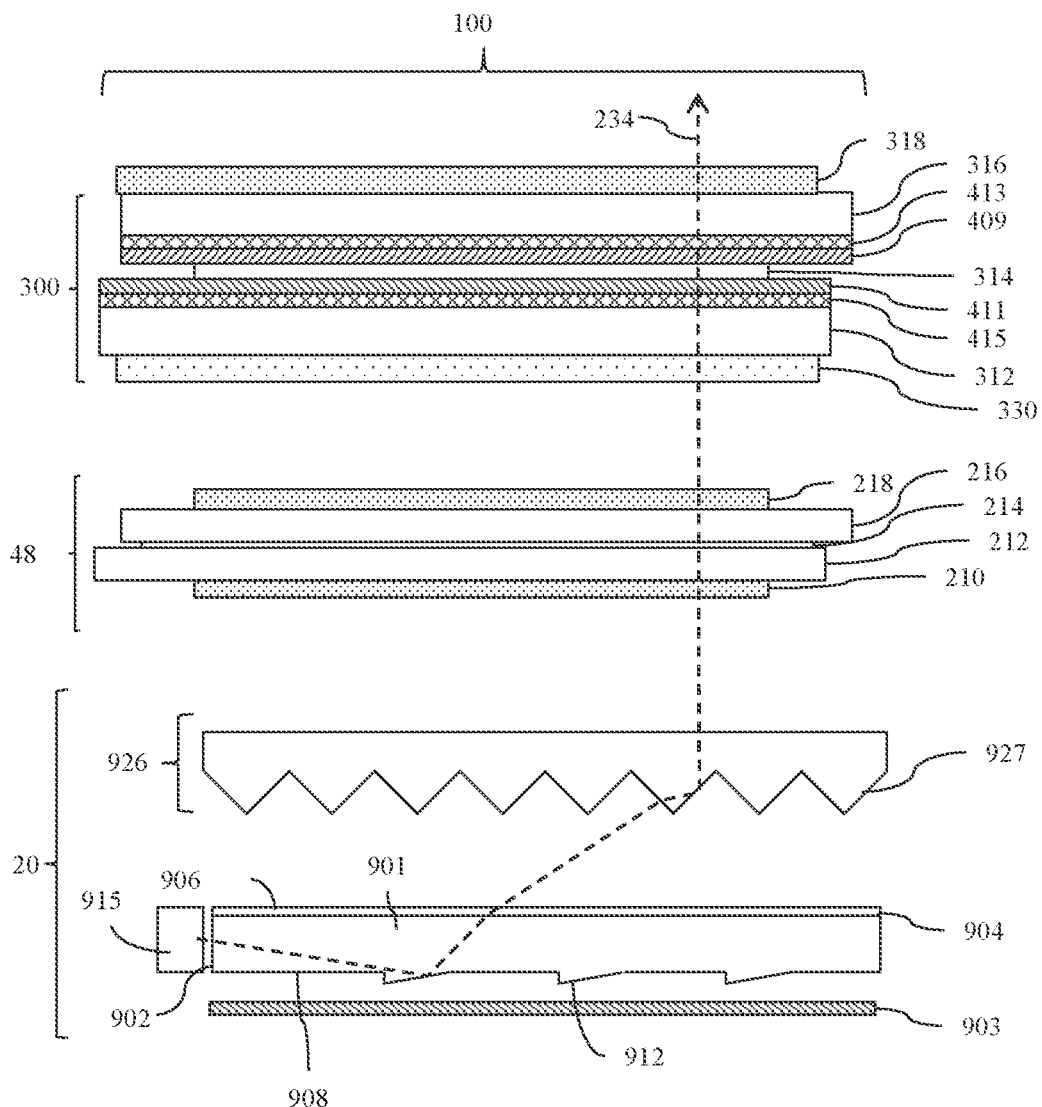
FIG. 20G is a schematic diagram illustrating in side view a switchable directional display apparatus comprising a switchable collimating waveguide and a switchable liquid crystal retarder operating in a privacy mode of operation.

FIG. 20G is a schematic diagram illustrating in side view a switchable directional display apparatus comprising a backlight 20 including a switchable collimating waveguide 901 and a switchable liquid crystal retarder 300 and additional polariser 318. The backlight 20 of FIG. 20G may be applied in any of the devices described herein and is arranged as follows.

The waveguide 901 has an input end 902 extending in a lateral direction along the waveguide 901. An array of light sources 915 are disposed along the input end 902 and input light into the waveguide 1. The waveguide 901 also has opposed first and second guide surfaces 906, 908 extending across the waveguide 1 from the input end 2 to a reflective end 4 for guiding light input at the input end 2 forwards and back along the waveguide 1. In operation, light is guided between the first and second guiding surface 906, 908.

The first guiding surface 906 may be provided with a lenticular structure 904 comprising a plurality of elongate lenticular elements 905 and the second guiding surface 908 may be provided with prismatic structures 912 which are inclined and act as light extraction features. The plurality of elongate lenticular elements 905 of the lenticular structure 904 and the plurality of inclined light extraction features deflect input light guided through the waveguide 901 to exit through the first guide surface 906.

A rear reflector 903 that may be a planar reflector is provided to direct light that is transmitted through the surface 908 back through the waveguide 901.

Output light rays that are incident on both the prismatic structures 912 and lenticular elements 905 of the lenticular structure 904 are output at angles close to grazing incidence to the surface 906. A prismatic turning film 926 comprising facets 927 is arranged to redirect output light rays 234 by total internal reflection through the spatial light modulator 48 and compensated switchable liquid crystal retarder 300.

Figure 20H:
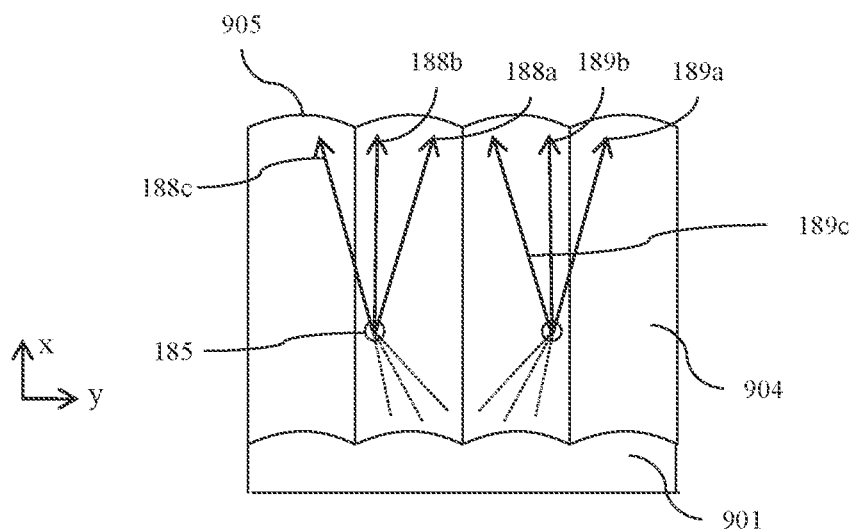
FIG. 20H is a schematic diagram illustrating in top view output of a collimating waveguide.

FIG. 20H is a schematic diagram illustrating in top view output of the collimating waveguide 901. Prismatic structures 912 are arranged to provide light at angles of incidence onto the lenticular structure 904 that are below the critical angle and thus may escape. On incidence at the edges of a lenticular surface, the inclination of the surface provides a light deflection for escaping rays and provides a collimating effect. Light ray 234 may be provided by light rays 188a-c and light rays 189a-c, with incidence on locations 185 of the lenticular structure 904 of the collimated waveguide 901.

Figure 20I:
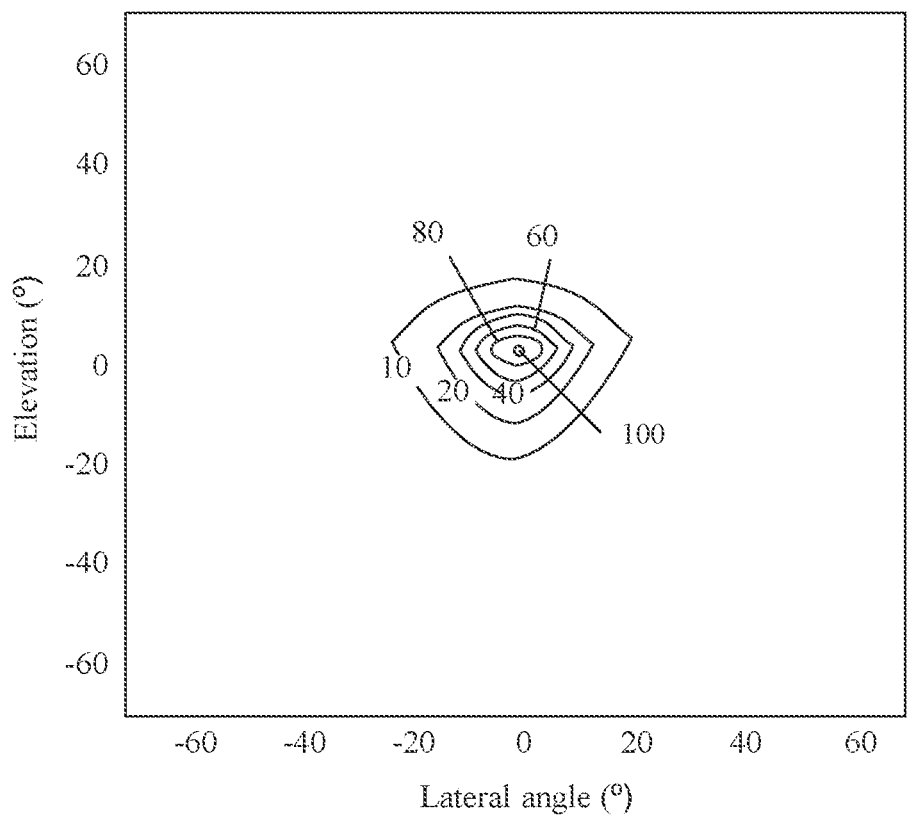
FIG. 20I is a schematic graph illustrating an iso-luminance field-of-view polar plot for the display apparatus of FIG. 20G.

FIG. 20I is a schematic graph illustrating an iso-luminance field-of-view polar plot for the display apparatus of FIG. 20G. Thus a narrow output light cone may be provided, with size determined by the structures 904, 912 and the turning film 926.

Advantageously in regions in which snoopers may be located with lateral angles of 45 degrees or greater for example, the luminance of output from the display is small, typically less than 2%. It would be desirable to achieve further reduction of output luminance. Such further reduction is provided by the compensated switchable liquid crystal retarder 300 and additional polariser 318 as illustrated in FIG. 20G. Advantageously a high performance privacy display with low off-axis luminance may be provided over a wide field of view.

Directional backlights such as the types described in FIG. 20D and FIG. 20G together with the plural retarders 301, 330 of the present embodiments may achieve off-axis luminance of less than 1.5%, preferably less than 0.75% and most preferably less than 0.5% may be achieved for typical snooper 47 locations. Further, high on-axis luminance and uniformity may be provided for the primary user 45. Advantageously a high performance privacy display with low off-axis luminance may be provided over a wide field of view, that may be switched to a wide angle mode by means of control of the switchable retarder 301 by means of control system 352.

The operation of a switchable privacy display comprising an emissive spatial light modulator and an air spaced view angle control element will now be described.

Figure 21:
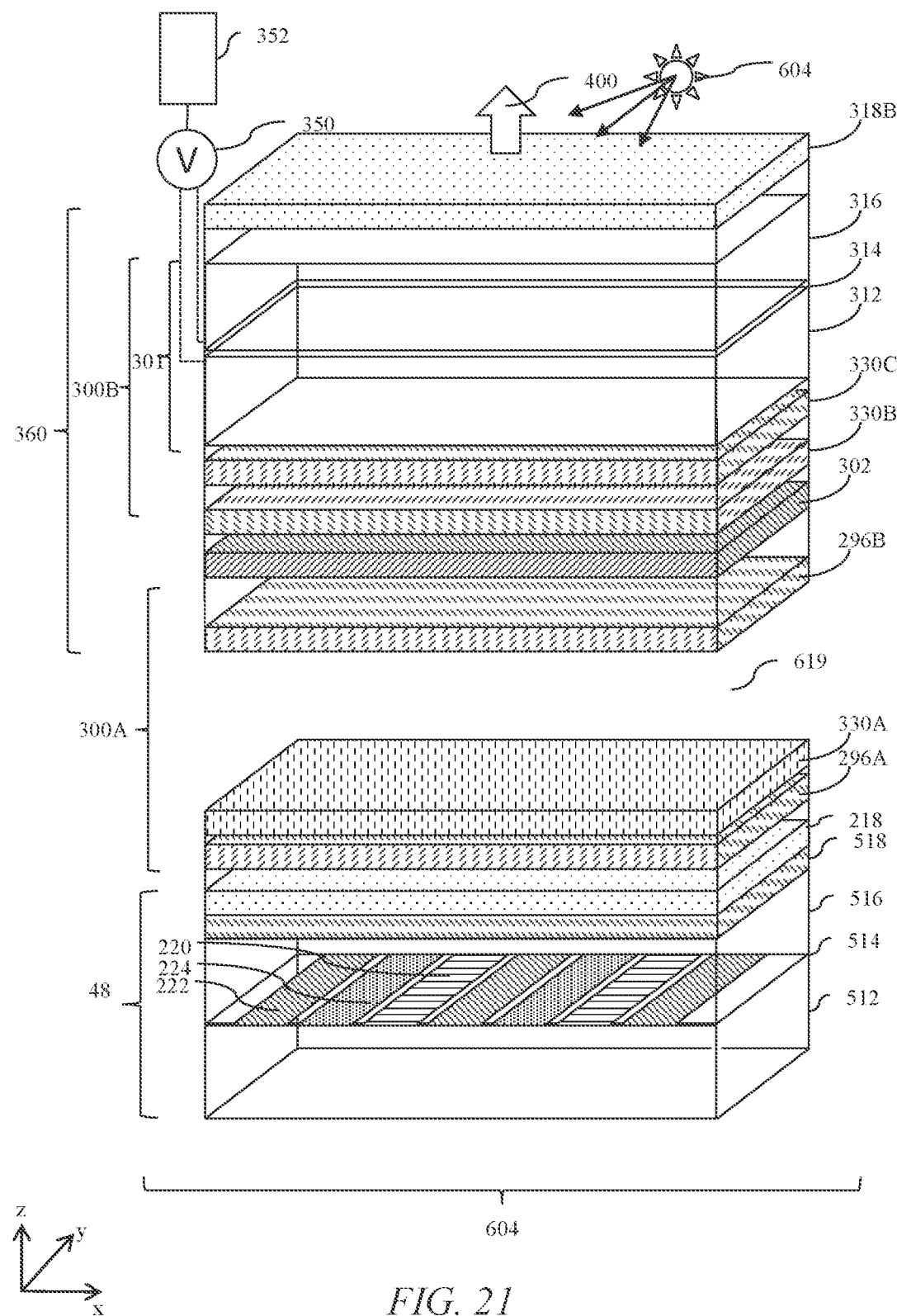
FIG. 21 is a schematic diagram illustrating in side perspective view an example of a retarder stack comprising an emissive display, output polariser, crossed quarter waveplates on opposites sides of an air gap, passive retarder, additional polariser, active retarder and further additional polariser.

FIG. 21 is a schematic diagram illustrating in side perspective view an example of an emissive switchable privacy display 604 comprising an emissive spatial light modulator 48, output polariser 218, crossed quarter waveplates 296A, 296B on opposites sides of an air gap 619, passive retarder 330A, additional polariser that is a reflective polariser 302, crossed A-plates 330B, 330C, switchable liquid crystal retarder 301 and further additional polariser 318, with the illustrative embodiment of TABLE 14. Features of the embodiment of FIG. 21 not discussed in further detail may

TABLE 14

| Layer | Orientation/° | Retarder | Retardance/nm |
|---|---|---|---|
| Retarder 518 | 45 | A-plate | +135 |
| Polariser 218 | 0 | — | — |
| Retarder 296A | 45 | A-plate | +135 |
| Retarder 330 | Vertical | Negative C-plate | −800 |
| Air gap 619 | | | |
| Retarder 296B | 135 | A-plate | +135 |
| Polariser 318A | 0 | — | — |
| Reflective polariser 302 | 0 | — | — |
| Retarder 330A | 45 | A-plate | +575 |
| Retarder 330B | 135 | A-plate | +575 |
| Switchable LC 314 | | See TABLE 3 | |
| Polariser 318B | 0 | — | — |

In an alternative for the display device 100, the spatial light modulator may comprise an emissive spatial light modulator 48 arranged to output light. In that case, the display polariser 218 may be an output display polariser arranged on the output side of the emissive spatial light modulator 48. Advantageously display thickness may be reduced in comparison to displays with backlights, and flexible and bendable displays may be conveniently provided.

The spatial light modulator may have a pixel layer 514, support substrates 512, 516. The pixel layer 514 may be partially reflective to incident ambient light so that a quarter waveplate retarder 518 may be provided between the display polariser 218 and the pixel layer 514 to minimise reflection. The retarder 518 is different in operation to the retarders of the present retarders disclosed elsewhere herein and does not provide circular symmetry to polar output profiles or reduction of reflectivity at air gaps.

Such an emissive display typically provides high angular range of optical output, that may be Lambertian or similar to Lambertian in profile.

To achieve desirable off-axis visual security level in a privacy mode multiple view angle control retarders 300A, 300B, and additional polariser 318A, and further additional polariser 318B may be provided. In the embodiment of FIG. 21, the additional polariser 318A is provided by the reflective polariser 302, that is the dichroic polariser 318A illustrated elsewhere herein is omitted. Advantageously cost and thickness is reduced, and efficiency is increased.

The first plural polar control retarders 300A are passive retarders 296A, 330A, 296B of the type illustrated in FIG. 16A, FIG. 17A or FIG. 18A, and thus achieve a restricted angular luminance profile for light from the display in both public and privacy modes of operation. The plural polar control retarders 300B are arranged to provide switching between privacy and public modes of operation as described elsewhere herein. Advantageously an emissive display may be provide with an air spaced view angle control element 360 that is spaced by air gap 619 from the emissive spatial light modulator 48 without reduction of head-on contrast to the primary user in both privacy and public modes of operation.

The operation of retarder layers between parallel polarisers for off-axis illumination will now be described further. In the various devices described above, at least one retarder is arranged between the reflective polariser 318 and the additional polariser 218 in various different configurations. In each case, the at least one retarder is configured so that it does not affect the luminance of light passing through the reflective polariser 318, the at least one retarder, and the additional polariser 218 along an axis along a normal to the plane of the retarder(s) but it does reduce the luminance of light passing through the reflective polariser 318, the at least one retarder, and the additional polariser 218 along an axis inclined to a normal to the plane of the retarder(s), at least in one of the switchable states of the compensated switchable retarder 300. There will now be given a description of this effect in more detail, the principles of which may be applied in general to all of the devices described above.

Figure 22A:
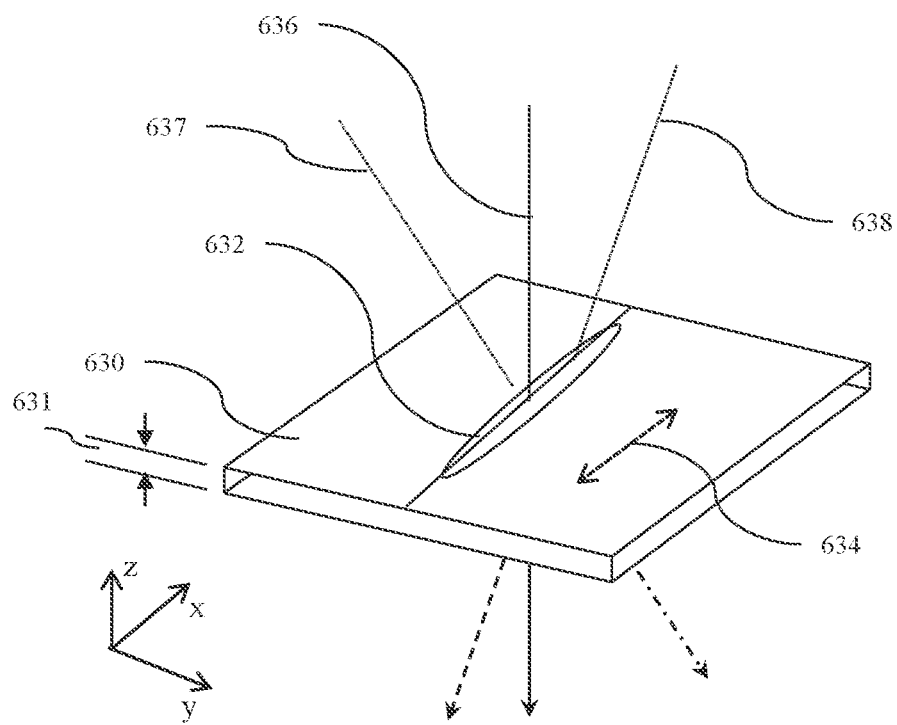
FIG. 22A is a schematic diagram illustrating in perspective view illumination of a retarder layer by off-axis light.

FIG. 22A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 22B:
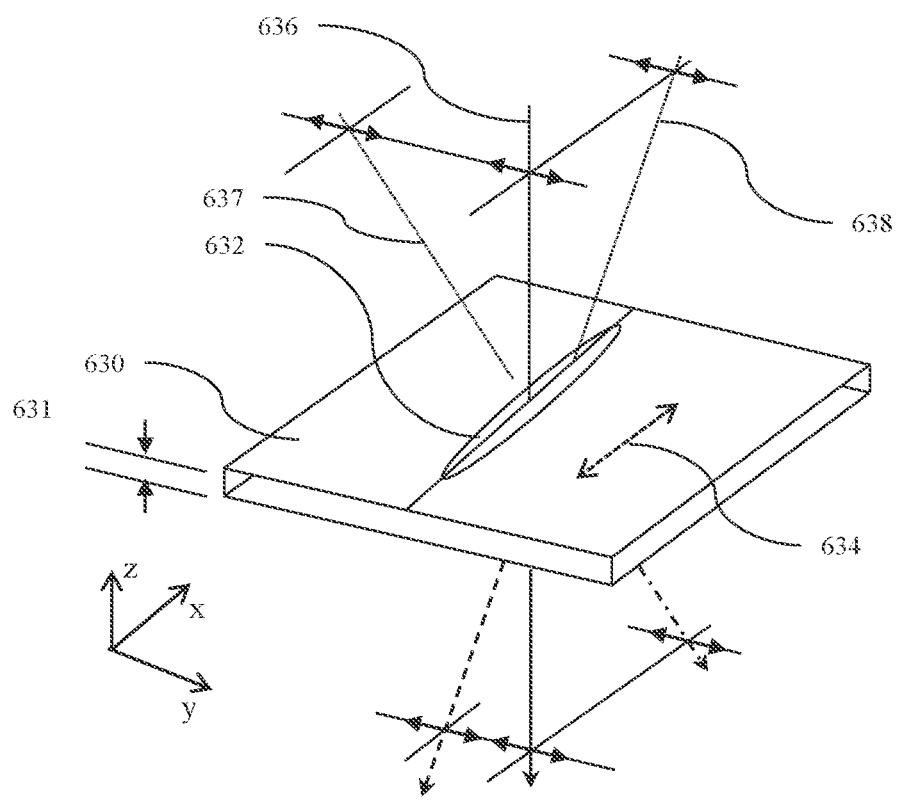
FIG. 22B is a schematic diagram illustrating in perspective view illumination of a retarder layer by off-axis light of a first linear polarization state at 0 degrees.
Figure 22C:
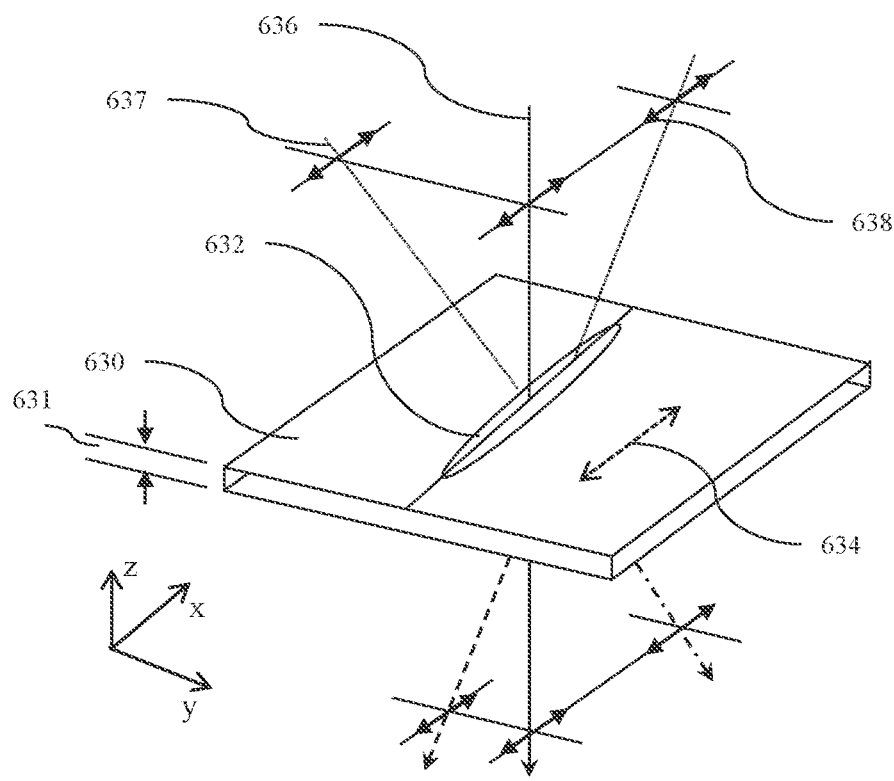
FIG. 22C is a schematic diagram illustrating in perspective view illumination of a retarder layer by off-axis light of a first linear polarization state at 90 degrees.

FIG. 22B is a schematic diagram illustrating in perspective view illumination of a retarder layer by off-axis light of a third linear polarization state at 90 degrees to the x-axis and FIG. 22C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by the retarders in the devices described above.

Figure 22D:
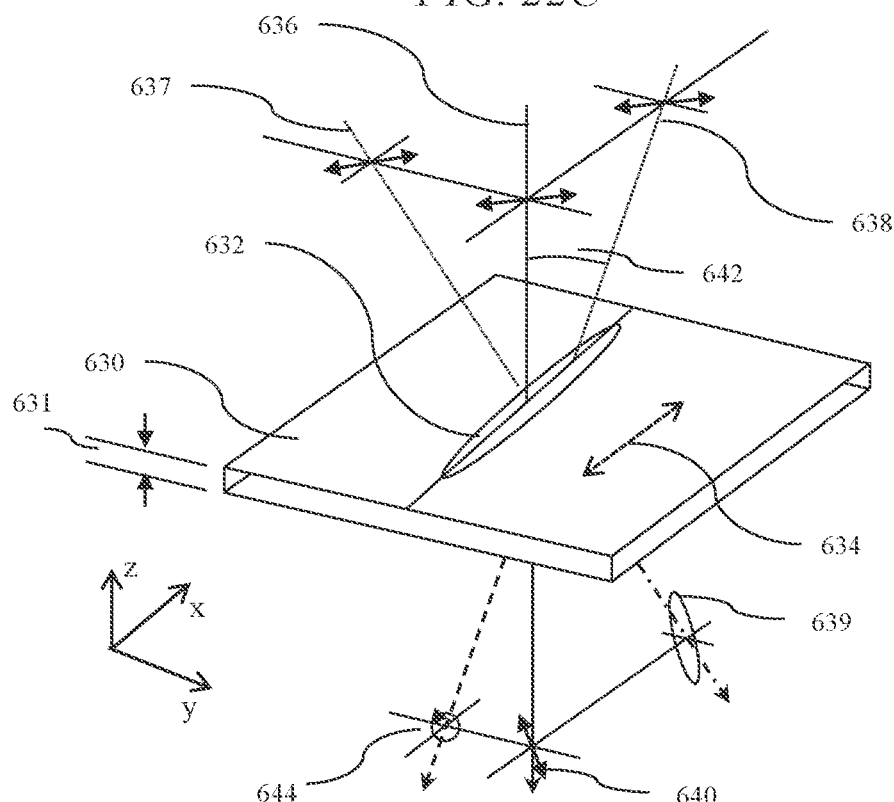
FIG. 22D is a schematic diagram illustrating in perspective view illumination of a retarder layer by off-axis light of a first linear polarization state at 45 degrees.

FIG. 22D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 29D relates to the retarder 630 that is passive, a similar effect is achieved by the retarders described above, in a switchable state of the switchable liquid crystal retarder corresponding to the privacy mode.

To illustrate the off-axis behaviour of retarder stacks, the angular luminance control of C-plates 308A, 308B between an additional polariser 318 and output display polariser 218 will now be described for various off-axis illumination arrangements with reference to the operation of a C-plate between the parallel polarisers 218, 210 will now be described.

Figure 23A:
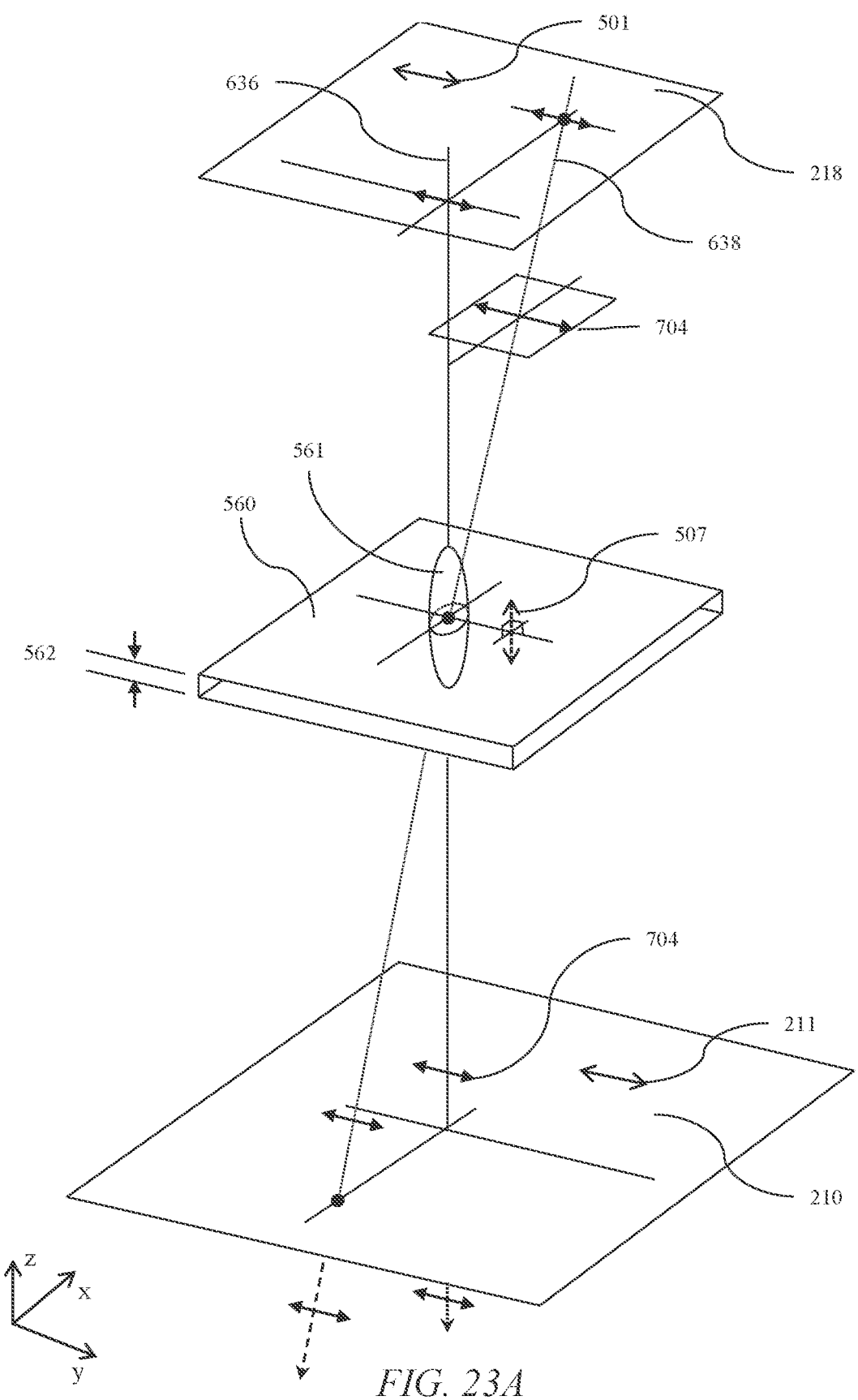
FIG. 23A is a schematic diagram illustrating in perspective view illumination of a C-plate retarder by off-axis polarised light with a positive elevation.

FIG. 23A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder 560 having an optical axis 561 perpendicular to the plane of the retarder 560, that is the x-y plane. The retarder 560 having an optical axis perpendicular to the plane of the retarder comprises a C-plate.

Figure 23B:
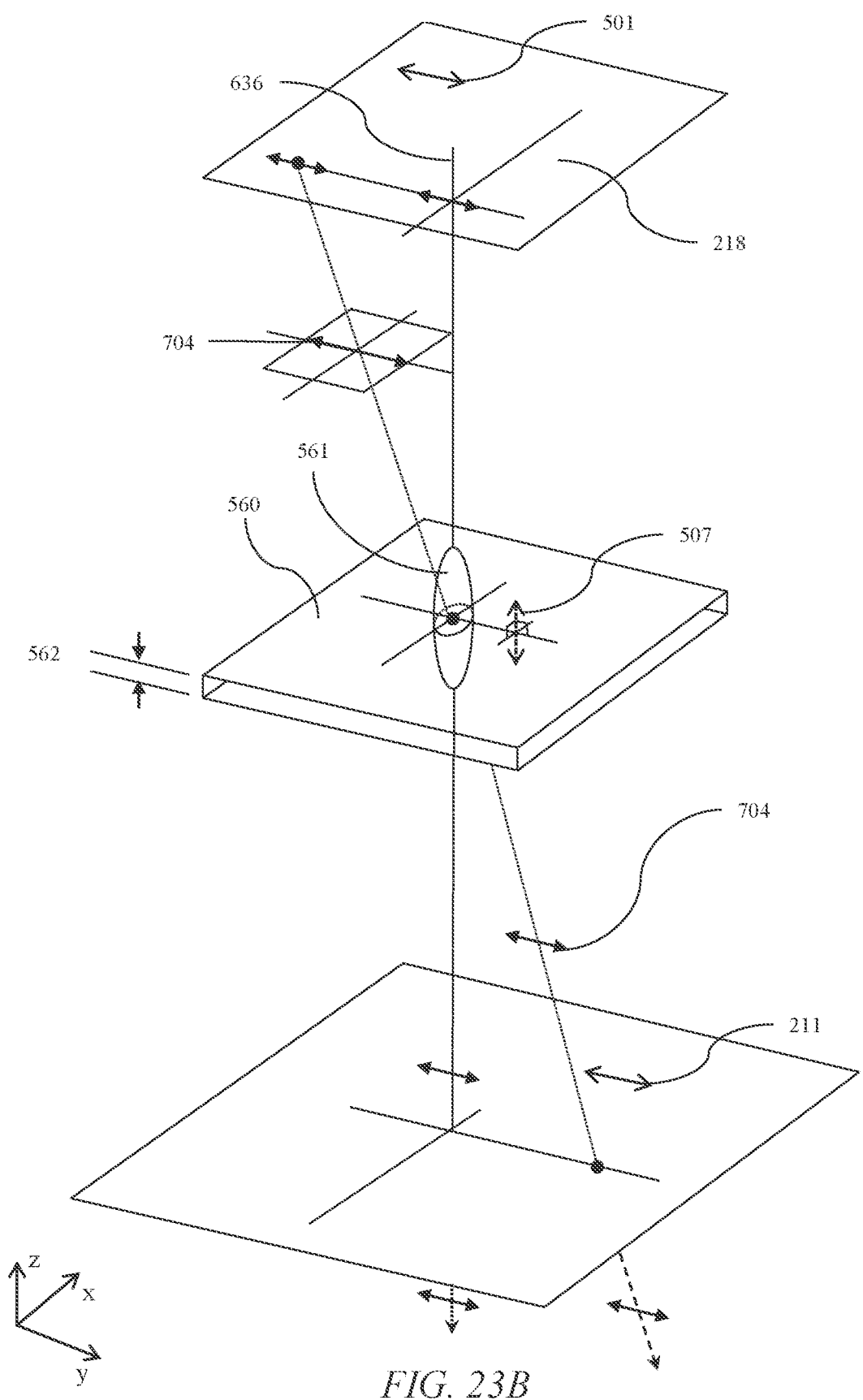
FIG. 23B is a schematic diagram illustrating in perspective view illumination of a C-plate retarder by off-axis polarised light with a negative lateral angle.

FIG. 23B is a schematic diagram illustrating in perspective view illumination of a C-plate layer by off-axis polarised light with a negative lateral angle. As with the arrangement of FIG. 23A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560. Although FIGS. 29A-C relate specifically to the retarder 560 that is passive, a similar effect is achieved by the retarders in the devices described above.

Figure 23C:
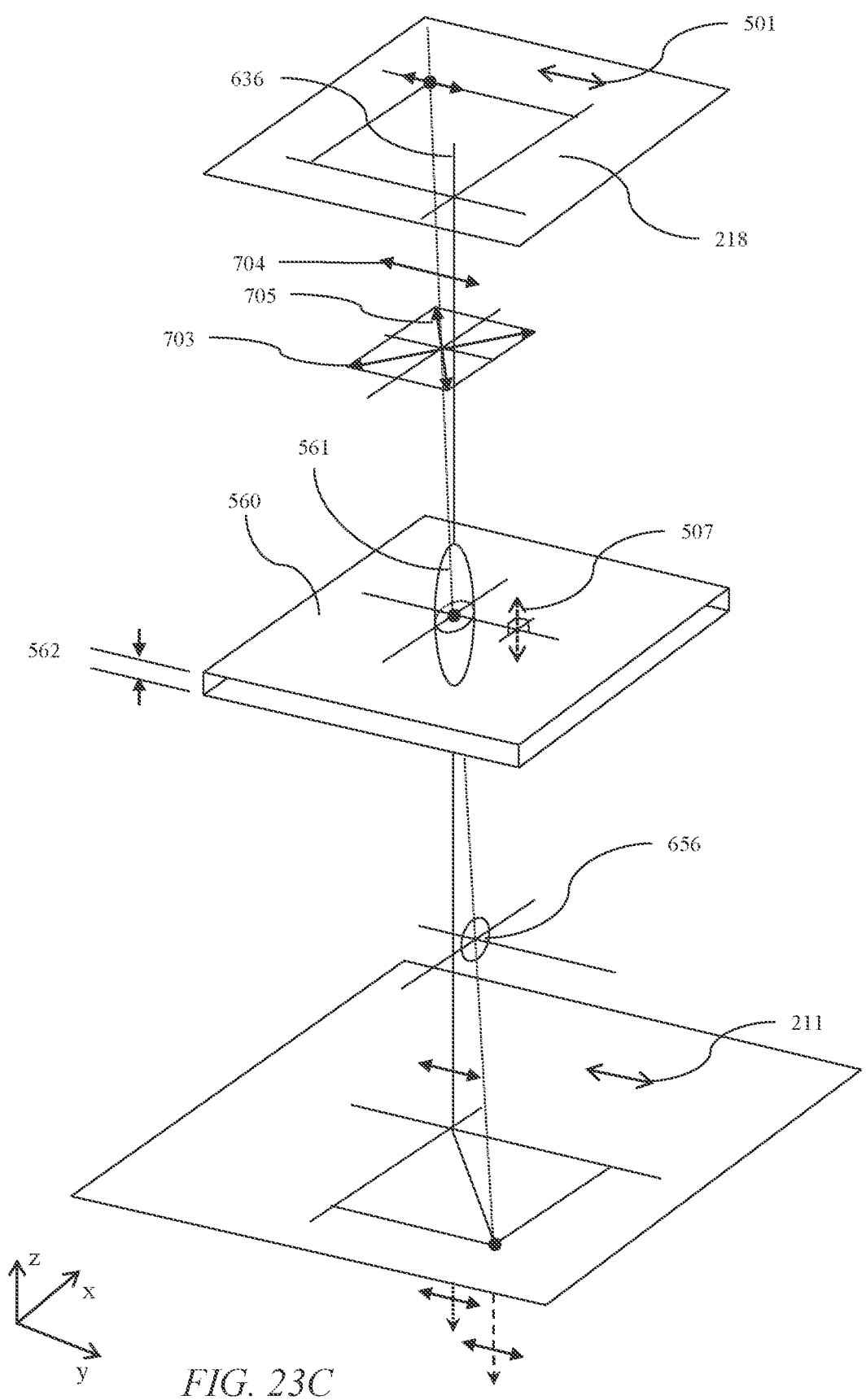
FIG. 23C is a schematic diagram illustrating in perspective view illumination of a C-plate retarder by off-axis polarised light with a positive elevation and negative lateral angle.

FIG. 23C is a schematic diagram illustrating in perspective view illumination of a C-plate layer by off-axis polarised light with a positive elevation and negative lateral angle. In comparison to the arrangement of FIGS. 23A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 23A-B.

Figure 23D:
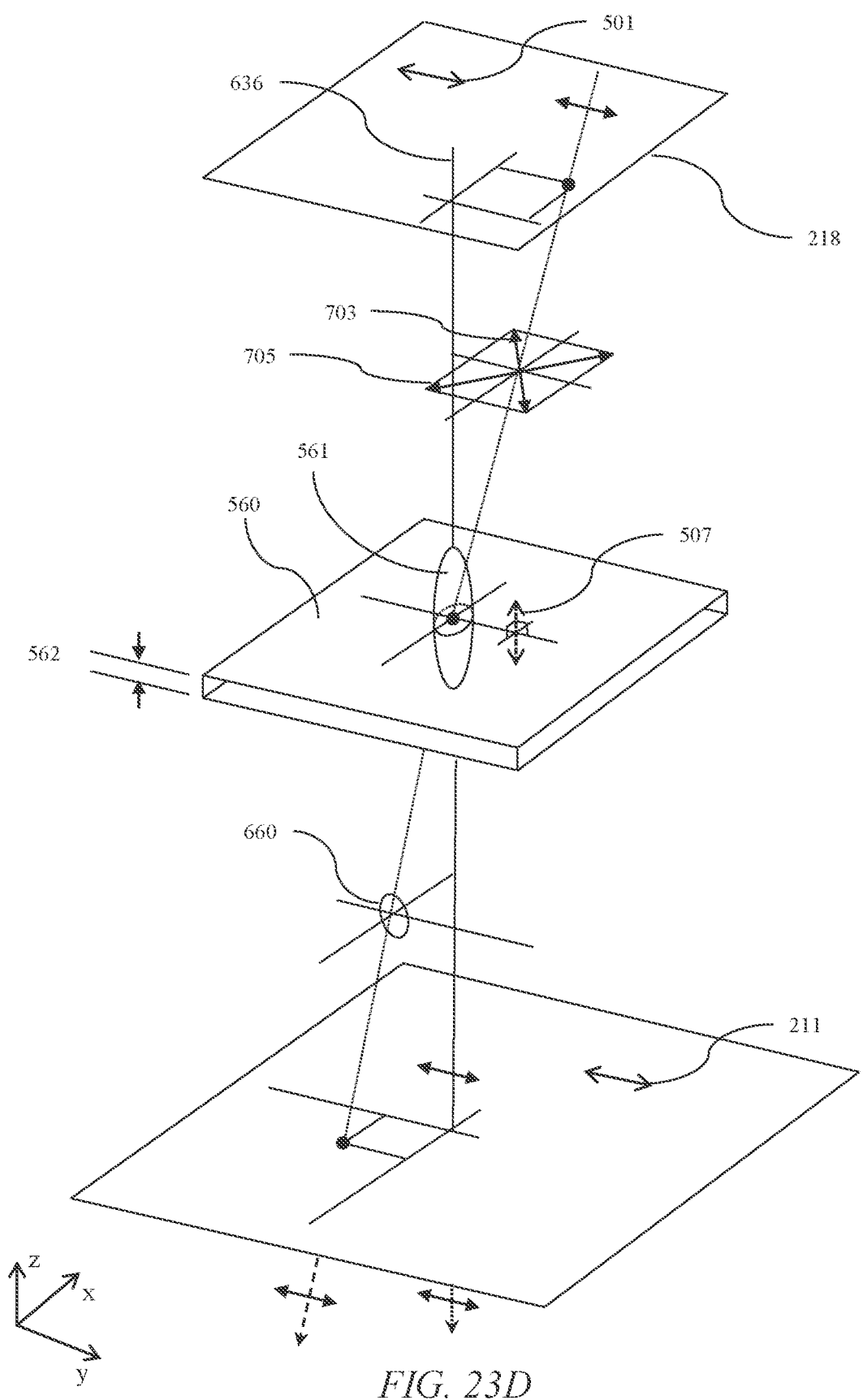
FIG. 23D is a schematic diagram illustrating in perspective view illumination of a C-plate retarder by off-axis polarised light with a positive elevation and positive lateral angle.

FIG. 23D is a schematic diagram illustrating in perspective view illumination of a C-plate layer by off-axis polarised light with a positive elevation and positive lateral angle. In a similar manner to FIG. 23C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560. Although FIG. 29D relates to the retarder 560 that is passive, a similar effect is achieved by the retarders described above, in a switchable state of the switchable liquid crystal retarder corresponding to the privacy mode.

Figure 24:
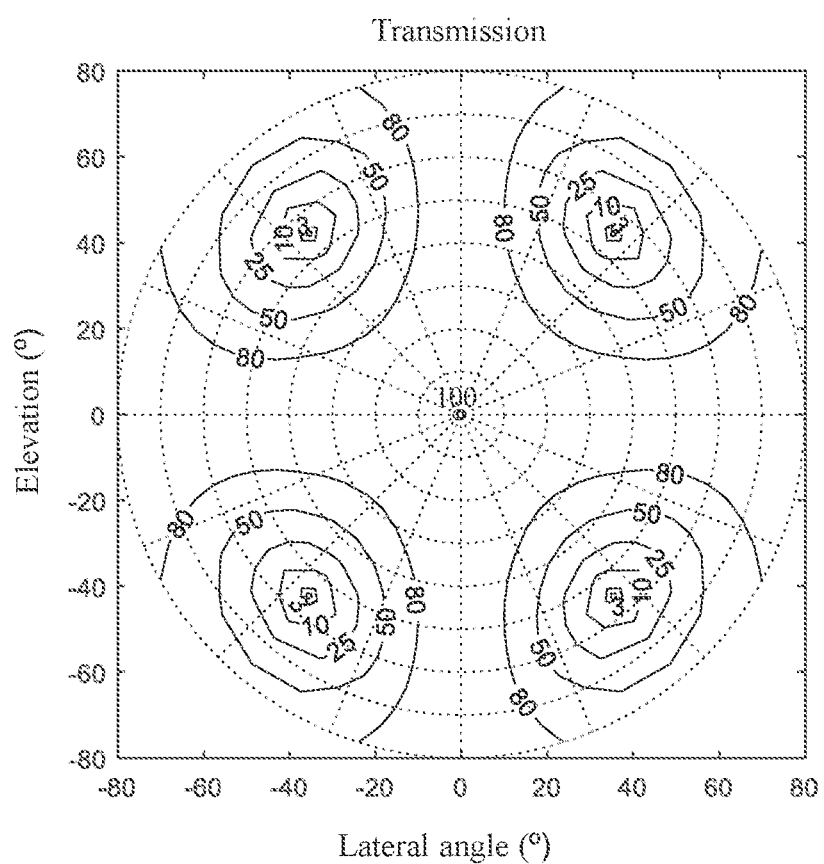
FIG. 24 is a schematic graph illustrating the variation of output transmission with polar direction for transmitted light rays in FIGS. 23A-D.

FIG. 24 is a schematic graph illustrating the variation of output transmission with polar direction for transmitted light rays in FIGS. 23A-D. Thus, the C-plate may provide luminance reduction in polar quadrants. In combination with switchable liquid crystal retarder layer 314 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of retarder stacks, the angular luminance control of crossed A-plates 308A, 308B between an additional polariser 318 and output display polariser 218 will now be described for various off-axis illumination arrangements.

Figure 25A:
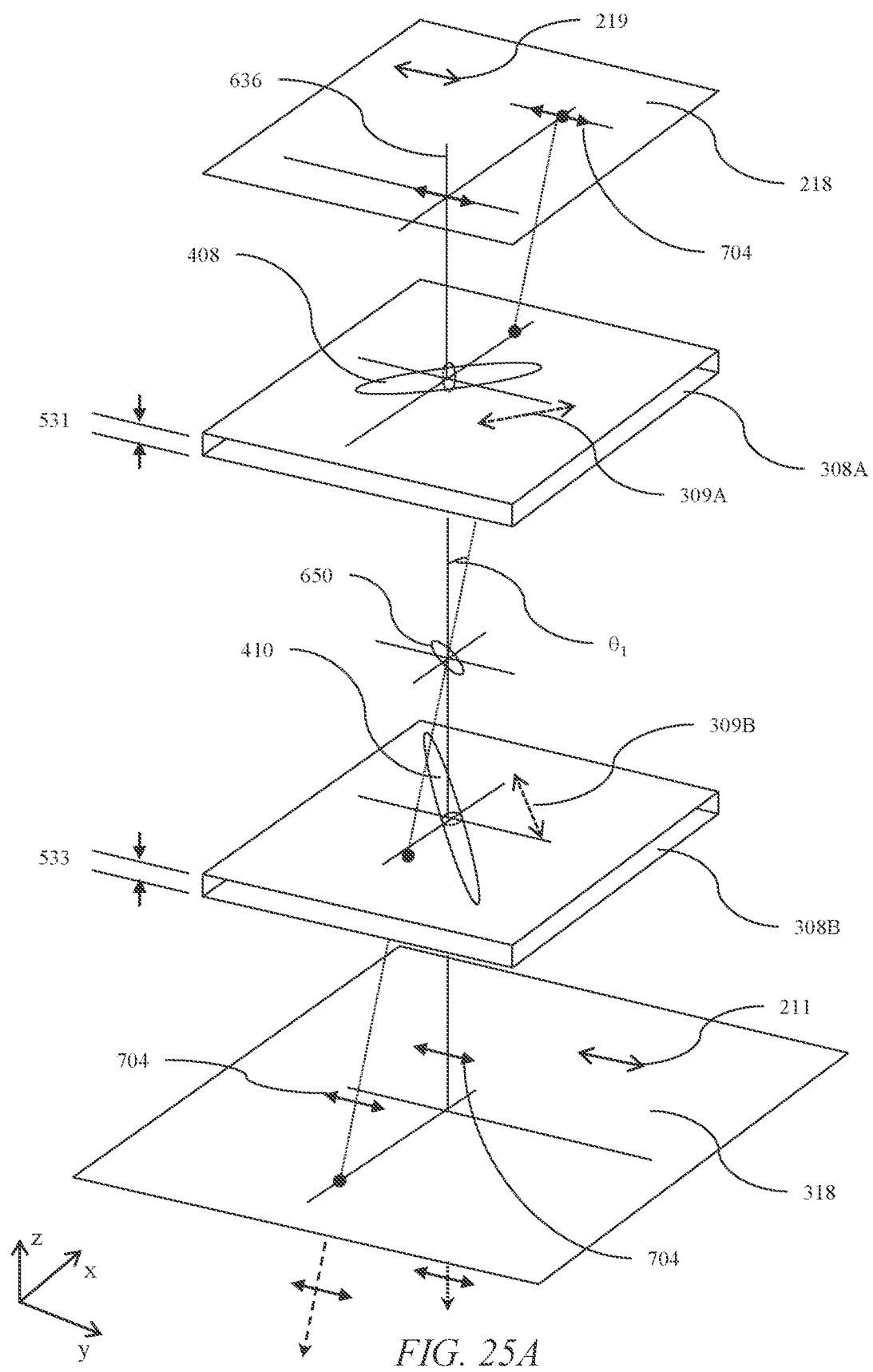
FIG. 25A is a schematic diagram illustrating in perspective view illumination of crossed A-plate retarder layers by off-axis polarised light with a positive elevation.

FIG. 25A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 25A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 25B:
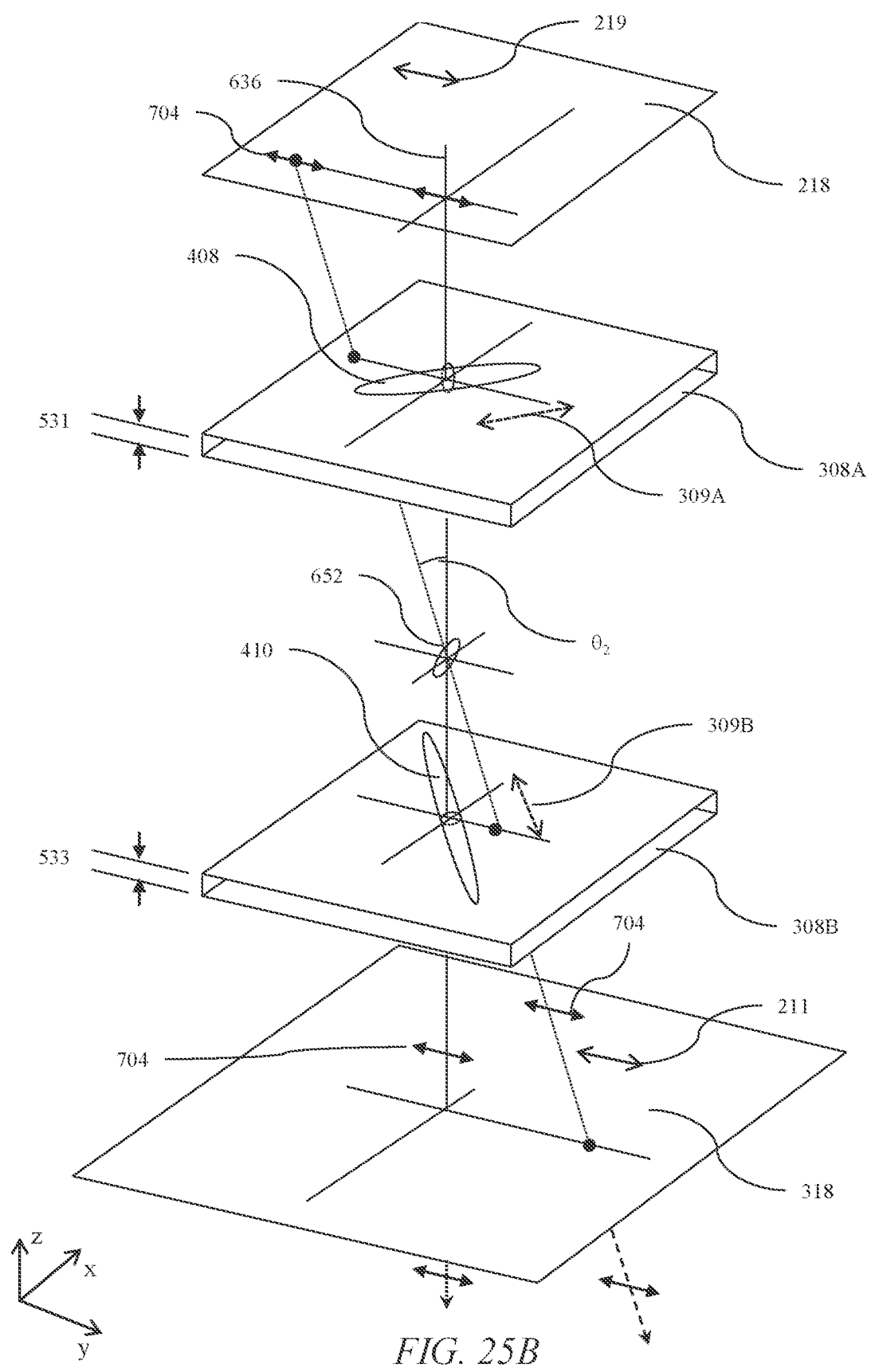
FIG. 25B is a schematic diagram illustrating in perspective view illumination of crossed A-plate retarder layers by off-axis polarised light with a negative lateral angle.

FIG. 25B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 25C:
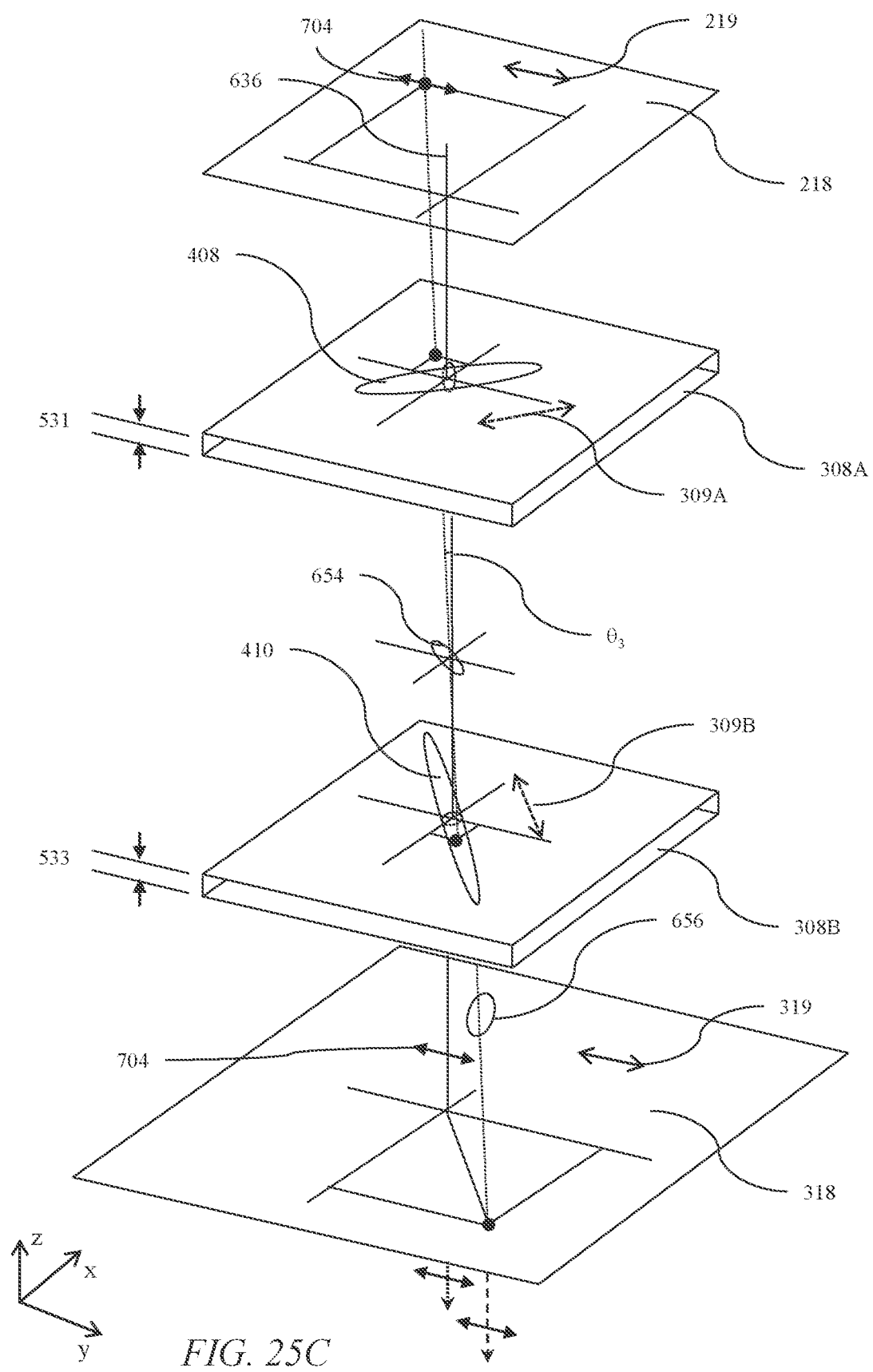
FIG. 25C is a schematic diagram illustrating in perspective view illumination of crossed A-plate retarder layers by off-axis polarised light with a positive elevation and negative lateral angle.

FIG. 25C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 318 with reduced luminance in comparison to the input luminance of the first polarisation component 704.

Figure 25D:
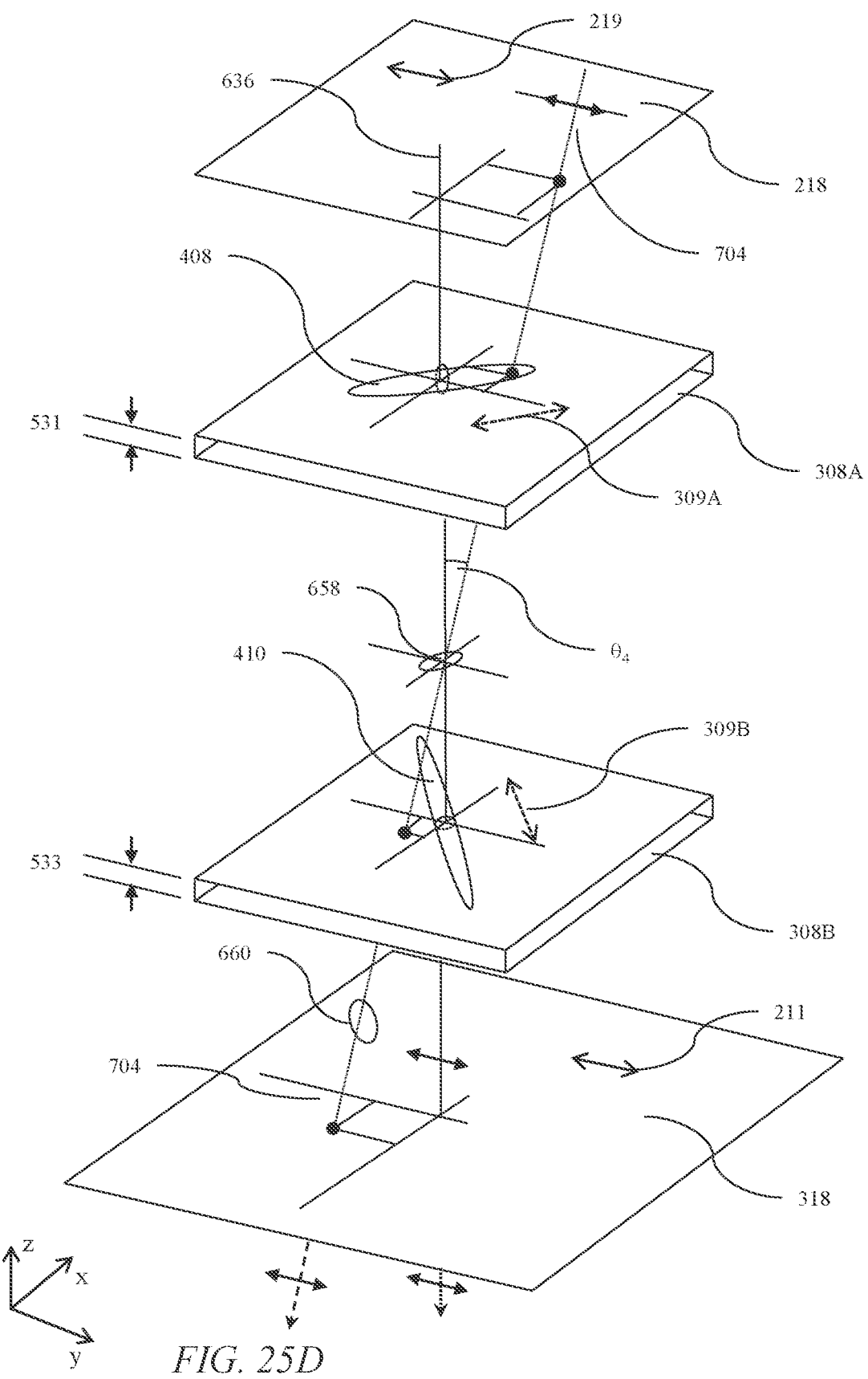
FIG. 25D is a schematic diagram illustrating in perspective view illumination of crossed A-plate retarder layers by off-axis polarised light with a positive elevation and positive lateral angle.

FIG. 25D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 26:
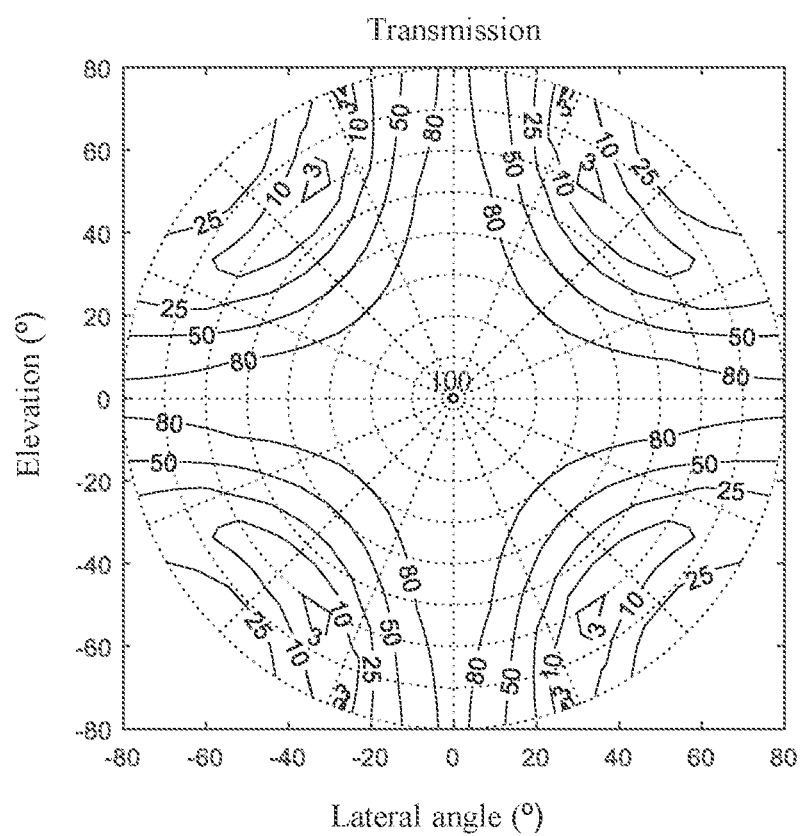
FIG. 26 is a schematic graph illustrating the variation of output transmission with polar direction for transmitted light rays in FIGS. 25A-D.

FIG. 26 is a schematic graph illustrating the variation of output transmission with polar direction for transmitted light rays in FIGS. 25A-D. In comparison to the arrangement of FIG. 24, the area of luminance reduction is increased for off-axis viewing. However, the switchable liquid crystal retarder layer 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
a spatial light modulator having an output side;
a display polariser arranged on the output side of the spatial light modulator, the display polariser being a linear polariser; and
a view angle control optical element comprising:
an additional polariser arranged on an output side of the display polariser, the additional polariser being a linear polariser; and
plural polar control retarders arranged between the additional polariser and the display polariser, wherein an air gap divides the plural polar control retarders into at least one air gap input retarder between the display polariser and the air gap and at least one air gap output retarder between the air gap and the additional polariser,
the at least one air gap input retarder being arranged to convert linearly polarised light passed by the display polariser into circularly polarised light, and
the plural polar control retarders together being capable of simultaneously introducing no net, relative phase shift to orthogonal polarisation components of light passed by the display polariser along an axis along a normal to a plane of the plural polar control retarders and introducing a net, relative phase shift to orthogonal polarisation components of light passed by the display polariser along an axis inclined to a normal to the plane of the plural polar control retarders.

2. A display device according to claim 1, wherein the plural polar control retarders include at least one passive retarder.

3. A display device according to claim 2, wherein the at least one passive retarder comprises two passive retarders which have optical axes in the plane of the two passive retarders that are crossed.

4. A display device according to claim 3, wherein the two passive retarders have optical axes that extend at 45° and at 135°, respectively, with respect to an electric vector transmission direction that is parallel to an electric vector transmission direction of the display polariser.

5. A display device according to claim 3, wherein the two passive retarders are both included in one of the at least one air gap output retarder or the at least one air gap input retarder.

6. A display device according to claim 5, wherein
the two passive retarders introduce no net, relative phase shift to orthogonal polarisation components of light passed by the display polariser along an axis along a normal to the plane of the plural polar control retarders, and
the at least one passive retarder comprises a further two passive retarders which have optical axes in the plane of the further two passive retarders that are crossed, the further two passive retarders being respectively included in the at least one air gap output retarder and the at least one air gap input retarder, the further two passive retarders introducing no net, relative phase shift to orthogonal polarisation components of light passed by the display polariser along an axis along a normal to the plane of the plural polar control retarders, and the one of the further two passive retarders which is arranged in the at least one air gap input retarder being arranged to convert linearly polarised light passed by the display polariser into circularly polarised light.

7. A display device according to claim 5, wherein
the two passive retarders introduce a net, relative phase shift to orthogonal polarisation components of light passed by the display polariser along an axis along a normal to the plane of the plural polar control retarders, and
the at least one passive retarder comprises a further passive retarder included in the other of the at least one air gap output retarder or the at least one air gap input retarder, the further passive retarder introducing a relative phase shift to orthogonal polarisation components of light passed by the display polariser along an axis along a normal to the plane of the plural polar control retarders that is equal and opposite to said net, relative phase shift introduced by the two passive retarders.

8. A display device according to claim 7, wherein
one of the two passive retarders and the further passive retarder have optical axes in the plane of the one of the two passive retarders and the further passive retarder that are crossed, and
the other of the two passive retarders has a retardance for light of a wavelength of 550 nm that is equal to the retardance of said one of the two passive retarders minus the retardance of the further passive retarder.

9. A display device according to claim 7, wherein
one of the two passive retarders and the further passive retarder have optical axes in the plane of the one of the two passive retarders and the further passive retarder that are aligned, and
the other of the two passive retarders has a retardance for light of a wavelength of 550 nm that is equal to the retardance of said one of the two passive retarders plus the retardance of the further passive retarder.

10. A display device according to claim 3, wherein the plural polar control retarders include a switchable liquid crystal retarder comprising a layer of liquid crystal material, the switchable liquid crystal retarder being provided between the two passive retarders.

11. A display device according to claim 10, further comprising a transparent electrode and a liquid crystal alignment layer formed on a side of each of the two passive retarders adjacent the switchable liquid crystal retarder.

12. A display device according to claim 11, further comprising first and second substrates between which the switchable liquid crystal retarder is provided, the first and second substrates each comprising one of the two passive retarders.

13. A display device according to claim 10, wherein a retardance of the at least one passive retarder is equal and opposite to a retardance of the switchable liquid crystal retarder.

14. A display device according to claim 3, wherein
the two passive retarders are respectively included in the at least one air gap output retarder and the at least one air gap input retarder.

15. A display device according to claim 2, wherein the at least one passive retarder comprises a passive retarder having an optical axis perpendicular to the plane of the passive retarder.

16. A display device according to claim 15, wherein the passive retarder having an optical axis perpendicular to the plane of the passive retarder has a retardance for light of a wavelength of 550 nm in a range from −400 nm to −1000 nm or in a range from +500 nm to +1200 nm and preferably in a range from −750 nm to −850 nm or preferably in a range from +950 nm to +1050 nm.

17. A display device according to claim 1, wherein the plural polar control retarders further comprise two passive retarders which have optical axes in the plane of the two passive retarders that are crossed, the two passive retarders being respectively included in the at least one air gap output retarder and the at least one air gap input retarder, the two passive retarders introducing no net, relative phase shift to orthogonal polarisation components of light passed by the display polariser along an axis along a normal to the plane of the plural polar control retarders, and a one of the two passive retarders which is arranged in the at least one air gap input retarder being arranged to convert linearly polarised light passed by the display polariser into circularly polarised light.

18. A display device according to claim 1, wherein the plural polar control retarders include a switchable liquid crystal retarder comprising a layer of liquid crystal material.

19. A display device according to claim 18, wherein the switchable liquid crystal retarder comprises two surface alignment layers disposed adjacent to the layer of liquid crystal material and on opposite sides thereof, each of the two surface alignment layers being arranged to provide homeotropic alignment in the adjacent liquid crystal material.

20. A display device according to claim 19, wherein the layer of liquid crystal material of the switchable liquid crystal retarder comprises a liquid crystal material with a negative dielectric anisotropy.

21. A display device according to claim 19, wherein the layer of liquid crystal material has a retardance for light of a wavelength of 550 nm in a range from 500 nm to 1000 nm, preferably in a range from 600 nm to 900 nm and most preferably in a range from 700 nm to 850 nm.

22. A display device according to claim 19, wherein the plural polar control retarders further include:
a passive retarder which has an optical axis perpendicular to the plane of the passive retarder, the passive retarder having a retardance for light of a wavelength of 550 nm in a range from −300 nm to −900 nm, preferably in a range from −450 nm to −800 nm and most preferably in a range from −500 nm to −725 nm; or
a pair of passive retarders which have optical axes in the plane of the pair of passive retarders that are crossed, each retarder of the pair of passive retarders having a retardance for light of a wavelength of 550 nm in a range from 300 nm to 800 nm, preferably in a range from 500 nm to 700 nm and most preferably in a range from 550 nm to 675 nm.

23. A display device according to claim 19, wherein each of the two surface alignment layers has a pretilt having a pretilt direction with a component in a plane of the layer of liquid crystal material that is parallel or anti-parallel or orthogonal to an electric vector transmission direction of the display polariser.

24. A display device according to claim 18, wherein the switchable liquid crystal retarder comprises two surface alignment layers disposed adjacent to the layer of liquid crystal material and on opposite sides thereof, each of the two surface alignment layers being arranged to provide homogeneous alignment in the adjacent liquid crystal material.

25. A display device according to claim 24, wherein the layer of liquid crystal material of the switchable liquid crystal retarder comprises a liquid crystal material with a positive dielectric anisotropy.

26. A display device according to claim 24, wherein the layer of liquid crystal material has a retardance for light of a wavelength of 550 nm in a range from 500 nm to 1000 nm, preferably in a range from 600 nm to 850 nm and most preferably in a range from 700 nm to 800 nm.

27. A display device according to claim 24, wherein the plural polar control retarders further include:
  a passive retarder which has an optical axis perpendicular to the plane of the passive retarder, the passive retarder having a retardance for light of a wavelength of 550 nm in a range from −300 nm to −700 nm, preferably in a range from −350 nm to −600 nm and most preferably in a range from −400 nm to −500 nm; or
  a pair of passive retarders which have optical axes in the plane of the pair of passive retarders that are crossed, each retarder of the pair of passive retarders having a retardance for light of a wavelength of 550 nm in a range from 300 nm to 800 nm, preferably in a range from 350 nm to 650 nm and most preferably in a range from 450 nm to 550 nm.

28. A display device according to claim 18, wherein the switchable liquid crystal retarder further comprises electrodes arranged to apply a voltage for controlling the layer of liquid crystal material.

29. A display device according to claim 28, wherein the electrodes are on opposite sides of the layer of liquid crystal material.

30. A display device according to claim 1, wherein the display polariser and the additional polariser have electric vector transmission directions that are parallel.

31. A display device according to claim 1, wherein
  the display polariser and the additional polariser have electric vector transmission directions that are not parallel, and
  the display device further comprises a rotator retarder arranged between the additional polariser and the display polariser, the rotator retarder being arranged to rotate a polarisation direction of polarised light incident thereon between the electric vector transmission directions of the display polariser and the additional polariser.

32. A display device according to claim 31, wherein the spatial light modulator includes a layer of twisted nematic liquid crystal material.

33. A display device according to claim 1, wherein a reflective polariser is arranged between the display polariser and additional polariser, the reflective polariser being a linear polariser.

34. A display device according to claim 33, wherein the display polariser and the reflective polariser have electric vector transmission directions that are parallel.

35. A display device according to claim 1, wherein a diffusing surface structure is provided on at least one of the at least one air gap input retarder and the at least one air gap output retarder.

36. A display device according to claim 1, further comprising at least one further retarder and a further additional polariser, wherein the at least one further retarder is arranged between the first-mentioned additional polariser and the further additional polariser.

37. A display device according to claim 1, further comprising a backlight arranged to output light, wherein the spatial light modulator is a transmissive spatial light modulator arranged to receive output light from the backlight on an input side of the transmissive spatial light modulator.

38. A display device according to claim 37, wherein the backlight provides a luminance at polar angles to a normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator.

39. A display device according to claim 37, wherein the backlight comprises:
  an array of light sources;
  a directional waveguide comprising:
  an input end extending in a lateral direction along a side of the directional waveguide, the light sources being disposed along the input end and arranged to input input light into the waveguide; and
  opposed first and second guide surfaces extending across the directional waveguide from the input end for guiding light input at the input end along the waveguide, the waveguide being arranged to deflect input light guided through the directional waveguide to exit through the first guide surface.

40. A display device according to claim 39, wherein the backlight further comprises a light turning film and the directional waveguide is a collimating waveguide.

41. A display device according to claim 40, wherein the collimating waveguide comprises
  (i) a plurality of elongate lenticular elements; and
  (ii) a plurality of inclined light extraction features,
  wherein the plurality of elongate lenticular elements and the plurality of inclined light extraction features are oriented to deflect input light guided through the directional waveguide to exit through the first guide surface.

42. A display device according to claim 39, wherein the directional waveguide is an imaging waveguide arranged to image the light sources in the lateral direction so that the output light from the light sources is directed into respective optical windows in output directions that are distributed in dependence on input positions of the light sources.

43. A display device according to claim 42, wherein the imaging waveguide comprises a reflective end for reflecting the input light back along the imaging waveguide, wherein the second guide surface is arranged to deflect the reflected input light through the first guide surface as output light, the second guide surface comprises light extraction features and intermediate regions between the light extraction features, the light extraction features being oriented to deflect the reflected input light through the first guide surface as output light and the intermediate regions being arranged to direct light through the waveguide without extracting it;

and the reflective end has positive optical power in the lateral direction extending between sides of the waveguide that extend between the first and second guide surfaces.

44. A display device according to claim 37, wherein the display device further comprises an input polariser arranged on the input side of the spatial light modulator.

45. A display device according to claim 44, further comprising a further additional polariser arranged on the input side of the spatial light modulator and at least one further retarder arranged between the at least one further additional polariser and the input polariser.

46. A display device according to claim 1, wherein the spatial light modulator comprises an emissive spatial light modulator.

* * * * *